United States Patent
Lee et al.

(10) Patent No.: US 10,431,086 B2
(45) Date of Patent: Oct. 1, 2019

(54) VEHICLE, MOBILE TERMINAL AND METHOD FOR CONTROLLING THE SAME

(71) Applicant: LG ELECTRONICS INC., Seoul (KR)

(72) Inventors: Jeongjun Lee, Seoul (KR); Eunyoung Shin, Seoul (KR); Samin Ryu, Seoul (KR); Eunhei Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 363 days.

(21) Appl. No.: 15/002,265

(22) Filed: Jan. 20, 2016

(65) Prior Publication Data

US 2016/0284217 A1  Sep. 29, 2016

Related U.S. Application Data

(60) Provisional application No. 62/137,244, filed on Mar. 24, 2015.

(30) Foreign Application Priority Data

Jun. 2, 2015  (KR) ........................ 10-2015-0078165

(51) Int. Cl.
| | |
|---|---|
| *G08G 1/14* | (2006.01) |
| *G06K 9/00* | (2006.01) |
| *B60R 11/04* | (2006.01) |
| *H04N 7/18* | (2006.01) |
| *G01C 21/00* | (2006.01) |
| *B60W 30/06* | (2006.01) |
| *B60R 1/00* | (2006.01) |

(Continued)

(52) U.S. Cl.
CPC .............. *G08G 1/143* (2013.01); *B60D 1/30* (2013.01); *B60K 31/0008* (2013.01); *B60K 35/00* (2013.01); *B60K 37/06* (2013.01); *B60R 1/00* (2013.01); *G08G 1/144* (2013.01); *G08G 1/168* (2013.01); *B60K 2350/2013* (2013.01)

(58) Field of Classification Search
CPC ........ G08G 1/143; G08G 1/168; G08G 1/144; B60K 37/06; B60K 35/00; B60K 31/0008; B60K 2350/2013; B60D 1/30; B60R 1/00
USPC ..................................................... 348/148
See application file for complete search history.

(56) References Cited

U.S. PATENT DOCUMENTS

| | | | |
|---|---|---|---|
| 9,258,532 B2 * | 2/2016 | Ozaki | G01C 21/3602 |
| 9,429,943 B2 * | 8/2016 | Wilson | G05D 1/0246 |

(Continued)

FOREIGN PATENT DOCUMENTS

| | | |
|---|---|---|
| DE | 102010008324 | 8/2011 |
| EP | 2394862 | 12/2011 |

(Continued)

OTHER PUBLICATIONS

European Patent Office Application No. 15203239.7, Search Report dated Jul. 21, 2016, 7 pages.

*Primary Examiner* — Susan E. Hodges
(74) *Attorney, Agent, or Firm* — Lee, Hong, Degerman, Kang & Waimey

(57) ABSTRACT

A mobile terminal includes a camera, a display unit, and a controller for finding parkable areas matching an overall width of a vehicle by detecting a distance between a plurality of objects in an image obtained by the camera, providing parkable area information corresponding to the parkable areas on the image through the display unit, and selecting one of the parkable areas.

23 Claims, 63 Drawing Sheets

(51) Int. Cl.
  *B60D 1/30*    (2006.01)
  *B60K 31/00*   (2006.01)
  *B60K 35/00*   (2006.01)
  *G08G 1/16*    (2006.01)
  *B60K 37/06*   (2006.01)

(56) References Cited

U.S. PATENT DOCUMENTS

| | | | | |
|---|---|---|---|---|
| 2011/0143779 | A1* | 6/2011 | Rowe | G06Q 30/02 |
| | | | | 455/456.3 |
| 2014/0121883 | A1* | 5/2014 | Shen | B62D 15/0285 |
| | | | | 701/28 |
| 2014/0132767 | A1* | 5/2014 | Sonnabend | G08G 1/144 |
| | | | | 348/148 |
| 2014/0292541 | A1* | 10/2014 | Korman | G08G 1/143 |
| | | | | 340/932.2 |
| 2015/0002620 | A1 | 1/2015 | Shin et al. | |
| 2015/0339924 | A1* | 11/2015 | Cook | G08G 1/14 |
| | | | | 382/104 |

FOREIGN PATENT DOCUMENTS

| | | |
|---|---|---|
| EP | 2418123 | 2/2012 |
| JP | 2008123028 | 5/2008 |

* cited by examiner

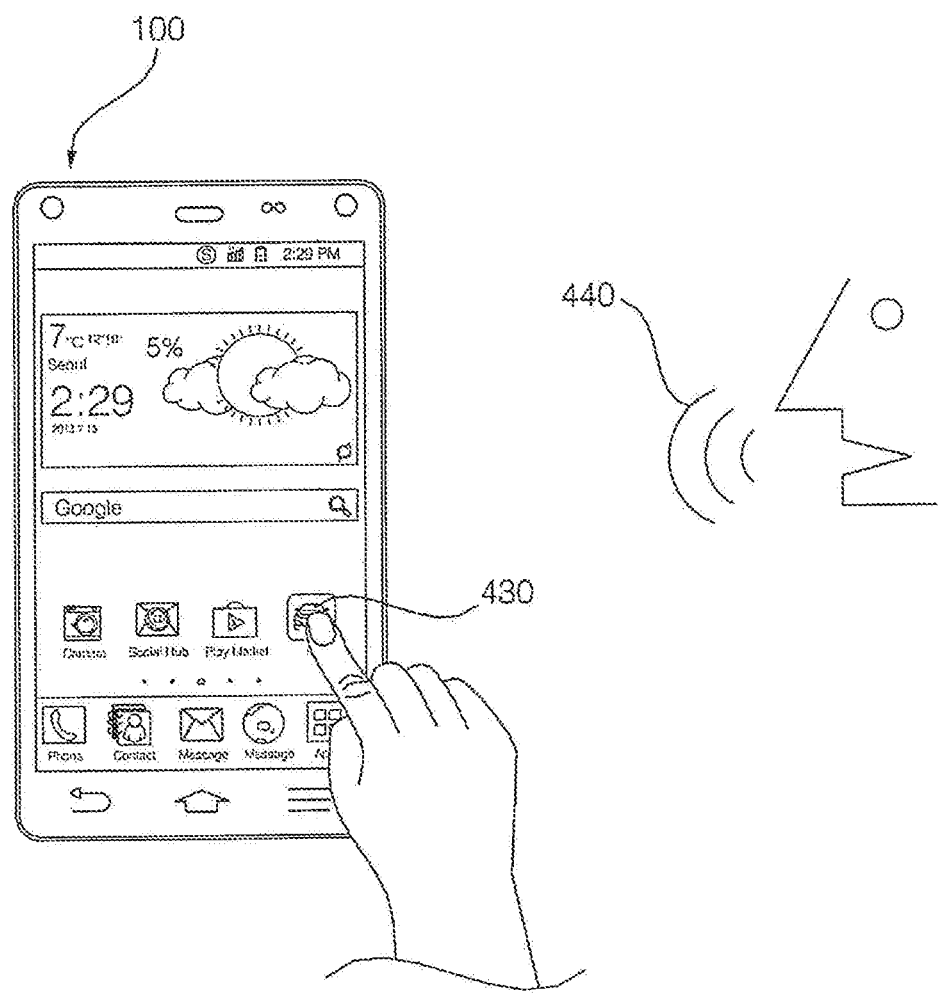

VEHICLE, MOBILE TERMINAL AND METHOD FOR CONTROLLING THE SAME

CROSS-REFERENCE TO RELATED APPLICATION

Pursuant to 35 U.S.C. § 119, this application claims the benefit of U.S. Provisional Application No. 62/137,244 filed on Mar. 24, 2015 and also claims the benefit of earlier filing date and right of priority to Korean Patent Application No. 10-2015-0078165 filed on Jun. 2, 2015, the contents of which are all hereby incorporated by reference herein in their entirety.

BACKGROUND OF THE DISCLOSURE

1. Field of the Disclosure

The present invention relates to a mobile terminal and a method for controlling the same and, more particularly, to a mobile terminal for assisting parking of a vehicle, and a method for controlling the same.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, a vehicle is an apparatus driven in a desired direction by a user. A representative example thereof is a car.

Currently, a parking assist system for acquiring information about a parking space using, for example, an ultrasonic sensor, and then controlling steering to park a vehicle in the parking space has been developed and marketed.

However, the parking assist system using the ultrasonic sensor cannot detect a parking space until the parking space is sufficiently close to reflect an ultrasonic wave. In addition, since an ultrasonic wave is used, a user cannot visibly determine whether the parking space has been detected or not.

Meanwhile, research is being actively conducted on technologies for providing various types of information necessary to drive a vehicle by a mobile terminal connected to the vehicle.

To solve the above problem, a mobile terminal including various sensors to assist parking of a vehicle is required.

SUMMARY OF THE DISCLOSURE

Accordingly, an object of the present invention is to address the above-noted and other problems.

Another object of the present invention is to provide a novel mobile terminal for assisting parking of a vehicle.

To achieve these and other advantages and in accordance with the purpose of the present invention, as embodied and broadly described herein, the present invention provides in one aspect a mobile terminal for assisting parking of a vehicle, the mobile terminal including a camera, a display unit, and a controller for finding parkable areas matching an overall width of the vehicle by detecting a distance between a plurality of objects in an image obtained by the camera, providing parkable area information corresponding to the parkable areas on the image through the display unit, and selecting one of the parkable areas.

A mobile terminal and a method for controlling the same according to the present invention have the following effects.

First, parking of a vehicle may be assisted using various sensors included in a mobile terminal even when the vehicle does not include additional equipment.

Second, user convenience may be improved by detecting a parkable area using a camera capable of measuring a distance and parking a vehicle in the detected area.

Third, parking may be assisted appropriately for a current situation by acquiring passenger information based on an inside image of a vehicle and assisting parking based on the acquired information.

Fourth, parking assist operation may be customized by providing a recommended parking area based on a user-preferred parking space or a learned parking route or pattern.

Fifth, a novice drive may easily park a vehicle by following a predicted trajectory of wheels displayed to correspond to a vehicle route for parking.

Sixth, a wide view may be provided to a user by assisting parking using a 3D map generated based on data received from an external device.

Seventh, an accurate location of a user or a vehicle in a parking lot by assisting parking using a 3D map generated based on a motion sensor and an image.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 4A and 4B are schematic diagrams for describing an operation for entering a parking assist mode, according to embodiments of the present invention;

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
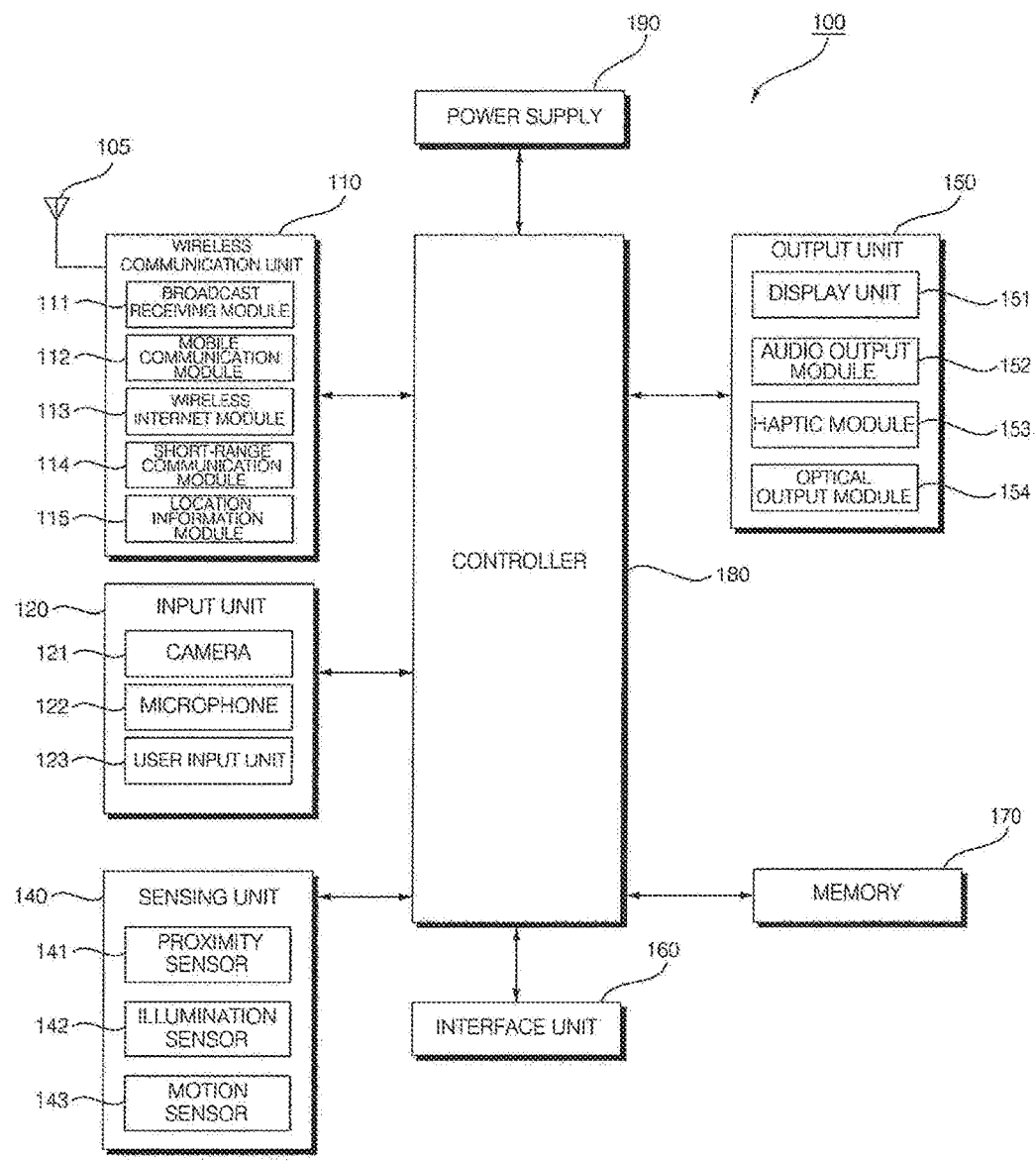
FIG. 1A is a block diagram of a mobile terminal in accordance with the present disclosure.
Figure 1B:
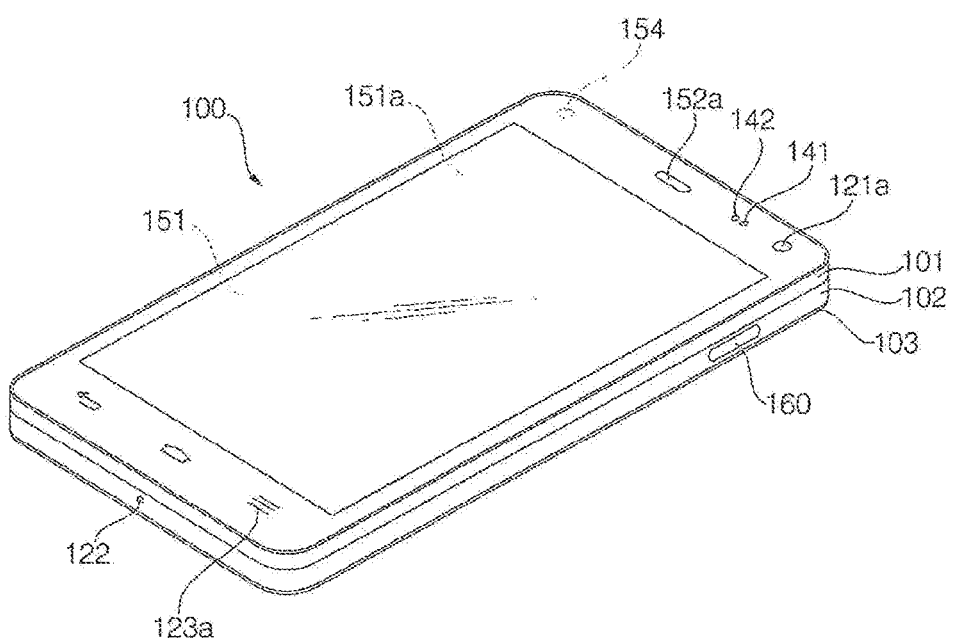
FIGS. 1B and 1C are conceptual views of one example of the mobile terminal, viewed from different directions.
Figure 1C:
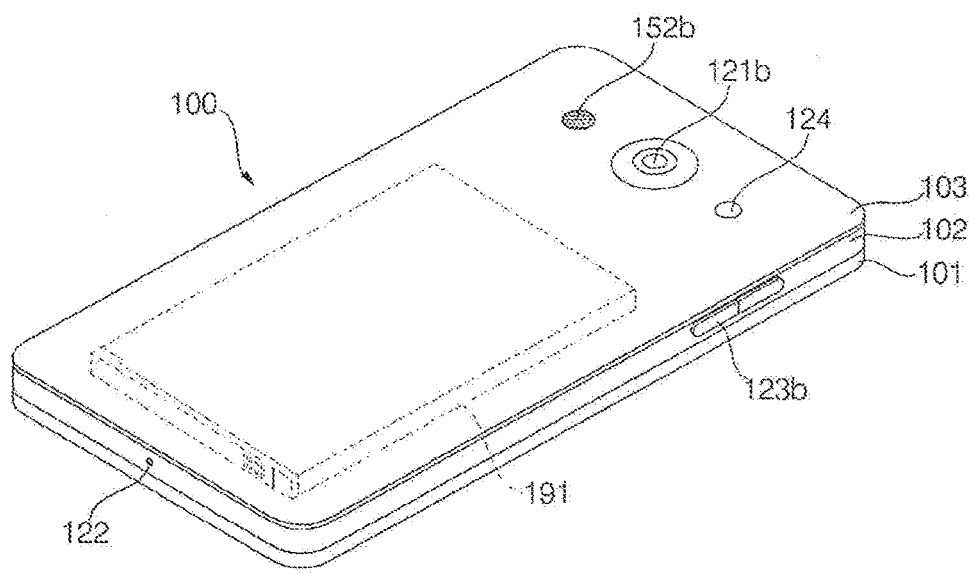

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information of a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

Figure 10:
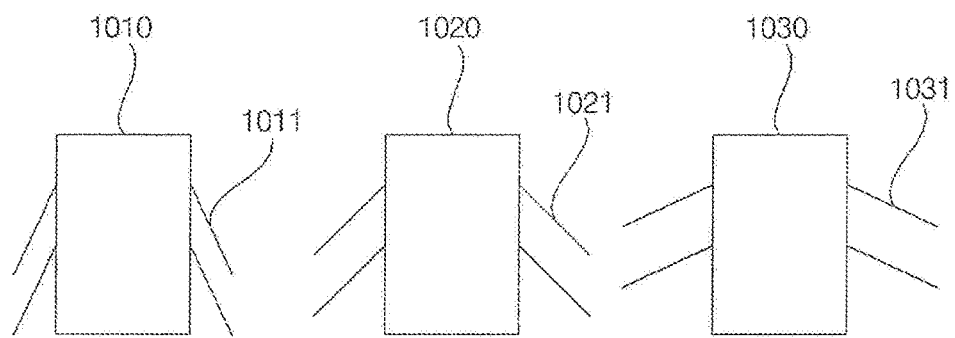
FIG. 10 is a schematic diagram for describing an operation for displaying distance information between a plurality of objects, using a vehicle image, according to an embodiment of the present invention.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

The configuration of the mobile terminal 100 according to the present invention has been described above with reference to FIGS. 1A to 1C. A detailed description is now given of a mobile terminal and a method for controlling the same, according to embodiments of the present invention.

Figure 2A:
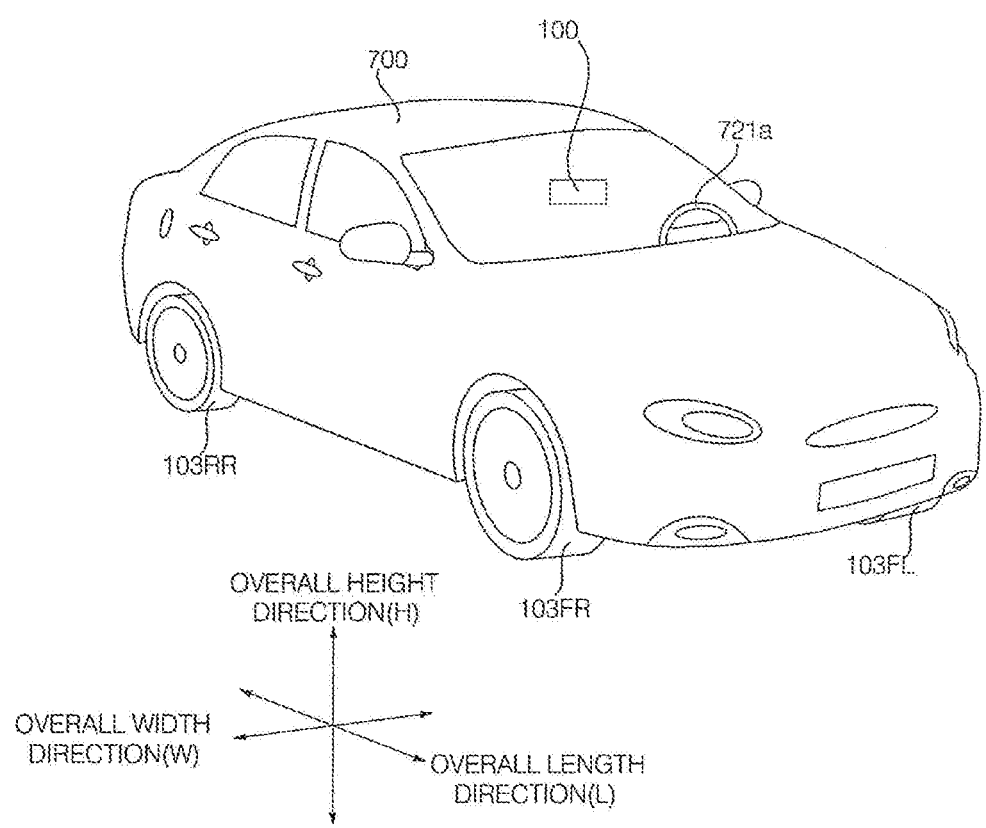
FIG. 2A is an external view of a vehicle according to an embodiment of the present invention.

FIG. 2A is an external view of a vehicle 700 including an in-vehicle display apparatus, according to an embodiment of the present invention.

Referring to FIG. 2A, the vehicle 700 may include wheels 103FR, 103FL, 103RL, and 103RR rotating due to power supplied from a power source, and a steering input unit 721a for steering the vehicle 700.

Meanwhile, the mobile terminal 100 may be attached to a part of a windshield of the vehicle 700. In this case, the second camera 121b of the mobile terminal 100 may capture a front part image of the vehicle 700. The first camera 121a of the mobile terminal 100 may capture an inside image of the vehicle 700.

The mobile terminal 100 may be connected to and exchange data with the vehicle 700. For example, the mobile terminal 100 may be connected through the interface unit 160 to the vehicle 700 in a wired manner. Alternatively, the mobile terminal 100 may be paired with the vehicle 700 through the short-range communication module 114.

Meanwhile, an overall length refers to the length of the vehicle 700 from a front part to a back part, an overall width refers to the width of the vehicle 700, and an overall height refers to the height of the vehicle 700 from the bottom of wheels to a roof. In the following description, an overall length direction L may refer to a reference direction for measuring the overall length of the vehicle 700, an overall width direction W may refer to a reference direction for measuring the overall width of the vehicle 700, and an overall height direction H may refer to a reference direction for measuring the overall height of the vehicle 700.

Figure 2B:
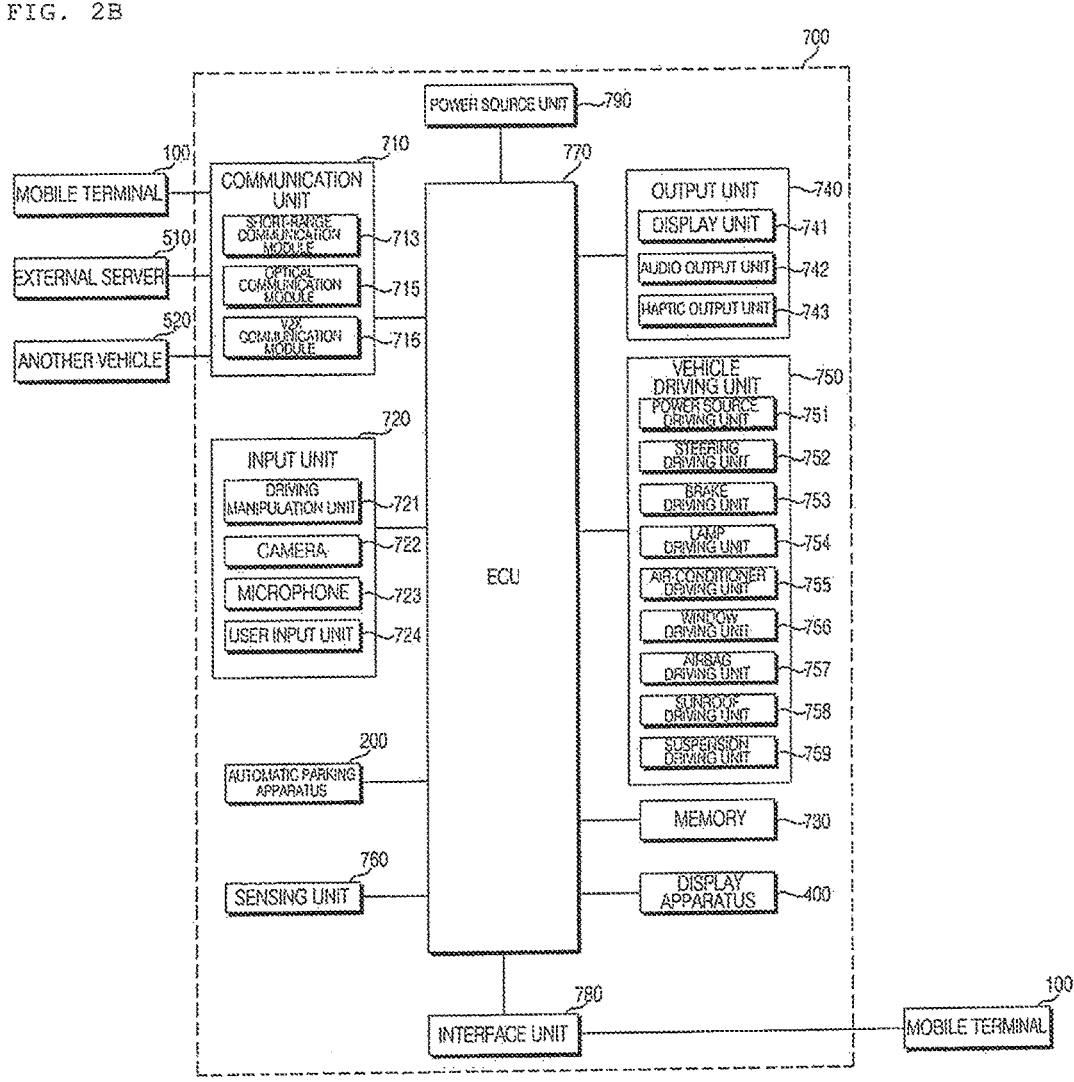
FIG. 2B is an example of a block diagram of the vehicle of FIG. 2A.

FIG. 2B is an example of a block diagram of the vehicle 700 of FIG. 2A.

The vehicle 700 may include a communication unit 710, an input unit 720, a sensing unit 760, an output unit 740, a vehicle driving unit 750, a memory 730, an interface unit 780, an electronic control unit (ECU) 770, a power source unit 790, and a display apparatus 400.

The communication unit 710 may include one or more modules for enabling wireless communication between the vehicle 700 and the mobile terminal 100, between the vehicle 700 and an external server 510, or between the vehicle 700 and another vehicle 520. In addition, the communication unit 710 may include one or more modules for connecting the vehicle 700 to one or more networks.

The communication unit 710 may include a short-range communication module 713, an optical communication module 715, and a vehicle-to-X (V2X) communication module 716.

The short-range communication module 713 is used for short-range communication and may support short-range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

The short-range communication module 713 may form a Wireless local area network and perform short-range communication between the vehicle 700 and at least one external device. For example, the short-range communication module 713 may wirelessly exchange data with the mobile terminal 100. The short-range communication module 713 may receive weather information and traffic condition information (e.g., Transport Protocol Expert Group (TPEG) information) from the mobile terminal 100. If a user gets in the vehicle 700, the mobile terminal 100 of the user and the vehicle 700 may be paired with each other automatically or through execution of an application of the user.

The optical communication module 715 may include a light transmitter and a light receiver.

The light receiver may receive information by converting a light signal into an electrical signal. The light receiver may include a photodiode (PD) for receiving light. The PD may convert light into an electrical signal. For example, the light receiver may receive information about a vehicle ahead using light emitted from a light source of the vehicle ahead.

The light transmitter may include at least one light-emitting device for converting an electrical signal into a light signal. Here, the light-emitting device may be a light-emitting diode (LED). The light transmitter converts an electrical signal into a light signal and emits the light signal. For example, the light transmitter may emit the light signal by turning on a light-emitting device corresponding to a certain frequency. According to an embodiment, the light transmitter may include an array of a plurality of light-emitting devices. According to an embodiment, the light transmitter may be integrated with lamps included in the vehicle 700. For example, the light transmitter may be at least one of headlights, taillights, brake lights, turn signal lights, and sidelights. For example, the optical communication module 715 may exchange data with the other vehicle 520 through optical communication.

The V2X communication module 716 is a module for performing wireless communication with the server 510 or the other vehicle 520. The V2X communication module 716 includes a module capable of implementing a vehicle-to-vehicle (V2V) or vehicle-to-infrastructure (V2I) communication protocol. The vehicle 700 may perform wireless communication with the external server 510 and the other vehicle 520 through the V2X communication module 716.

The input unit 720 may include a driving manipulation unit 721, a camera 722, a microphone 723, and a user input unit 724.

The driving manipulation unit 721 receives user input for driving the vehicle 700. The driving manipulation unit 721 may include the steering input unit 721*a*, a shift input unit 721*b*, an acceleration input unit 721*c*, and a brake input unit 721*d*.

The steering input unit 721*a* receives driving direction input of the vehicle 700 from the user. The steering input unit 721*a* may be provided in the form of a wheel capable of providing steering input through rotation thereof. According to an embodiment, the steering input unit 721*a* may alternatively be provided in the form of a touchscreen, a touchpad, or buttons.

The shift input unit 721*b* receives a park (P), drive (D), neutral (N), or reverse (R) input of the vehicle 700 from the user. The shift input unit 721*b* may be provided in the form of a lever. According to an embodiment, the shift input unit 721*b* may alternatively be provided in the form of a touchscreen, a touchpad, or buttons.

The acceleration input unit 721*c* receives an input for accelerating the vehicle 700 from the user. The brake input unit 721*d* receives an input for decelerating the vehicle 700 from the user. The acceleration input unit 721*c* and the brake input unit 721*d* may be provided in the form of pedals. According to an embodiment, the acceleration input unit 721*c* or the brake input unit 721*d* may alternatively be provided in the form of a touchscreen, a touchpad, or buttons.

The camera 722 may include an image sensor and an image processing module. The camera 722 may process a still image or a moving image obtained by the image sensor (e.g., a complementary metal oxide semiconductor (CMOS) or a charge-coupled device (CCD)). The image processing module may extract necessary information by processing the still or moving image obtained by the image sensor, and transmit the extracted information to the ECU 770. Meanwhile, the vehicle 700 may include the camera 722 for capturing a front or peripheral part image of the vehicle 700, and an internal camera 722*c* for capturing an inside image of the vehicle 700. The internal camera 722*c* may obtain an image of passengers. The internal camera 722*c* may obtain an image for acquiring biometric information of the passengers.

The internal camera 722*c* may obtain an image of passengers riding in the vehicle 700, and detect the number of passengers.

The microphone 723 may process an external audio signal into electrical data. The processed data may be utilized in various ways based on a function currently performed by the vehicle 700. The microphone 723 may convert a voice command of the user into electrical data. The converted electrical data may be transmitted to the ECU 770.

Meanwhile, according to an embodiment, the camera 722 or the microphone 723 may not be included in the input unit 720 but may be included in the sensing unit 760.

The user input unit 724 is used to receive information from the user. If information is input through the user input unit 724, the ECU 770 may control operation of the vehicle 700 to correspond to the input information. The user input unit 724 may include a touch input unit or a mechanical input unit. According to an embodiment, the user input unit 724 may be provided on a partial region of a steering wheel. In this case, the driver may manipulate the user input unit 724 with fingers while gripping the steering wheel.

The sensing unit 760 senses signals related to, for example, driving of the vehicle 700. To this end, the sensing unit 760 may include a crash sensor, a wheel sensor, a speed sensor, a tilt sensor, a weight sensor, a heading sensor, a yaw sensor, a gyro sensor, a position module, a vehicle drive/reverse sensor, a battery sensor, a fuel sensor, a tire sensor, a steering sensor, a vehicle internal temperature sensor, a vehicle internal humidity sensor, an ultrasonic sensor, a radar, LiDAR, etc.

As such, the sensing unit 760 may acquire sensing signals related to vehicle crash information, vehicle direction information, vehicle location information (e.g., GPS information), vehicle angle information, vehicle speed information, vehicle acceleration information, vehicle tilt information, vehicle drive/reverse information, battery information, fuel information, tire information, vehicle lamp information, vehicle internal temperature information, vehicle internal humidity information, steering wheel rotation angle, etc.

Meanwhile, the sensing unit 760 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), etc.

The sensing unit 760 may include a biometric information detection unit. The biometric information detection unit senses and acquires biometric information of the driver. The biometric information may include fingerprint information, iris-scan information, retina-scan information, hand geometry information, facial recognition information, and voice recognition information. The biometric information detection unit may include a sensor for sensing the biometric information of the driver. Here, the internal camera 722c and the microphone 723 may operate as sensors. The biometric information detection unit may acquire the hand geometry information and the facial recognition information through the internal camera 722c.

The output unit 740 is used to output information processed by the ECU 770, and may include a display unit 741, an audio output unit 742, and a haptic output unit 743.

The display unit 741 may display the information processed by the ECU 770. For example, the display unit 741 may display vehicle information. Here, the vehicle information may include vehicle control information for directly controlling the vehicle 700, or driver assist information for providing driving guide service to the driver of the vehicle 700. In addition, the vehicle information may include vehicle state information indicating a current state of the vehicle 700, or vehicle driving information related to driving of the vehicle 700.

The display unit 741 may include at least one of a liquid crystal display (LCD), a thin film transistor-liquid crystal display (TFT LCD), an organic light-emitting diode (OLED), a flexible display, a 3-dimensional (3D) display, and an electrophoretic ink (e-ink) display.

The display unit 741 may be layered on or integrated with a touch sensor, and thus may implement a touchscreen. The touchscreen may serve as the user input unit 724 for providing an input interface between the vehicle 700 and the user and, at the same time, provide an output interface between the vehicle 700 and the user. In this case, the display unit 741 may include a touch sensor for sensing touch on the display unit 741, and thus may receive a control command input using touch. As such, if the display unit 741 is touched, the touch sensor may sense the touch and the ECU 770 may generate a control command corresponding to the touch. An input using touch may be, for example, text, a number, or a menu item which can be indicated or specified in various modes.

Meanwhile, the display unit 741 may include a cluster such that the driver may check the vehicle state information or the vehicle driving information immediately after the driver starts driving. The cluster may be provided on a dashboard. In this case, the driver may check the information displayed on the cluster while continuously looking ahead.

Meanwhile, according to an embodiment, the display unit 741 may be implemented as a head up display (HUD). If the display unit 741 is implemented as a HUD, the display unit 741 may output the information using a transparent display included in the windshield. Alternatively, the display unit 741 may include a projection module and thus may output the information using an image projected onto the windshield.

The audio output unit 742 converts an electrical signal received from the ECU 770, into an audio signal, and outputs the audio signal. To this end, the audio output unit 742 may include, for example, a speaker. The audio output unit 742 may also output sound corresponding to operation of the user input unit 724.

The haptic output unit 743 generates a haptic output. For example, the haptic output unit 743 may vibrate the steering wheel, a seat belt, or a seat to make the user recognize the output.

The vehicle driving unit 750 may control operations of various apparatuses of the vehicle 700. The vehicle driving unit 750 may include a power source driving unit 751, a steering driving unit 752, a brake driving unit 753, a lamp driving unit 754, an air-conditioner driving unit 755, a window driving unit 756, an airbag driving unit 757, a sunroof driving unit 758, and a suspension driving unit 759.

The power source driving unit 751 may electronically control a power source of the vehicle 700.

For example, if an engine (not shown) based on fossil fuel is the power source, the power source driving unit 751 may electronically control the engine. As such, the power source driving unit 751 may control, for example, an output torque of the engine. When the power source driving unit 751 is an engine, the power source driving unit 751 may limit the speed of the vehicle 700 by restricting an output torque of the engine under control of the ECU 770.

As another example, if a motor (not shown) based on electricity is a power source, the power source driving unit 751 may control the motor. As such, the power source driving unit 751 may control, for example, the speed and torque of the motor.

The steering driving unit 752 may electronically control a steering apparatus of the vehicle 700. As such, the steering driving unit 752 may steer the vehicle.

The brake driving unit 753 may electronically control a brake apparatus (not shown) of the vehicle 700. For example, the brake driving unit 753 may control operation of brakes provided to wheels, and thus reduce the speed of the vehicle 700. As another example, the brake driving unit 753 may differently control operations of brakes provided to a left wheel and a right wheel, and thus may adjust the driving direction of the vehicle 700 to the left or right.

The lamp driving unit 754 may control lamps provided inside or outside the vehicle 700, to be turned on or off. In addition, the lamp driving unit 754 may control, for example, the intensity and direction of light provided by the lamps. For example, the lamp driving unit 754 may control turn signal lights and brake lights.

The air-conditioner driving unit 755 may electronically control an air-conditioner (not shown) of the vehicle 700. For example, if the temperature inside the vehicle 700 is high, the air-conditioner driving unit 755 may control the air-conditioner to supply cool air into the vehicle 700.

The window driving unit 756 may electronically control a window apparatus of the vehicle 700. For example, the window driving unit 756 may control left and right windows of the vehicle 700 to be opened or closed.

The airbag driving unit 757 may electronically control an airbag apparatus of the vehicle 700. For example, the airbag driving unit 757 may control an airbag to inflate when the vehicle 700 crashes.

The sunroof driving unit 758 may electronically control a sunroof apparatus (not shown) of the vehicle 700. For example, the sunroof driving unit 758 may control the sunroof to be opened or closed.

The suspension driving unit 759 may electronically control a suspension apparatus (not shown) of the vehicle 700. For example, the suspension driving unit 759 may control the suspension apparatus on a bumpy road to reduce impact applied to the vehicle 700.

The memory 730 is electrically connected to the ECU 770. The memory 730 may store basic data about each element, control data for controlling operation of each element, and input and output data. The memory 730 may include a variety of storage apparatuses such as a read-only memory (ROM), a random access memory (RAM), an erasable programmable read-only memory (EPROM), a flash drive, and a hard drive, in terms of hardware. The memory 730 may store various types of data for overall operation of the vehicle 700, e.g., programs for process or control operations of the ECU 770.

The interface 780 may serve as a path to various external devices connected to the vehicle 700. For example, the interface 780 may include a port connectable to the mobile terminal 100, and may be connected through the port to the mobile terminal 100. In this case, the interface 780 may exchange data with the mobile terminal 100.

Meanwhile, the interface 780 may serve as a path for supplying electrical energy to the connected mobile terminal 100. If the mobile terminal 100 is electrically connected to the interface 780, the interface 780 provides electrical energy supplied from the power source unit 790, to the mobile terminal 100 under control of the ECU 770.

The ECU 770 may control overall operations of elements of the vehicle 700.

The ECU 770 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for performing other functions, in terms of hardware.

The power source unit 790 may supply power necessary for operation of each element under control of the ECU 770. Particularly, the power source unit 790 may receive power supplied from, for example, a battery (not shown) of the vehicle 700.

The display apparatus 400 may exchange data with the ECU 770. The ECU 770 may receive navigation information from the display apparatus 400 or a separate navigation apparatus (not shown). Here, the navigation information may include destination information, route information to the destination, and map information or vehicle location information related to driving of the vehicle 700.

The display apparatus 400 may also be called an audio/video/navigation (AVN) apparatus.

The display apparatus 400 may include a touchscreen and thus operate as an in-vehicle input apparatus. In this case, the user input unit 724, the display unit 741, and the audio output unit 742 may be integrated with the display apparatus 400.

Figure 3:
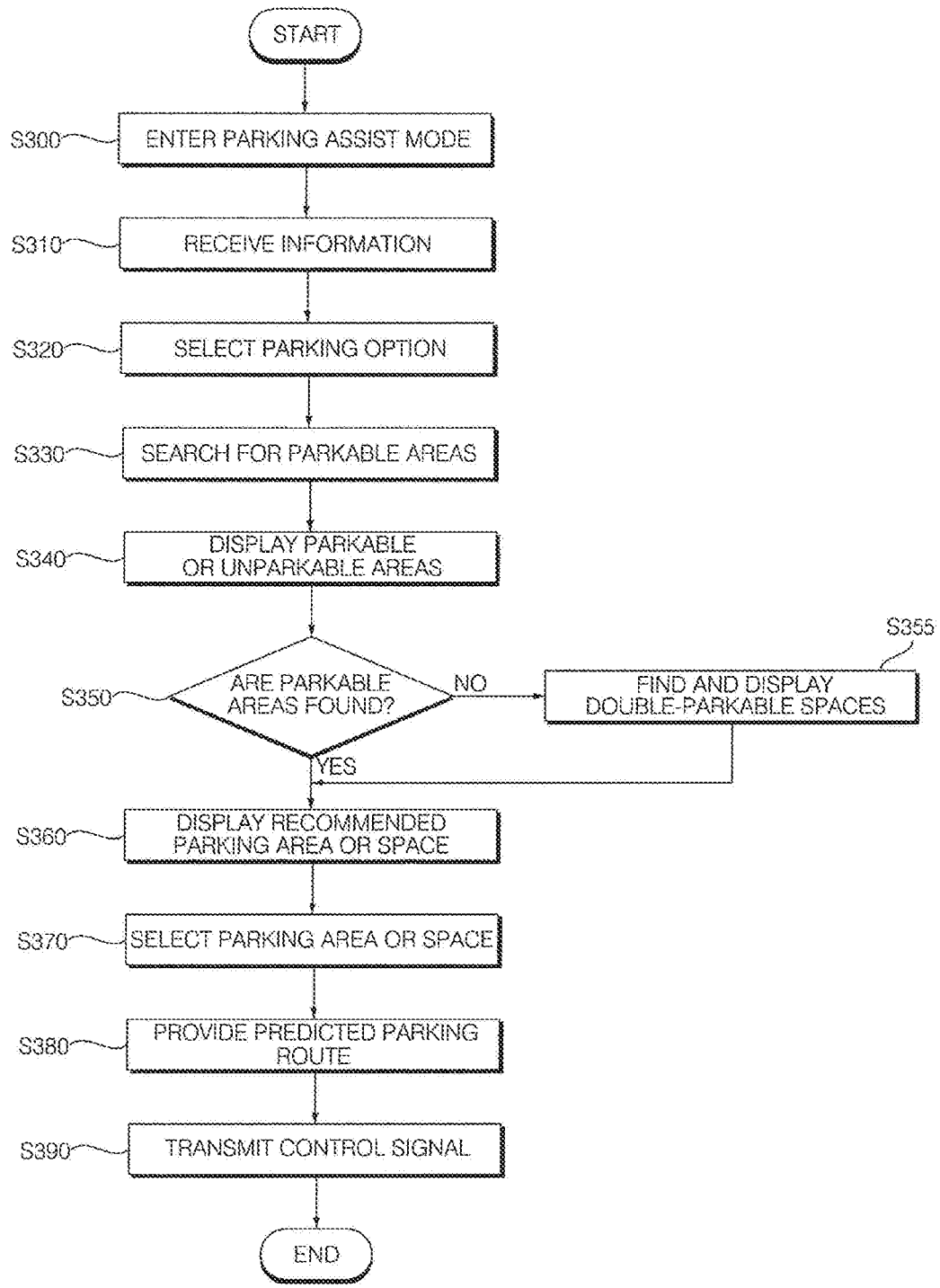
FIG. 3 is a flowchart for describing an operation for controlling a mobile terminal, according to an embodiment of the present invention.

FIG. 3 is a flowchart for describing an operation for controlling the mobile terminal 100, according to an embodiment of the present invention.

In the following description, user input may be touch input provided on the display unit 151 including a touchscreen, or voice input provided through the microphone 122.

Meanwhile, in the following description, a parking area may refer to a parking space defined by parking lines. The parking space may include a parking space not defined by parking lines, and the parking area.

Referring to FIG. 3, the controller 180 may enter a parking assist mode (S300).

The controller 180 may enter the parking assist mode based on an image obtained by the camera 121. The controller 180 may enter the parking assist mode through traffic sign recognition (TSR).

For example, the controller 180 may detect a graphic parking sign or a text parking sign in the image obtained by the camera 121. The controller 180 may determine a parking situation based on the detected graphic or text parking sign. In this case, the controller 180 may enter the parking assist mode.

The controller 180 may enter the parking assist mode by receiving user input.

For example, if touch input or voice input of the user for entering the parking assist mode is received, the controller 180 may enter the parking assist mode.

After the controller 180 enters the parking assist mode, the controller 180 may receive information (S310). Here, the information may include passenger information, driver/vehicle information, parking regulation information, or user-preferred parking space information.

The controller 180 may receive the passenger information acquired through the first camera 121*a*.

The first camera 121*a* may obtain an inside image of the vehicle 700. The controller 180 may detect passengers in the inside image of the vehicle 700. The controller 180 may acquire the passenger information based on the detected passengers.

The controller 180 may receive the driver/vehicle information through user input.

For example, the controller 180 may receive information indicating a disabled driver or a female driver, through user input. Alternatively, the controller 180 may receive information indicating whether the vehicle 700 is for a disabled driver or a female driver, through user input.

The controller 180 may detect the location of the vehicle 700 through the location information module 115, and receive the parking regulation information from an external device based on a country and a region where the vehicle 700 is located. In this case, the controller 180 may be connected to the external device through the mobile communication module 112 or the wireless Internet module 113.

The controller 180 may receive the user-preferred parking space information through user input.

For example, the controller 180 may receive information indicating rapid parking, parking near an entrance, parking in shade, or parking next to a pillar.

For example, the controller 180 may receive user input for excluding the vicinity of luxury vehicles from the parking space. In this case, the controller 180 set the luxury vehicles based on vehicle manufacturers, vehicle models, etc.

Meanwhile, the controller 180 may assist parking based on the user-preferred parking space information. In this case, the controller 180 may detect an object using a 3D map. The 3D map may be built using an image obtained by the camera 121, and a motion sensor 143.

If rapid parking is input, the controller 180 may perform parking assist operation for parking the vehicle 710 in a parkable area which is detected first.

If parking near an entrance is input, the controller 180 may perform parking assist operation for parking the vehicle 710 in a parkable area which is closest to an entrance detected in the image or on the 3D map.

If parking in shade is input, the controller 180 may perform parking assist operation for parking the vehicle 710 in shaded parkable area which is detected in the image or on the 3D map. Alternatively, the controller 180 may detect a tree or a building in the vicinity of the vehicle 700, detect the location or a bearing of the vehicle 700 through the location information module 115, and perform parking assist operation for parking the vehicle 710 in a parkable area predicted to be shaded.

If parking next to a pillar is input, the controller 180 may perform parking assist operation for parking the vehicle 710 in shaded parkable area which is located next to (e.g., at the right or left side of) a pillar detected in the image or on the 3D map.

After the information is received, the controller 180 may select a parking option (S320).

The controller 180 may display a parking menu.

The controller 180 may display a selectable parking item on the display unit 151 based on the passenger information.

The controller 180 may display the parking menu including a parking item generated by default. For example, the parking menu may include an automatic parking item by default. For example, the parking menu may include a parking item for enabling opening of a trunk when parked, by default. In this case, the controller 180 may display the automatic parking item or the trunk open parking item on the display unit 151.

The controller 180 may display the parking menu including a parking item generated based on the received information. For example, the controller 180 may determine whether a right door of the vehicle 700 needs to be opened, based on the passenger information. If the right door needs to be opened, the parking menu may include a parking item for enabling opening of the right door after parking is completed. In this case, the controller 180 may display the right door open parking item on the display unit 151.

Meanwhile, the controller 180 may display predicted parking time information on a partial region of the parking menu. When the vehicle 700 enters a parking lot, the mobile terminal 100 may acquire parking information indicated by a sign near the entrance of the parking lot. Specifically, the camera 121 may obtain an image including the parking information. The controller 180 may detect the parking information by processing the obtained image. The parking information may include information indicating the floors, locations, or number of parkable areas. The controller 180 may calculate an approximate predicted parking time based on the detected parking information. For example, the controller 180 may calculate the approximate predicted parking time based on the floor and location of parkable areas. The controller 180 may display the calculated predicted parking time information.

After the parking menu is displayed, the controller 180 may receive user input for selecting one item of the parking menu.

After the parking option is selected, the controller 180 may search for parkable areas (S330). The controller 180 may search for the parkable areas corresponding to the selected parking option. Alternatively, the controller 180 may search for the parkable areas based on the information received in step S310.

The controller 180 may detect parkable areas matching an overall width of the vehicle 700, which is prestored in the memory 170. Here, the overall width may be prestored through user input.

The controller 180 may search for the parkable areas matching the overall width of the vehicle 700 by detecting the distances among a plurality of objects.

The controller 180 may detect the distances among the objects using disparity or time of flight (TOF) values. Here, the objects may include a plurality of parked vehicles, a plurality of pillars, or both.

The controller 180 may determine the parkable areas by comparing the overall width of the vehicle 700 and the distances among the objects. For example, if the distance between objects is greater than a sum of the overall width of the vehicle 700 and a length necessary when the passengers get out, the controller 180 may determine a corresponding area as the parkable area.

The controller 180 may search for the parkable areas within a certain space. For example, the controller 180 may search for the parkable areas within the parking lot. Here, one or more parkable areas may be found.

After the parkable areas are found, the controller 180 may display the parkable areas or unparkable areas on the display unit 151 (S340).

The controller 180 may overlay the parkable or unparkable areas on the image captured by the camera 121.

The controller 180 may display parkable area information using indicators.

The controller 180 may display areas determined as being parkable based on the distances among the objects and the overall width among parking areas, using first indicators. In addition, the controller 180 may display areas determined as being unparkable based on the distances among the objects and the overall width among the parking areas, using second indicators. The first and second indicators may have different shapes and colors.

The controller 180 may display an indicator indicating the parkable area information on each parkable area, and display distance information between objects near the indicator. For example, if a parkable area is located between a first parked vehicle and a second parked vehicle, the controller 180 may display an indicator indicating the parkable area, and display distance information between the first and second parked vehicles near the indicator.

The controller 180 may display the distance information between the first and second parked vehicles using a vehicle image. In this case, the vehicle image may indicate distance information based on an opening degree of doors.

Meanwhile, after the parkable or unparkable areas are overlaid on the image, if the vehicle 700 moves, a certain indicator may not be displayed on the image in some cases. That is, if the vehicle 700 has passed a parkable area, the controller 180 may not display an indicator corresponding thereto on the image. In this case, the controller 180 may display the parkable area information using text. If the vehicle 700 has passed the parkable area by about 20 m, the controller 180 may display information indicating that the parkable area is 20 m behind.

If no parkable area is found (S350), the controller 180 may find and display double-parkable spaces on the display unit 151 (S355).

If no parking area defined by parking lines is parkable, the controller 180 may find the double-parkable spaces. The controller 180 may check a space necessary when a parked vehicle leaves a parking area, and detect a space which does not block the checked space, as a double-parkable space.

The controller 180 may display the found double-parkable spaces on the display unit 151.

The controller 180 may provide a recommended parking area or a recommended parking space among the parkable areas displayed in step S340 or the double-parkable spaces displayed in step S355 (S360). The controller 180 may display the recommended parking area or space on the display unit 151.

The controller 180 may provide the recommended parking area or space based on the information received in step S310.

For example, the controller 180 may provide the recommended parking area or space based on the information indicating a disabled driver or a female driver.

For example, the controller 180 may provide the recommended parking area or space based on the information indicating whether the vehicle 700 is for a disabled driver or a female driver.

For example, the controller 180 may provide the recommended parking area or space based on the parking regulation information.

For example, the controller 180 may provide the recommended parking area or space based on the user-preferred parking space information.

Meanwhile, the memory 170 may store a parking route or a parking pattern of the user. The parking route or pattern of the user may be stored in an accumulative manner. In this case, the controller 180 may provide the recommended parking area or space based on the parking route or pattern stored in the memory 170.

For example, the controller 180 may determine a user-preferred parking area based on analysis of image data obtained during parking, and provide the recommended parking area based on the determined user-preferred parking area.

For example, the controller 180 may determine whether the driver is experienced, based on a time taken for parking, and provide a parking area near an entrance as the recommended parking area even when the parking area has a small width if the driver is experienced.

After that, the controller 180 may select a parking area or a parking space (S370).

If user input for selecting a parking area is received, the controller 180 may select a parkable area corresponding to the user input, as the parking area.

If user input for selecting a parking space is received, the controller 180 may select a parkable space corresponding to the user input, as the parking space.

After the parking area or space is selected, the controller 180 may provide a predicted parking route to the selected parking area or space (S380).

The controller 180 may provide a predicted trajectory of wheels corresponding to a route for parking the vehicle 710 in the selected parking area, through the display unit 151.

For example, the controller 180 may display a predicted trajectory of wheels corresponding to a head-in parking route to the selected parking area, on the display unit 151.

For example, the controller 180 may display a predicted trajectory of wheels corresponding to a back-in parking route to the selected parking area, on the display unit 151.

If the user directly parks in the selected parking area or space, the vehicle 700 may be parked along the predicted trajectory of the wheels. In this case, even a driver who is not experienced in parking may easily park the vehicle 700.

After that, the controller 180 may transmit a control signal for parking the vehicle 700 in the selected parking area or space, to the vehicle 700 (S390). The controller 180 may transmit the control signal through the interface unit 160 or the short-range communication module 114.

For automatic parking, the vehicle 700 may be parked in the selected parking area or space based on the received control signal. For example, the ECU 770 may park the vehicle 700 by controlling the power source driving unit 751, the steering driving unit 752, and the brake driving unit 753 based on the received control signal.

Figure 4A:
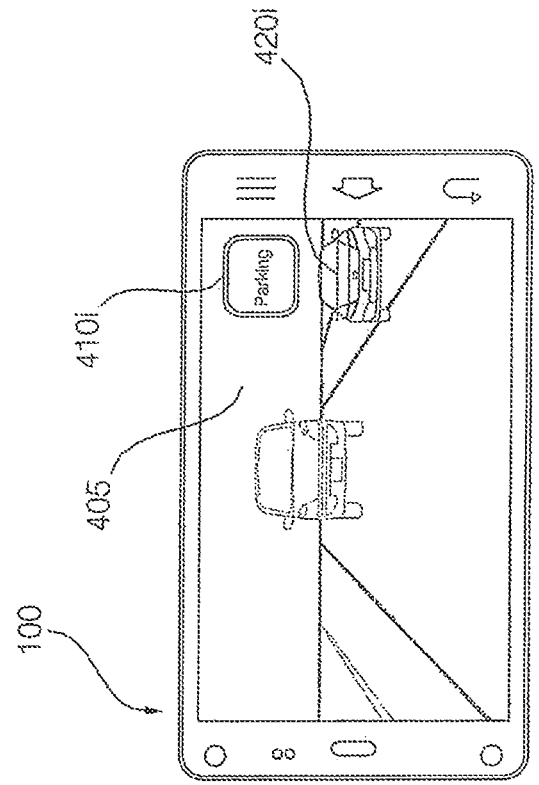
Figure 4A:
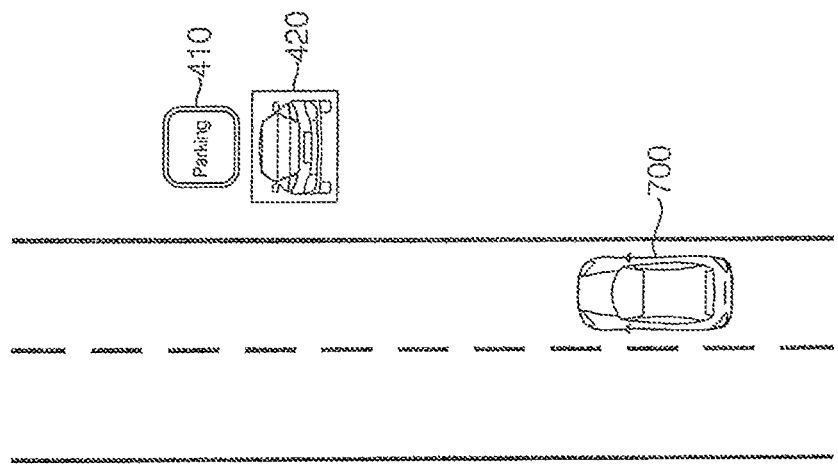

FIGS. 4A and 4B are schematic diagrams for describing an operation for entering a parking assist mode, according to embodiments of the present invention.

Referring to FIG. 4A, the controller 180 may enter the parking assist mode based on an image obtained by the camera 121. The controller 180 may enter the parking assist mode through TSR.

The mobile terminal 100 may be attached to a part of the wind shield of the vehicle 700. The camera 121 of the mobile terminal 100 may obtain an image 405 of a front part of the vehicle 700. The mobile terminal 100 may display the obtained image 405 on the display unit 151.

The controller 180 may detect a graphic parking sign 420 or a text parking sign 410 by computer-processing the image 405. That is, the controller 180 may detect a graphic parking sign image 420*i* or a text parking sign image 410*i* in the obtained image 405. In this case, the controller 180 may determine a parking situation and enter the parking assist mode.

Referring to FIG. 4B, the controller 180 may enter the parking assist mode by receiving user input.

If touch input on an icon 430 for executing the parking assist mode is received through the display unit 151, the controller 180 may enter the parking assist mode.

If voice input 440 of the user for executing the parking assist mode is received through the microphone 122, the controller 180 may enter the parking assist mode.

Meanwhile, if the controller 180 enters the parking assist mode, the controller 180 may output a parking assist mode entry event to the user. The controller 180 may output the event visibly through the display unit 151, audibly through the audio output module 152, or tactually through the haptic module 153.

Figure 5:
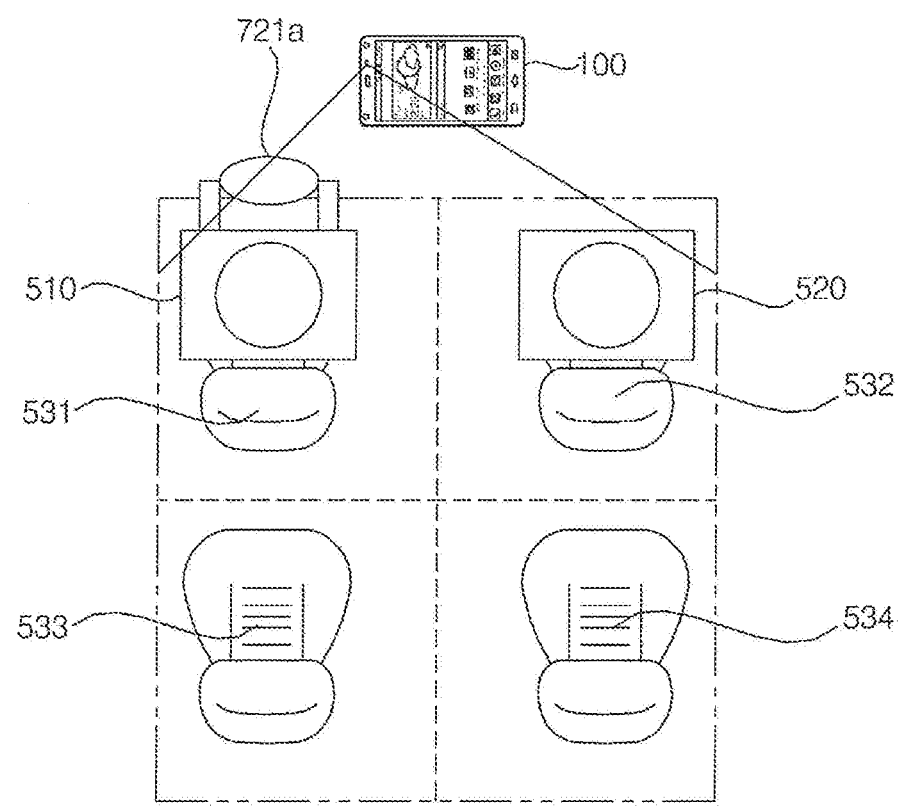
FIG. 5 is a schematic diagram for describing an operation for acquiring information, according to an embodiment of the present invention.

FIG. 5 is a schematic diagram for describing an operation for acquiring information, according to an embodiment of the present invention.

Referring to FIG. 5, the mobile terminal 100 may be attached in such a manner that the first camera 121a is capable of capturing an inside image of the vehicle 700.

The first camera 121a may obtain an inside image of the vehicle 700. The controller 180 may detect passengers 510 and 520 by computer-processing the obtained image. The controller 180 may acquire passenger information based on the detected passengers 510 and 520.

The controller 180 may generate a selectable parking menu based on the passenger information. For example, the controller 180 may determine whether a right door of the vehicle 700 needs to be opened, based on the passenger information. If the right door needs to be opened, the parking menu may include a parking item for enabling opening of the right door after parking is completed.

A parking width required for parking may be determined based on whether the right door of the vehicle 700 needs to be opened. That is, if the right door of the vehicle 700 needs to be opened, the minimum parking width necessary when left and right doors of the vehicle 700 are opened and the passengers 510 and 520 get out may be required.

The controller 180 may determine parkable areas based on the minimum parking width necessary when the left and right doors of the vehicle 700 are opened and the passengers 510 and 520 get out.

Meanwhile, in the following description, a driver's seat is referred to as a first seat 531, a passenger seat next to the driver's seat is referred to as a second seat 532, a back seat behind the driver's seat is referred to as a third seat 533, and a back seat behind the passenger seat is referred to as a fourth seat 534.

That is, the first seat 531 is a front left seat, the second seat 532 is a front right seat, the third seat 533 is a back left seat, and the fourth seat 534 is a back right seat.

FIGS. 6A to 6D are schematic diagrams for describing various parking menus according to embodiments of the present invention.

Figure 6A:
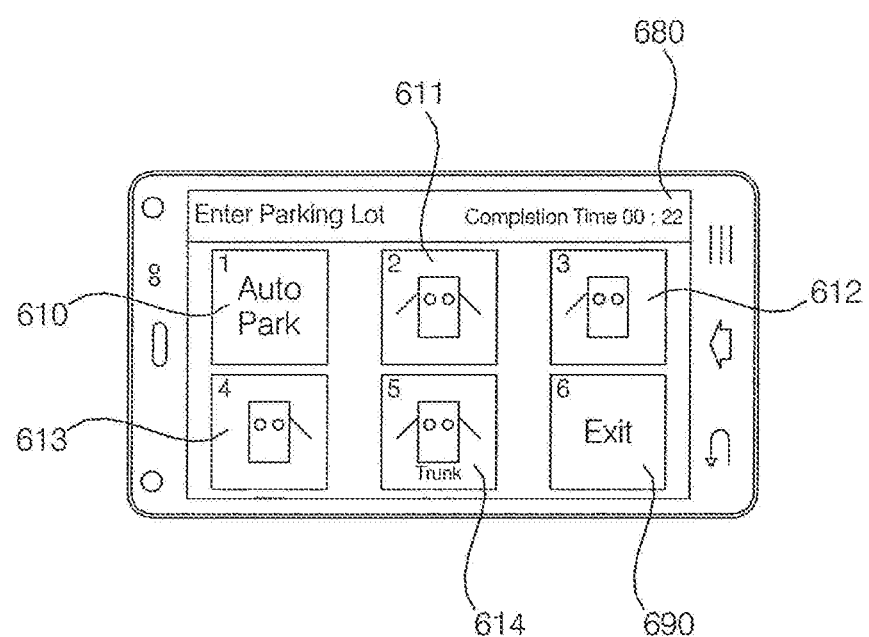
FIGS. 6A to 6D are schematic diagrams for describing various parking menus according to embodiments of the present invention.

As illustrated in FIG. 6A, the controller 180 may detect passengers sitting on the first and second seats 531 and 532 in an inside image of the vehicle 700. In this case, the controller 180 may provide a parking menu based on the detected passengers.

The parking menu may include an automatic parking item 610 and a next item 690 by default. In addition, the parking menu may include a parking item 614 for enabling opening of a trunk when parked, by default.

The parking menu may include a parking item 611 considering opening of doors next to the first and second seats 531 and 532, a parking item 612 considering opening of the door next to the first seat 531, a parking item 613 considering opening of the door next to the second seat 532, and the parking item 614 considering opening of the doors next to the first and second seats 531 and 532 and opening of the trunk.

The controller 180 may display the parking menu on the display unit 151. The controller 180 may receive user input for selecting one item of the displayed parking menu. If no user input is received for a preset time, the controller 180 may select the parking item 612 considering opening of the door next to the first seat 531.

Meanwhile, the controller 180 may display predicted parking time information 680 on a partial region of the parking menu.

Figure 6B:
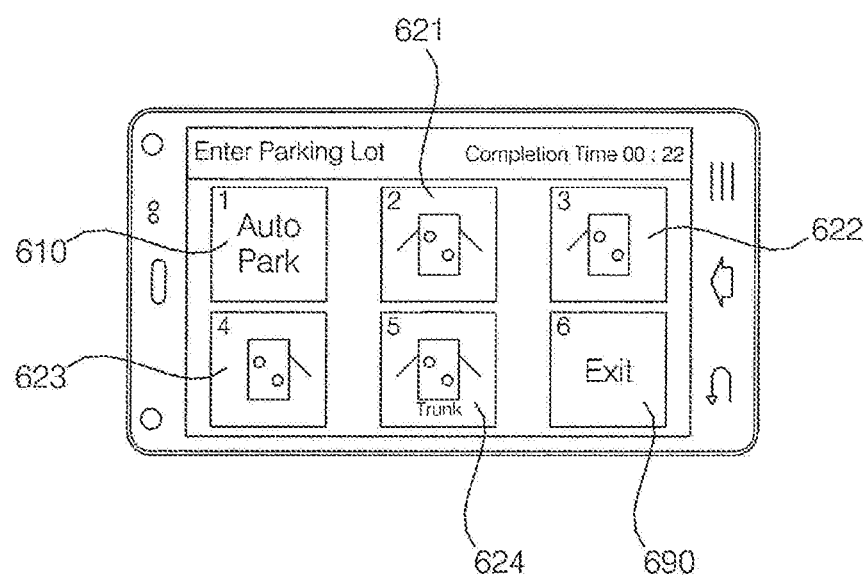

As illustrated in FIG. 6B, the controller 180 may detect passengers sitting on the first and fourth seats 531 and 534 in the inside image of the vehicle 700. In this case, the controller 180 may provide a parking menu based on the detected passengers.

The parking menu may include an automatic parking item 610 and an exit item 690 by default. In addition, the parking menu may include a parking item 624 for enabling opening of a trunk when parked, by default.

The parking menu may include a parking item 621 considering opening of doors next to the first and fourth seats 531 and 534, a parking item 622 considering opening of the door next to the first seat 531, a parking item 623 considering opening of the door next to the fourth seat 534, and the parking item 624 considering opening of the doors next to the first and fourth seats 531 and 534 and opening of the trunk.

The controller 180 may display the parking menu on the display unit 151. The controller 180 may receive user input for selecting one item of the displayed parking menu. If no user input is received for a preset time, the controller 180 may select the parking item 622 considering opening of the door next to the first seat 531.

Figure 6C:
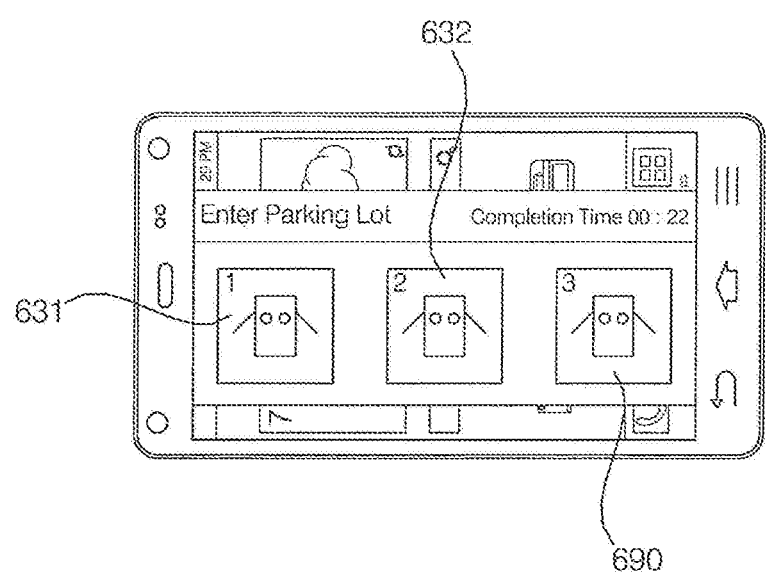

As illustrated in FIG. 6C, the controller 180 may detect a passenger sitting on the first seat 531 in the inside image of the vehicle 700. In this case, the controller 180 may provide a parking menu based on the detected passenger.

The parking menu may include an automatic parking item 610 and an exit item 690 by default. In addition, the parking menu may include a parking item 614 for enabling opening of a trunk when parked, by default.

The parking menu may include a parking item 631 considering opening of a door next to the first seat 531, and the parking item 632 considering opening of the door next to the first seat 531 and opening of the trunk.

The controller 180 may display the parking menu on the display unit 151. The controller 180 may receive user input for selecting one item of the displayed parking menu. If no user input is received for a preset time, the controller 180 may select the parking item 631 considering opening of the door next to the first seat 531.

Figure 6D:
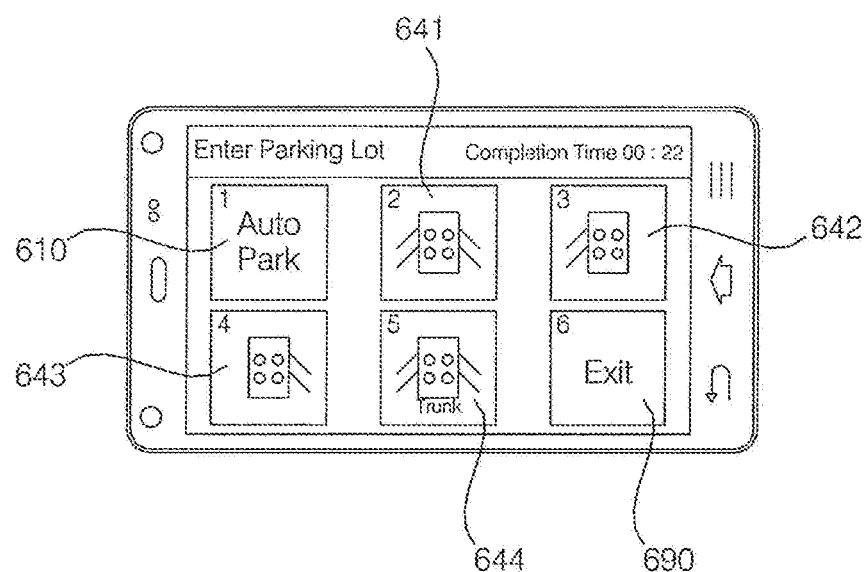

As illustrated in FIG. 6D, the controller 180 may detect passengers sitting on the first to fourth seats 531, 532, 533, and 534 in the inside image of the vehicle 700. In this case, the controller 180 may provide a parking menu based on the detected passengers.

The parking menu may include an automatic parking item 610 and an exit item 690 by default. In addition, the parking menu may include a parking item 644 for enabling opening of a trunk when parked, by default.

The parking menu may include a parking item 641 considering opening of doors next to the first to fourth seats 531, 532, 533, and 534, a parking item 642 considering opening of the doors next to the first and third seats 531 and 533, a parking item 643 considering opening of the doors next to the second and fourth seats 532 and 534, and the parking item 644 considering opening of the doors next to the first to fourth seats 531, 532, 533, and 534 and opening of the trunk.

The controller 180 may display the parking menu on the display unit 151. The controller 180 may receive user input for selecting one item of the displayed parking menu. If no user input is received for a preset time, the controller 180 may select the parking item 642 considering opening of the doors next to the first and third seats 531 and 533.

Meanwhile, although not shown in FIGS. 6A to 6D, the controller 180 may detect a child car seat in the inside image of the vehicle 700, and provide a parking menu based on whether a child is sitting on the detected child car seat.

FIGS. 7A to 8C are schematic diagrams for describing an operation for detecting parkable areas, according to embodiments of the present invention.

FIGS. 7A to 7D are schematic diagrams for describing perpendicular parking (head-in parking or back-in parking).

Figure 7A:
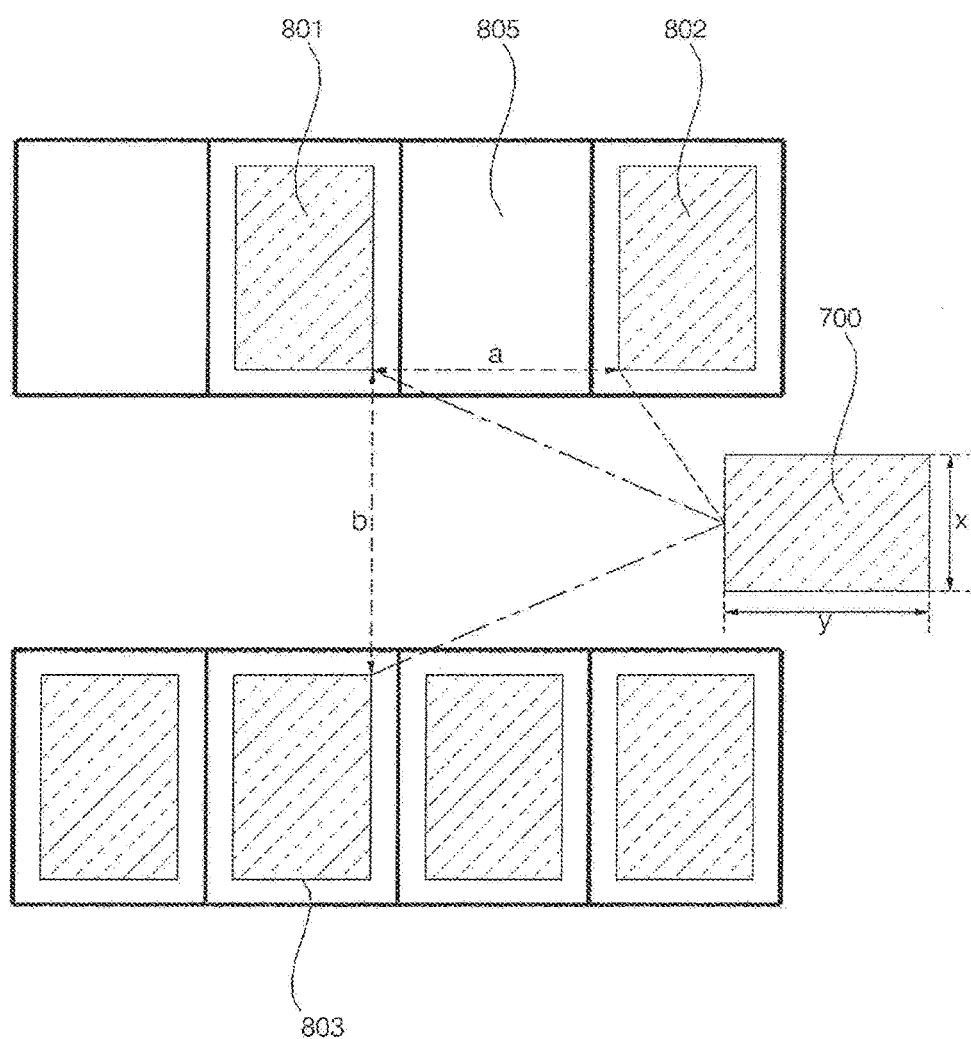
FIGS. 7A to 8C are schematic diagrams for describing an operation for detecting parkable areas, according to embodiments of the present invention.

Referring to FIG. 7A, the controller 180 may determine whether a first parking area 805 is a parkable area, by comparing an overall width x of the vehicle 700 and a distance a between a plurality of objects. The controller 180 may determine whether the first parking area 805 is a parkable area, by comparing the overall width x and an overall length y of the vehicle 700 and a distance b between a plurality of objects.

The memory 170 may store the overall width x and the overall length y of the vehicle 700. The overall width x and the overall length y may be input by the user.

The controller 180 may detect a plurality of objects 801, 802, and 803 in an image obtained by the camera 121. The objects 801, 802, and 803 may be parked vehicles.

The controller 180 may detect the distances among the objects 801, 802, and 803 using disparity or TOF values. For example, the controller 180 may detect the distance a between a first parked vehicle 801 and a second parked vehicle 802. For example, the controller 180 may detect the distance b between the first parked vehicle 801 and a third parked vehicle 803.

Figure 7B:
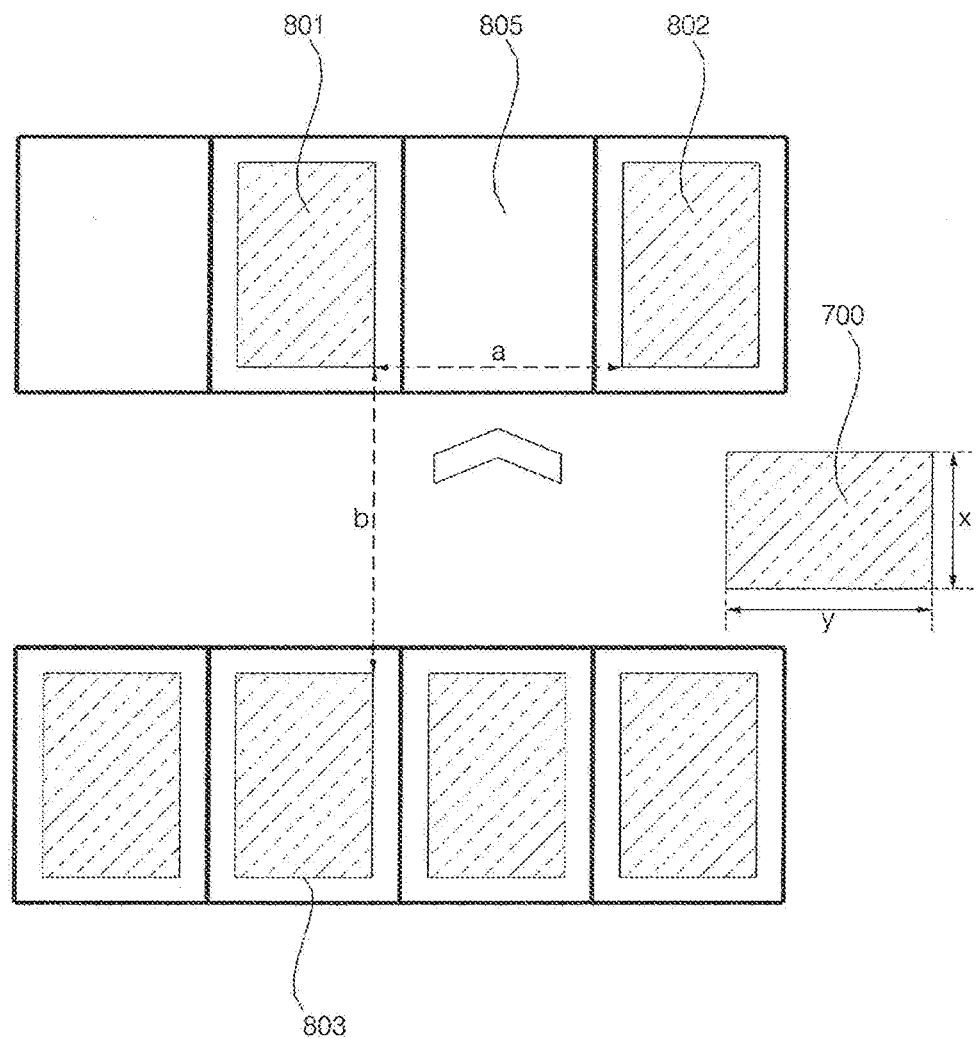

Referring to FIG. 7B, the controller 180 may determine whether the first parking area 805 is a parkable area, by comparing the overall width x and the distance a between the first and second parked vehicles 801 and 802 (hereinafter referred to as a first condition). If the distance a between the first and second parked vehicles 801 and 802 is greater than the overall width x by a first length k or more, the controller 180 may determine the first parking area 805 as a parkable area. Here, the first length k may be a length in which a space necessary when passengers get out is reflected. The first length k may be changed based on the passengers. The first length k may be changed based on whether a right door of the vehicle 700 needs to be opened. That is, the first length k in a case when the right door of the vehicle 700 needs to be opened may be greater than the first length k in a case when the right door of the vehicle 700 does not need to be opened.

The controller 180 may determine whether the first parking area 805 is a parkable area, by comparing the overall width x and the overall length y and the distance b between the first and third parked vehicles 801 and 803 (hereinafter referred to as a second condition). The controller 180 may calculate a necessary distance z for parking based on the overall width x and the overall length y. If the distance b between the first and third parked vehicles 801 and 803 is equal to or greater than the necessary distance z, the controller 180 may determine the first parking area 805 as a parkable area.

The controller 180 may determine the first parking area 805 as a parkable area only when the first and second conditions are satisfied.

Figure 7C:
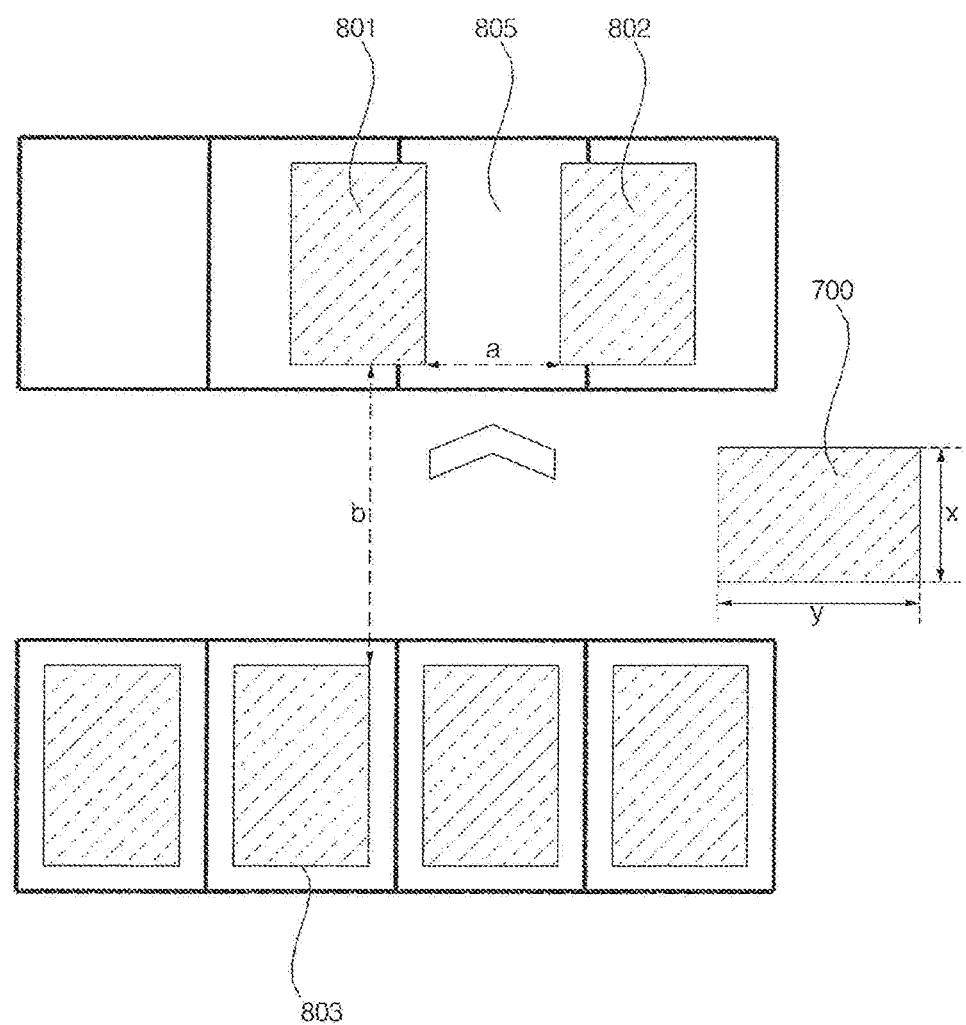

As illustrated in FIG. 7C, if the distance a between the first and second parked vehicles 801 and 802 is not greater than the overall width x by the first length k, the controller 180 may determine the first parking area 805 as an unparkable area.

Figure 7D:
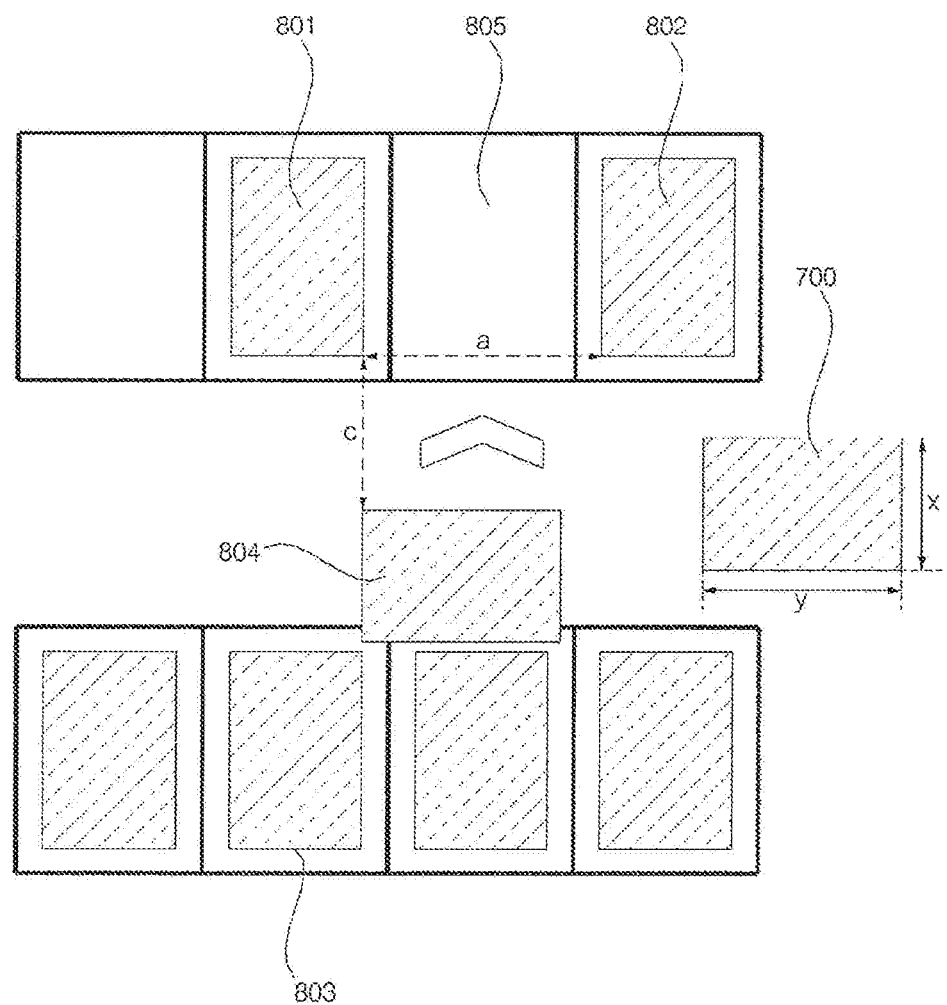

Meanwhile, as illustrated in FIG. 7D, a fourth parked vehicle 804 may be located between the first and third parked vehicles 801 and 803. In this case, the controller 180 may determine whether the first parking area 805 is a parkable area, based on a distance c between the first and fourth parked vehicles 801 and 804. If the distance c between the first and fourth parked vehicles 801 and 804 is less than the necessary distance z, the controller 180 may determine the first parking area 805 as an unparkable area.

Figure 8A:
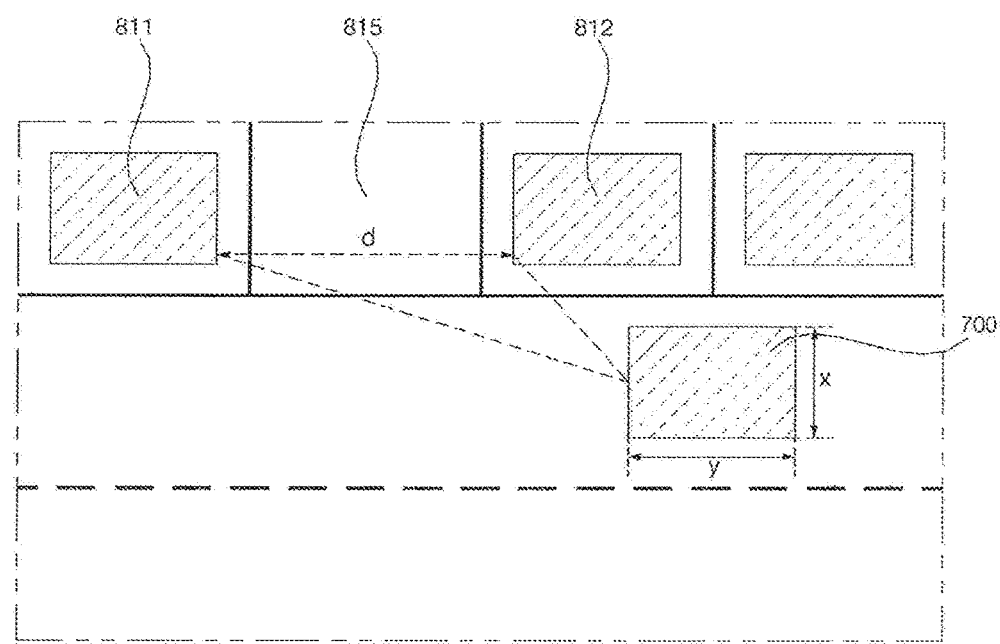
Figure 8B:
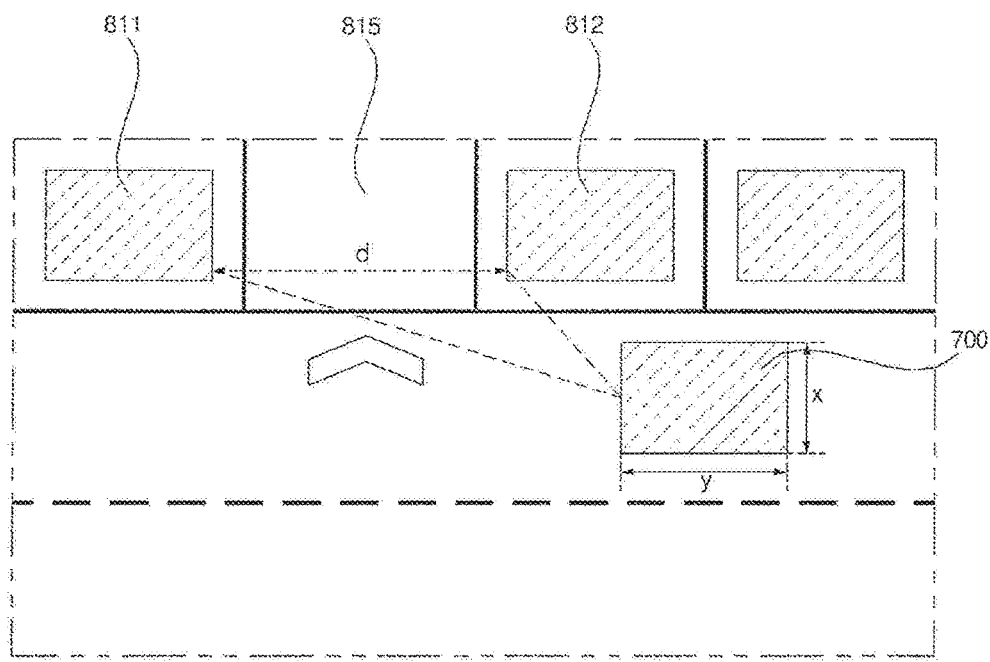
Figure 8C:
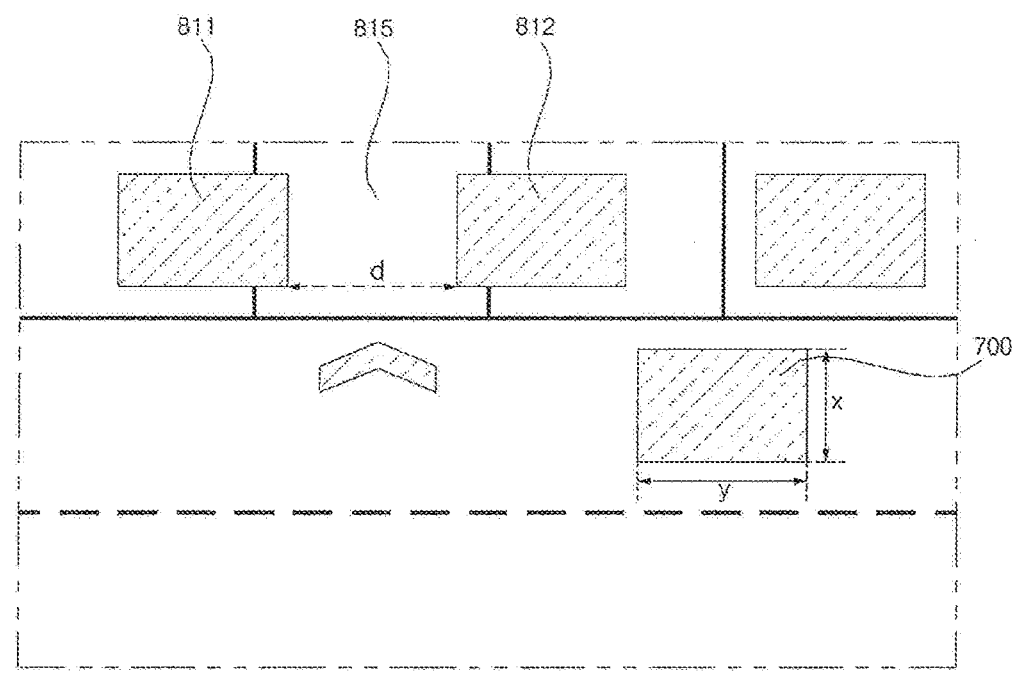

FIGS. 8A to 8C are schematic diagrams for describing parallel parking.

Referring to FIG. 8A, the controller 180 may determine whether a second parking area 815 is a parkable area, by comparing the overall length y of the vehicle 700 and a distance d between a plurality of objects.

The controller 180 may detect a plurality of objects 811 and 812 on an image obtained by the camera 121. The objects 811 and 812 may be parked vehicles.

The controller 180 may detect the distance between the objects 811 and 812 using a disparity or TOF value. For example, the controller 180 may detect the distance D between a fourth parked vehicle 811 and a fifth parked vehicle 812.

Referring to FIG. 8B, the controller 180 may determine whether the second parking area 815 is a parkable area, by comparing the overall length y and the distance d between the fourth and fifth parked vehicles 811 and 812.

If the distance d between the fourth and fifth parked vehicles 811 and 812 is greater than the overall length y by a second length l or more, the controller 180 may determine the second parking area 815 as a parkable area. Here, the second length l may be a length in which a space necessary for parallel parking is reflected in addition to the overall length y.

Referring to FIG. 8C, if the distance d between the fourth and fifth parked vehicles 811 and 812 is not greater than the overall length y by the second length l, the controller 180 may determine the second parking area 815 as an unparkable area.

Meanwhile, the controller 180 may determine whether parking areas are perpendicular parking areas or parallel parking areas, by detecting how other vehicles are parked on the image.

Figure 9A:
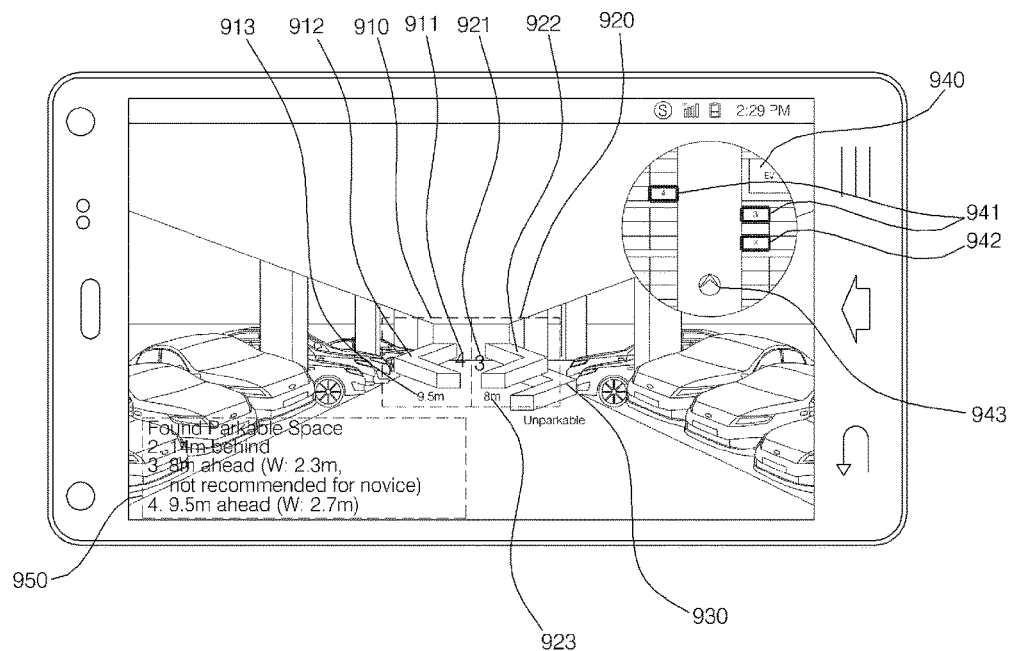
FIGS. 9A to 9C are schematic diagrams for describing an operation for displaying parkable areas or unparkable areas, according to embodiments of the present invention.
Figure 9B:
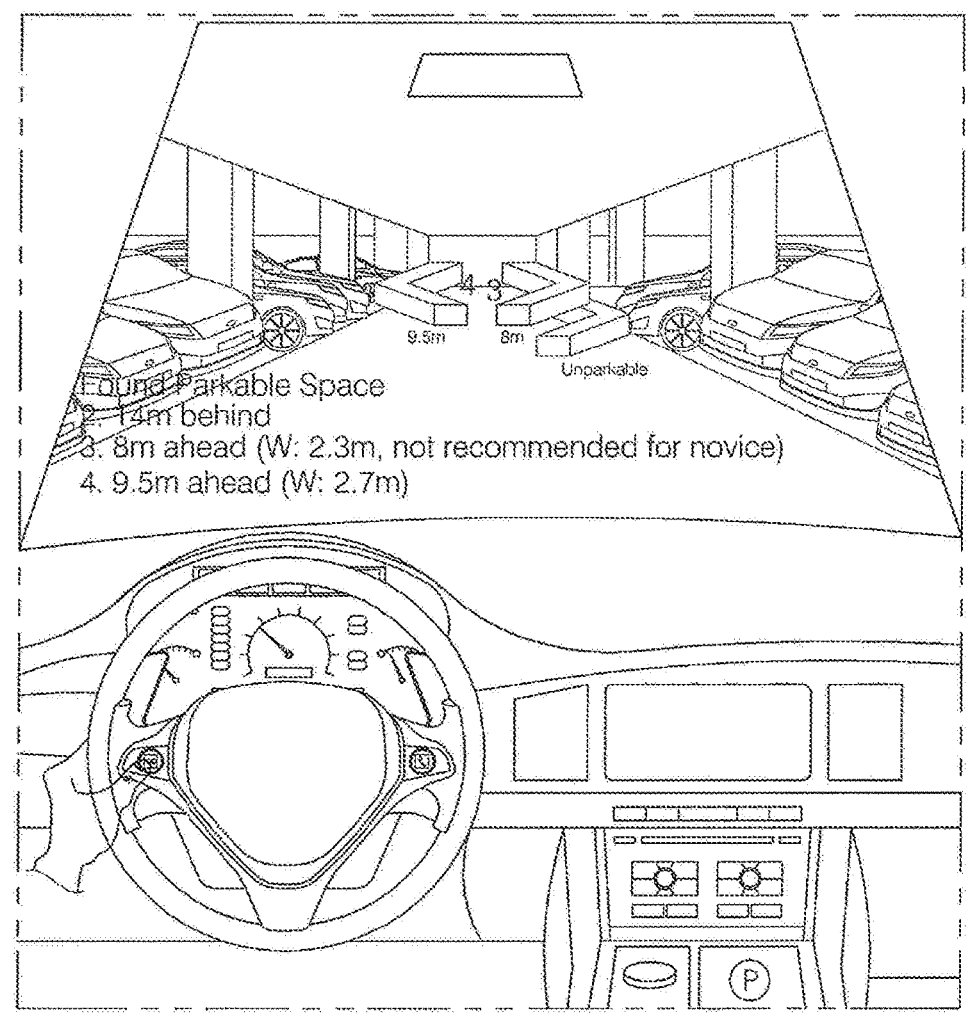
Figure 9C:
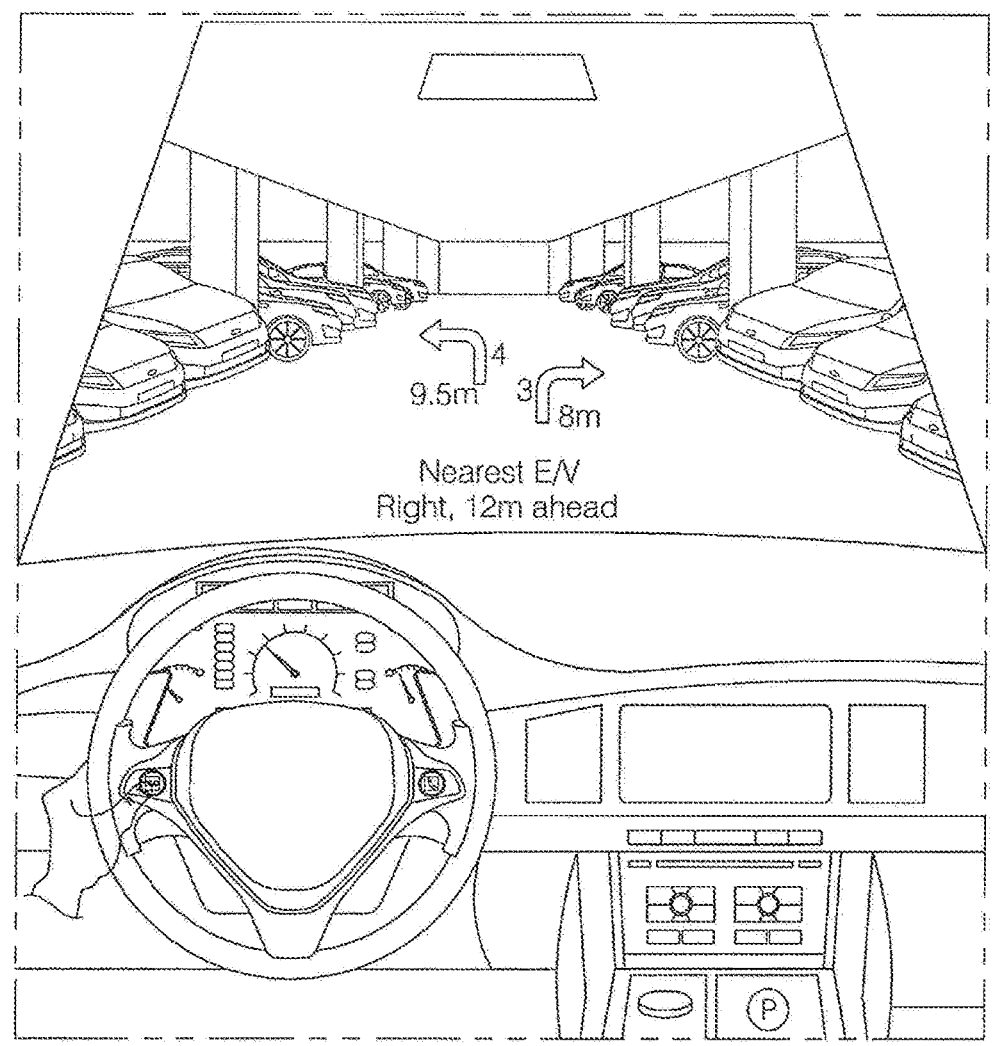

FIGS. 9A to 9C are schematic diagrams for describing an operation for displaying parkable areas or unparkable areas, according to embodiments of the present invention.

FIG. 9A exemplary illustrates an operation for displaying the parkable or unparkable areas on the display unit 151.

Referring to FIG. 9A, the controller 180 may display an image obtained by the camera 121, on the display unit 151. The controller 180 may overlay parkable area information 910 and 920 or unparkable area information 930 on the image.

The unparkable area may refer to a parking area in which no vehicle is parked but the vehicle 700 cannot park because the distance between objects located at sides is small compared to an overall width of the vehicle 700 and a space necessary when passengers get out.

The parkable area information 910 and 920 may include identifiers (IDs) 911 and 921 of the parkable areas, indicators 912 and 922 indicating the parkable areas, and distances 913 and 923 from the vehicle 700 to the parkable areas.

Here, the IDs 911 and 921 may be given in the order that the parkable areas are detected.

Here, the indicators 912 and 922 may have an arrow shape. The controller 180 may display the indicators 912 and 922 in different colors based on widths of the parkable areas. For example, if the parkable area has a width corresponding to a first period which is the largest width period, the controller 180 may display the indicator 912 in green. If the parkable area has a width corresponding to a second period which is a middle width period, the controller 180 may display the indicator 922 in yellow. The controller 180 may display an indicator 930 indicating the unparkable area, in red. The user may intuitively determine levels of difficulty in parking based on the colors of the indicators 912 and 922.

Here, the distances 913 and 923 may be detected based on disparity or TOF values as described above.

Meanwhile, the controller 180 may display parkable area information using text 950. The text 950 may include distances to the parkable areas, widths of the parkable areas, and guide information based on a level of experience in driving.

When the parkable area information is displayed using the text 950, even parkable area information which cannot be overlaid on the image obtained by the camera 121 may also be displayed. That is, even when the vehicle 700 has passed a parkable area, the controller 180 may display parkable area information corresponding thereto using text. For example, if the vehicle 700 has passed the parkable area by 14 m, the controller 180 may display information indicating that the parkable area is 14 m behind.

Meanwhile, the controller 180 may display a map 940 of a parking lot. The map 940 may be overlaid on the image. The controller 180 may display parkable areas 941 on the map 940. The controller 180 may display an unparkable area 942 on the map 940. The controller 180 may display the parkable and unparkable areas 941 and 942 in different colors on the map 940. The controller 180 may display the location of the vehicle 700 on the map 940.

Meanwhile, the map 940 may be generated based on the image obtained by the camera 121. The map 940 may be received from an external device. Here, the external device may be an external server, another vehicle, or another mobile terminal.

FIG. 9B exemplary illustrates an operation for displaying the parkable or unparkable areas on a transparent display when the vehicle 700 includes the transparent display.

The vehicle 700 may include the transparent display. The transparent display may be attached to the windshield. The transparent display may display a certain screen with a certain transparency. To have transparency, the transparent display may include at least one of a transparent thin film electroluminescent (TFEL) display, a transparent organic light-emitting diode (OLED), a transparent liquid crystal display (LCD), a transmissive transparent display, and a transparent light-emitting diode (LED).

The screen described above in relation to FIG. 9A may be displayed on the transparent display of the vehicle 700. That is, the controller 180 may transmit data related to the screen to be displayed on the transparent display, through the interface unit 160 or the short-range communication module 114 to the vehicle 700.

The vehicle 700 may display the screen described above in relation to FIG. 9A, on the transparent display.

FIG. 9C exemplary illustrates an operation for projecting and displaying the parkable or unparkable areas onto the windshield when the vehicle 700 includes a projection module.

The vehicle 700 may include the projection module. The projection module projects beams toward the windshield. The projection module may include a light source and a projection lens. The projection module may implement an image corresponding to information. That is, the projection module may implement an image using light generated by the light source, and project the implemented image onto the windshield. In this case, the light source may use an LED, a laser, or the like.

The screen described above in relation to FIG. 9A may be displayed on the windshield of the vehicle 700. That is, the controller 180 may transmit data related to the screen to be displayed on the windshield, through the interface unit 160 or the short-range communication module 114 to the vehicle 700.

The vehicle 700 may display the screen described above in relation to FIG. 9A, on the windshield using the projection module.

Meanwhile, if much information cannot be easily displayed using the projection module, the vehicle 700 may simplify parkable area information displayed on the windshield compared to that displayed on the display unit 151.

FIG. 10 is a schematic diagram for describing an operation for displaying distance information between a plurality of objects, using a vehicle image, according to an embodiment of the present invention.

Referring to FIG. 10, the controller 180 may detect the distance information between the objects detected on an image. The distance information between the objects may be width information of a parking area corresponding to an overall width of the vehicle 700.

The controller 180 may display the distance information between the objects using an image. Here, the image may be a vehicle image 1010, 1020, or 1030. The controller 180 may display the distance information between the objects differently based on a period. The controller 180 may display an opening degree of doors differently based on the distance information between the objects.

For example, if the distance corresponds to a first period, the controller 180 may display the vehicle image 1010 having doors in a first state 1011.

For example, if the distance corresponds to a second period, the controller 180 may display the vehicle image 1020 having doors in a second state 1021.

For example, if the distance corresponds to a third period, the controller 180 may display the vehicle image 1030 having doors in a third state 1031.

Meanwhile, the first to third periods may be preset periods.

FIGS. 11A to 11E are schematic diagrams for describing an operation for displaying parkable areas or parkable spaces, according to embodiments of the present invention.

Figure 11A:
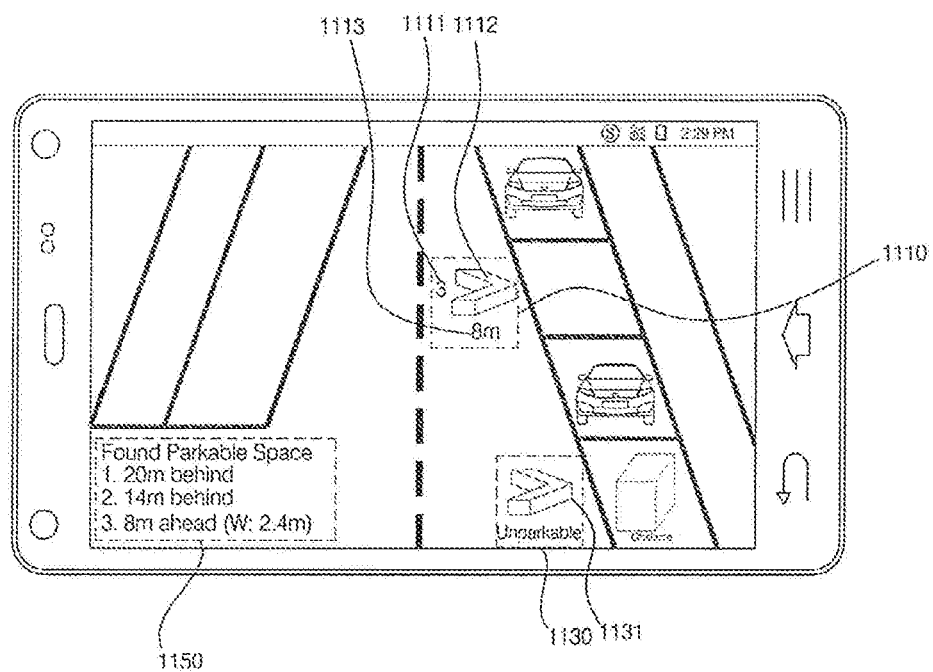
FIGS. 11A to 11E are schematic diagrams for describing an operation for displaying parkable areas or parkable spaces, according to embodiments of the present invention.

Referring to FIG. 11A, for parallel parking, the controller 180 may display parkable area information or parkable space information.

The controller 180 may display an image obtained by the camera 121, on the display unit 151. The controller 180 may overlay parkable area information 1110 and unparkable area information 1130 on the image.

The parkable area information 1110 may include an ID 1111 of a parkable area, an indicator 1112 indicating the parkable area, and a distance 1113 from the vehicle 700 to the parkable area.

Here, the ID 1111 may be given in the order that the parkable area is detected.

Here, the indicator 1112 may have an arrow shape. For example, the controller 180 may display the indicator 1112 indicating the parkable area, in green. Meanwhile, the controller 180 may display an indicator 1131 indicating an unparkable area, in red.

Here, the distance 1113 may be detected based on a disparity or TOF value as described above.

Meanwhile, the controller 180 may display parkable area information using text 1150. The text 1150 may include a distance to the parkable area, a width of the parkable area, and guide information based on a level of experience in driving.

Figure 11B:
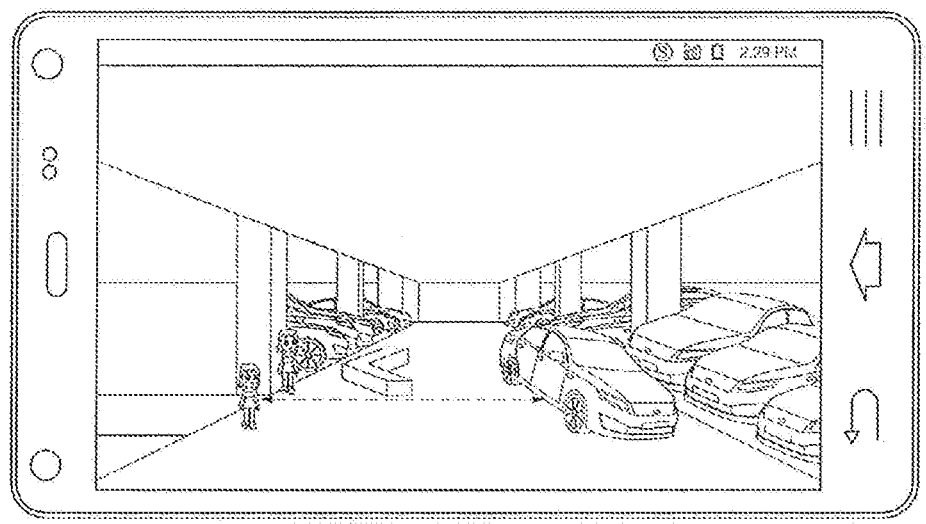

Referring to FIG. 11B, if an obstacle 1160 is located on a parking route and thus the vehicle 700 cannot park in an empty parking area, the controller 180 may display that parking is not possible. In this case, the controller 180 may display an indicator indicating that parking is not possible. Here, the indicator may be red.

Figure 11C:
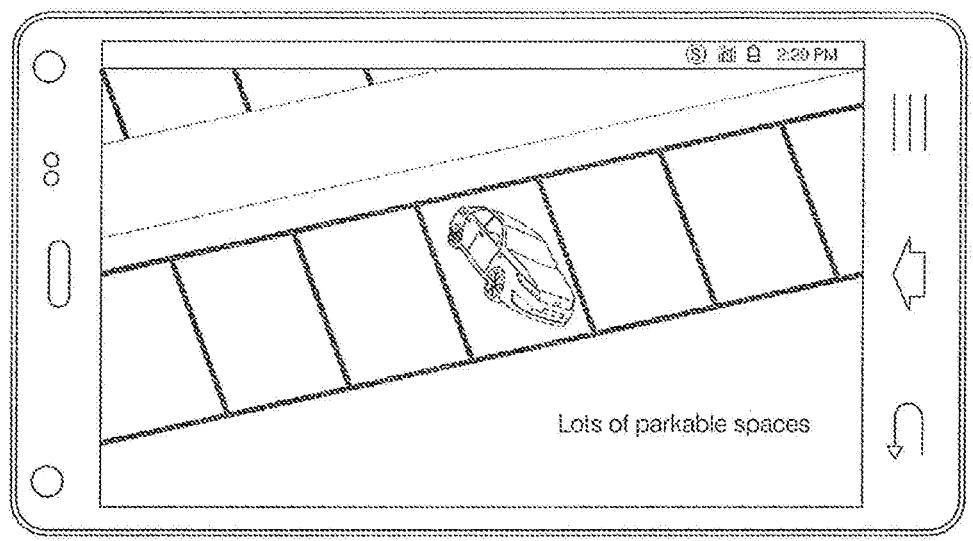

Referring to FIG. 11C, if the number of empty parking areas is equal to or greater than a reference value, the controller 180 may not display parkable area information corresponding to individual parkable areas, but display information indicating that there are lots of parkable areas.

Figure 11D:
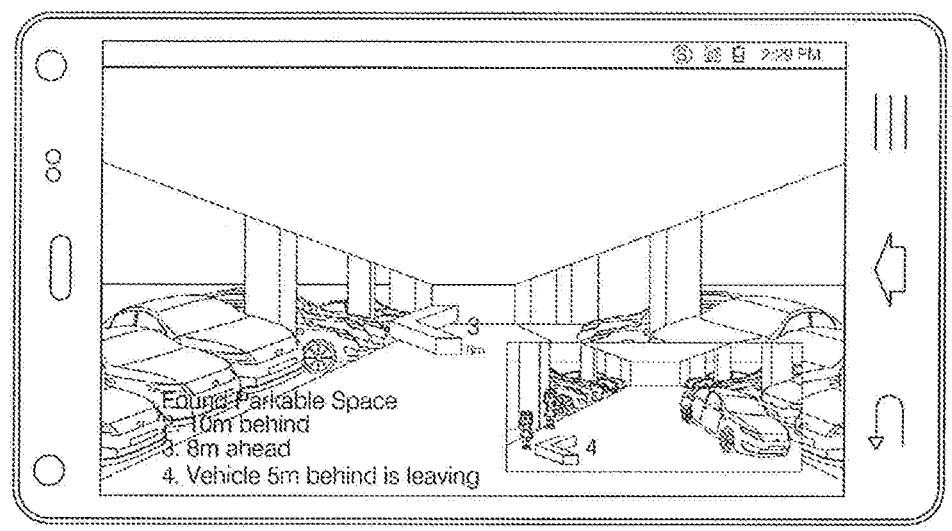

Referring to FIG. 11D, the vehicle 700 may include a rearview camera. The rearview camera may obtain a rear side image of the vehicle 700. The controller 180 may receive the rear side image through the interface unit 160 or the short-range communication module 114. The controller 180 may display the received rear side image on a partial region of the display unit 151. In this case, the controller 180 may simultaneously display a front side image and the rear side image of the vehicle 700.

The controller 180 may detect another vehicle which leaves a parking area, on the rear side image. In this case, the controller 180 may output information indicating that the other vehicle leaves, through the output unit 150. After that, the controller 180 may update and include the parking area located behind, in the parkable area information. The controller 180 may update information about the parking area located behind on a map.

Figure 11E:
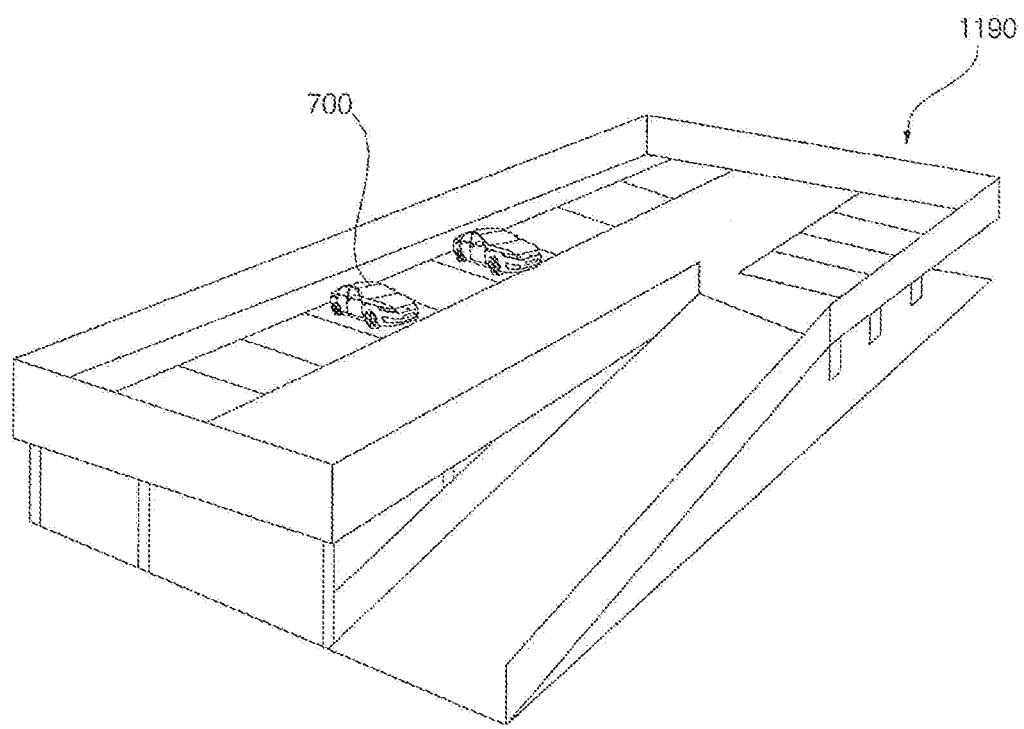

Referring to FIG. 11E, the controller 180 may generate a map 1190 of a parking lot. Here, the map 1190 may be a 3D map.

The controller 180 may generate the 3D map based on motion information and visual odometry information. The motion information may be generated by the motion sensor 143. The visual odometry information may be obtained by a motion tracking camera. Alternatively, the visual odometry information may be obtained by tracking feature points on sequential images obtained by the camera 121.

Here, the 3D map may be generated for a space corresponding to the image obtained by the camera 121.

The controller 180 may provide parkable area information and vehicle location information on the 3D map through the display unit 151.

Meanwhile, the controller 180 may receive the map 1190 of the parking lot from an external device. In this case, the map 1190 may be a 2D or 3D map. The external device may be an external server, another vehicle, or another mobile terminal. The controller 180 may receive the map 1190 of the parking lot through the mobile communication module 112, the wireless Internet module 113, or the short-range communication module 114.

Figure 12A:
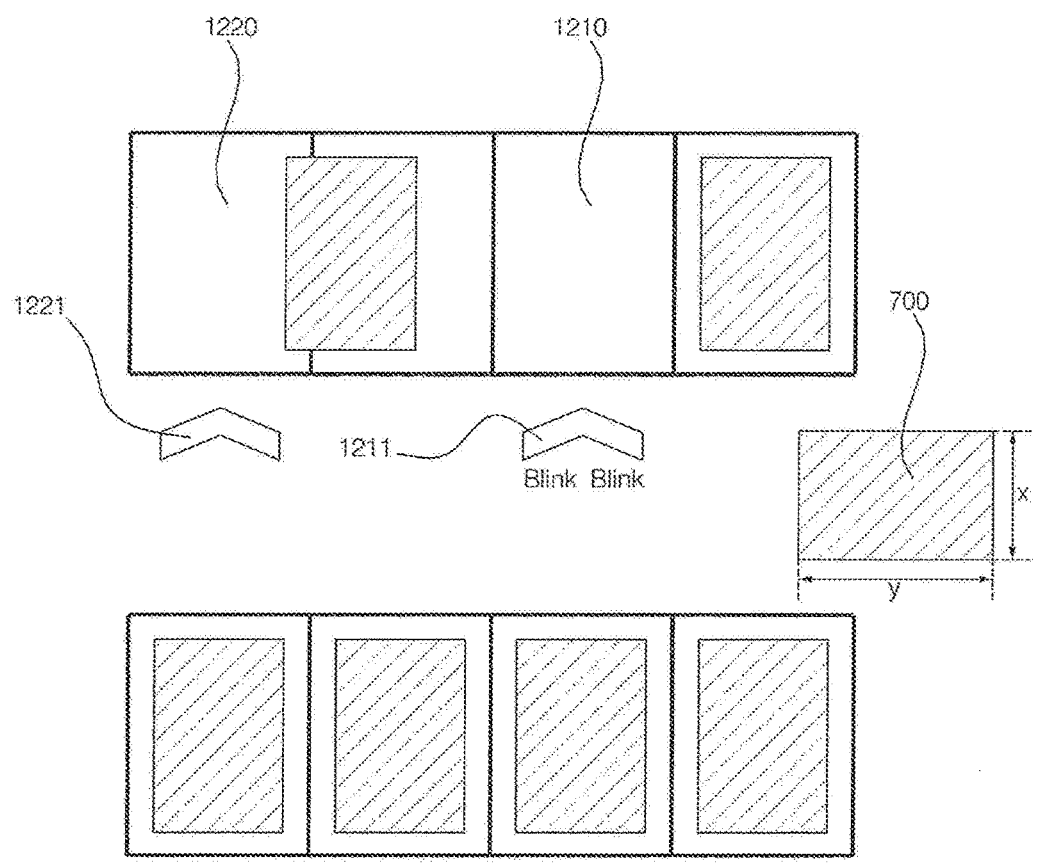
FIGS. 12A and 12B are schematic diagrams for describing an operation for displaying a recommended parking area, according to embodiments of the present invention.
Figure 12B:
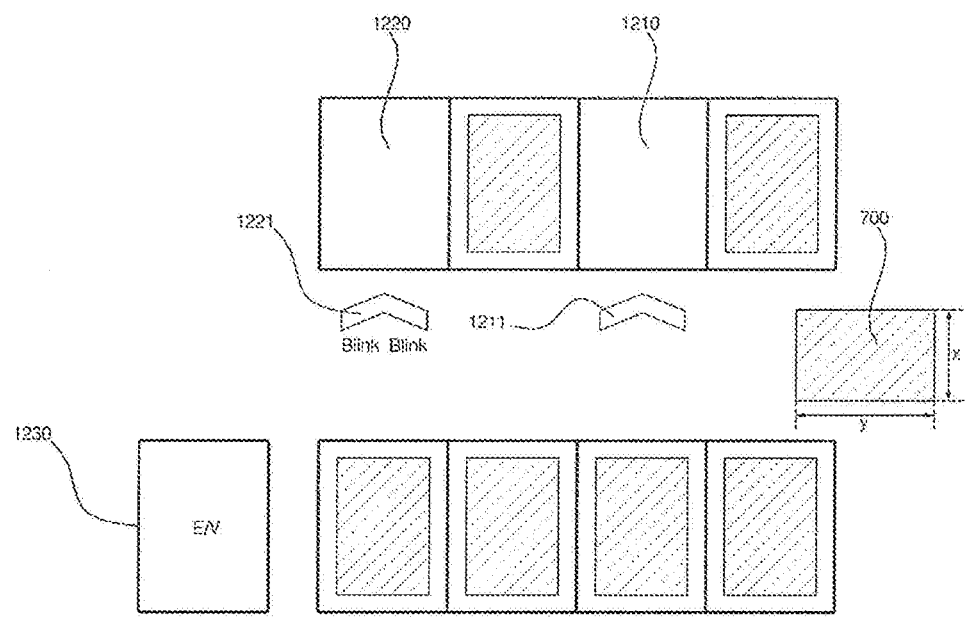

FIGS. 12A and 12B are schematic diagrams for describing an operation for displaying a recommended parking area, according to embodiments of the present invention.

Referring to FIG. 12A, after a plurality of parkable areas are detected, the controller 180 may provide a recommended parking area among the parkable areas.

The controller 180 may display the recommended parking area based on user-preferred parking space information.

After a first parkable area 1210 and a second parkable area 1220 are detected, if the user prefers a large parking area, the controller 180 may display the first parkable area 1210 which is large, as the recommended parking area. In this case, the controller 180 may display the recommended parking area using an indicator 1211. The controller 180 may animate the indicator 1211 indicating the recommended parking area. For example, the controller 180 may display the indicator 1211 indicating the recommended parking area, to blink as time passes.

Referring to FIG. 12B, after the first and second parkable areas 1210 and 1220 are detected, if the user prefers a parking area close to an entrance 1230, the controller 180 may display the second parkable area 1220 which is close to the entrance 1230, as the recommended parking area. In this case, the controller 180 may display the recommended parking area using an indicator 1221. The controller 180 may animate the indicator 1221 indicating the recommended parking area. For example, the controller 180 may display the indicator 1221 indicating the recommended parking area, to blink as time passes.

Meanwhile, although not shown in FIGS. 12A and 12B, the controller 180 may display a parking area closest to a passage or a parking area away from luxury vehicles, as the recommended parking area based on the user-preferred parking space information.

FIGS. 13A to 13E are schematic diagrams for describing an operation for selecting a parking area, according to embodiments of the present invention.

Figure 13A:
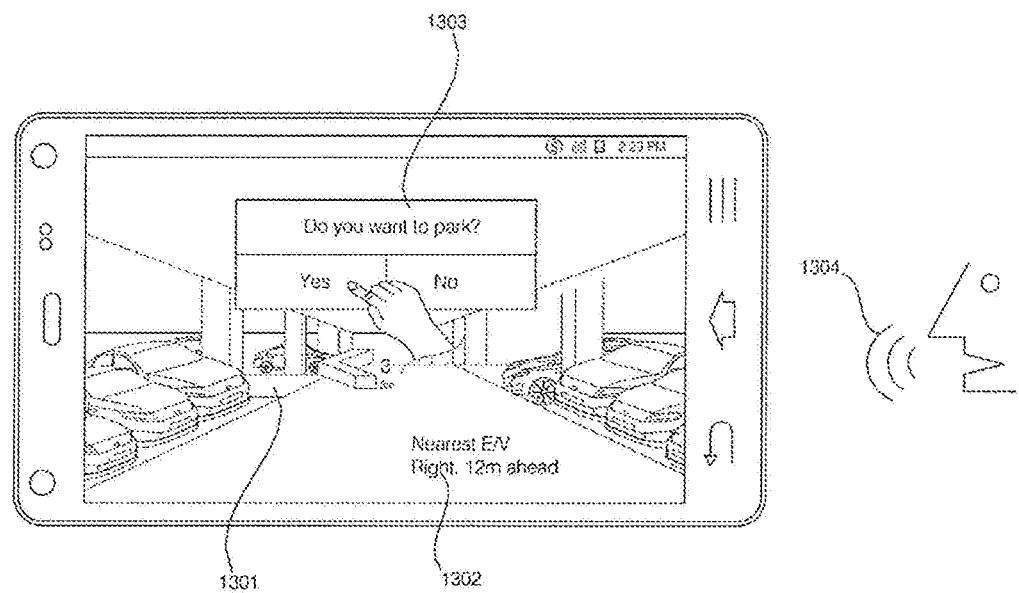
FIGS. 13A to 13E are schematic diagrams for describing an operation for selecting a parking area, according to embodiments of the present invention.

Referring to FIG. 13A, the controller 180 may find a first parkable area 1301. The controller 180 may display first parkable area information. Here, the information may include an ID of the first parkable area 1301, an indicator indicating the first parkable area 1301, and a distance from the vehicle 700 to the first parkable area 1301. The information may include entrance information 1302. For example, the information may include location and distance information of an entrance closest to the first parkable area 1301.

If the vehicle 700 approaches the first parkable area 1301 and thus the distance there between is equal to or less than a preset distance, the controller 180 may output a message 1303 asking whether to park. The message 1303 may be displayed on the display unit 151 as a pop-up message. The message 1303 may be output using voice through the audio output module 152.

If user input for parking is received, the controller 180 may perform parking assist operation for parking the vehicle 710 in the first parkable area 1301.

Alternatively, if user input for parking is received, the controller 180 may transmit a control signal for automatically parking the vehicle 700 in the first parkable area 1301, to the vehicle 700.

Meanwhile, the user input for parking may be touch input or voice input 1304.

Figure 13B:
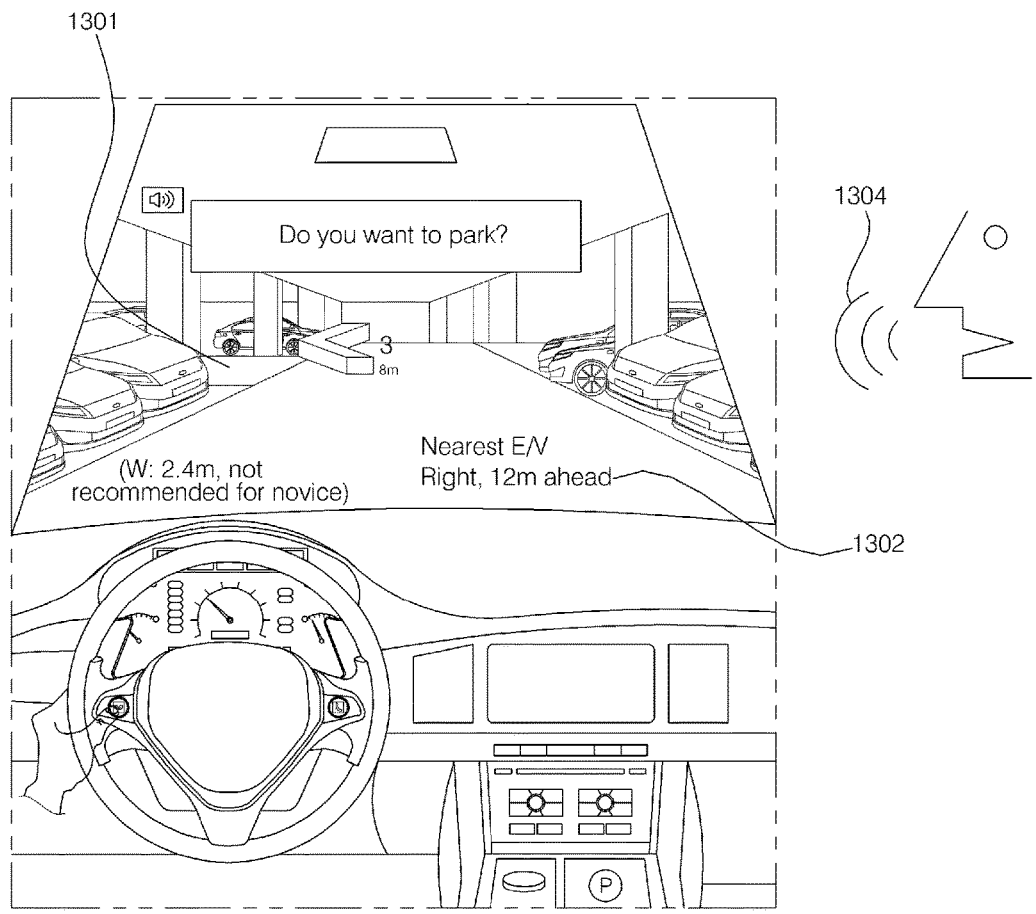

Referring to FIG. 13B, the controller 180 may transmit data for outputting the contents described above in relation to FIG. 13A, through the interface unit 160 or the short-range communication module 114 to the vehicle 700.

The vehicle 700 may display the contents described above in relation to FIG. 13A, on the windshield using a transparent display or a projection module. The vehicle 700 may output the contents described above in relation to FIG. 13A, through the audio output unit 742.

If user input for parking is received, the vehicle 700 may be automatically parked in the first parkable area 1301.

Figure 13C:
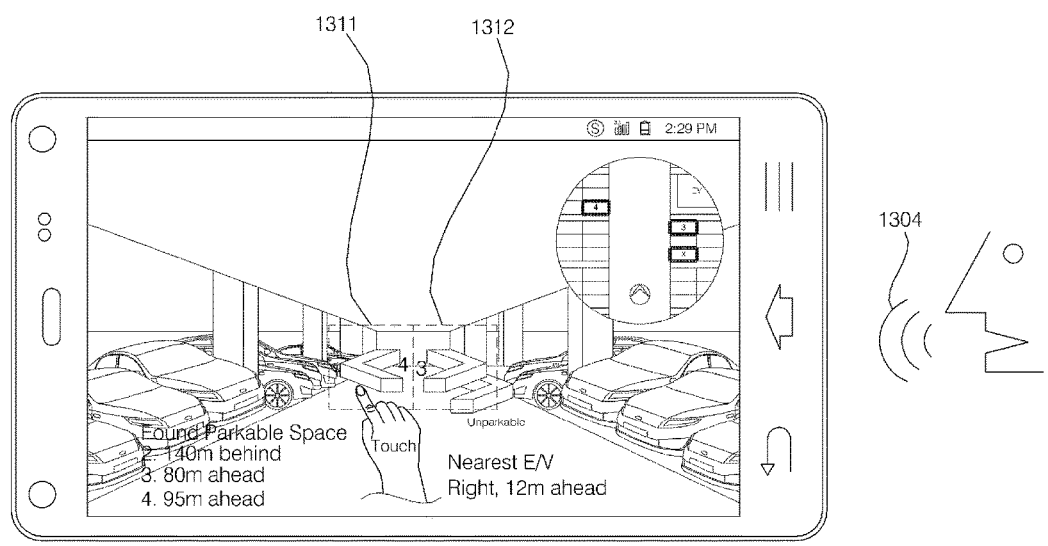

Referring to FIG. 13C, after parkable area information 1311 and 1312 corresponding to detected parkable areas are displayed, the controller 180 may receive user input for selecting one of the parkable areas. Here, the user input may be touch input on a region for displaying the parkable area information 1311. The user input may be voice input.

If the user input for selecting is received, the vehicle 700 may be automatically parked in the selected parkable area.

Figure 13D:
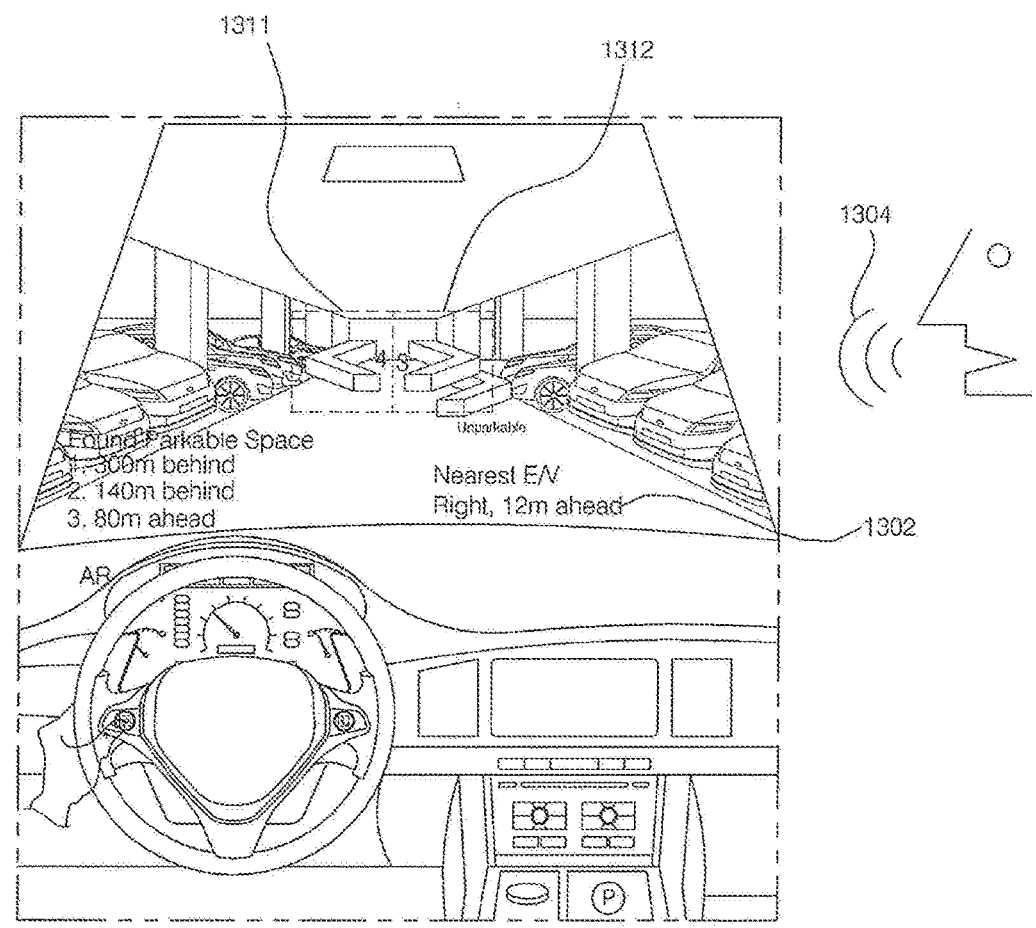

Referring to FIG. 13D, the controller 180 may transmit data for outputting the contents described above in relation to FIG. 13C, through the interface unit 160 or the short-range communication module 114 to the vehicle 700.

The vehicle 700 may display the contents described above in relation to FIG. 13C, on the windshield using a transparent display or a projection module. The vehicle 700 may output the contents described above in relation to FIG. 13C, through the audio output unit 742.

The controller 180 may receive user input for selecting one of the parkable areas. The user input may be voice input.

If the user input for selecting is received, the vehicle 700 may be automatically parked in the selected parkable area.

Figure 13E:
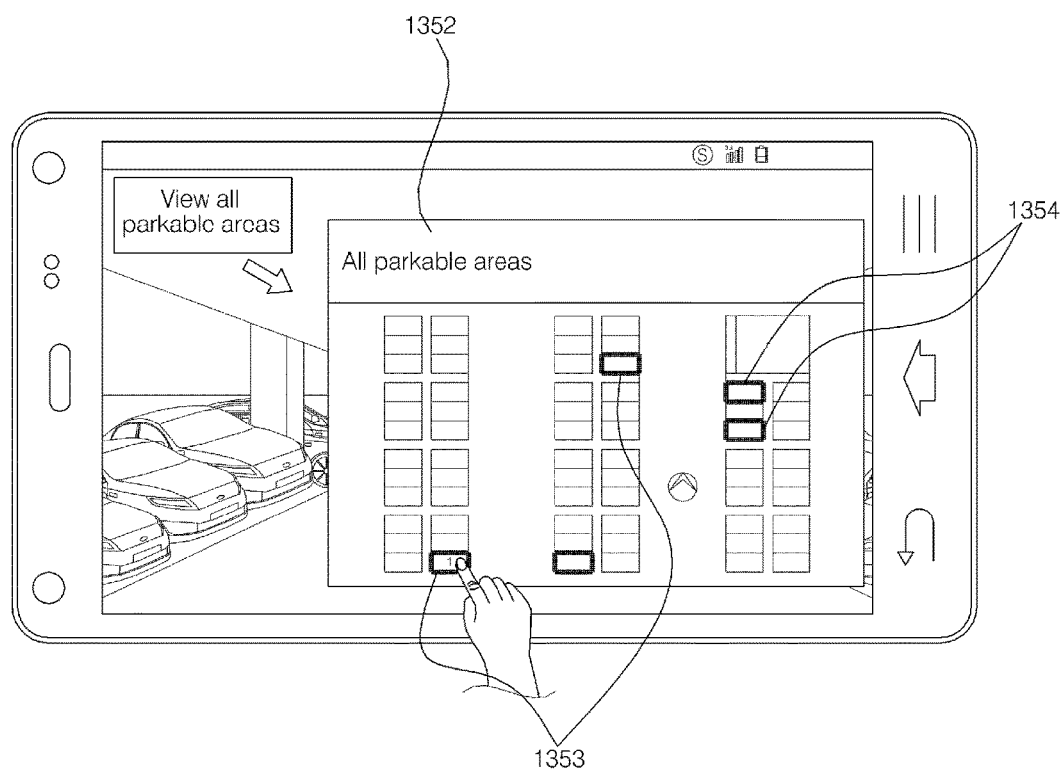

Referring to FIG. 13E, the controller 180 may receive user input for viewing all parkable areas. If the user input for viewing all parkable areas is received, the controller 180 may display a screen 1352 for viewing all parkable areas. Here, the screen 1352 may be a map of a parking lot. The map may be a 2D or 3D map. The controller 180 may display parkable areas 1353 or unparkable areas 1354 on the map. The unparkable area 1354 may refer to a parking area in which no vehicle is parked but the vehicle 700 cannot park because the distance between objects located at sides is small compared to an overall width of the vehicle 700 and a space necessary when passengers get out.

If one of the parkable areas 1353 is selected based on user input, the controller 180 may perform parking assist operation for parking the vehicle 700 in the selected parkable area 1353.

Alternatively, if one of the parkable areas 1353 is selected based on user input, the controller 180 may transmit a control signal for automatically parking the vehicle 700 in the selected parkable area 1353, to the vehicle 700.

FIGS. 14A to 14D are schematic diagrams for describing an operation for displaying a predicted parking route, according to embodiments of the present invention.

Figure 14A:
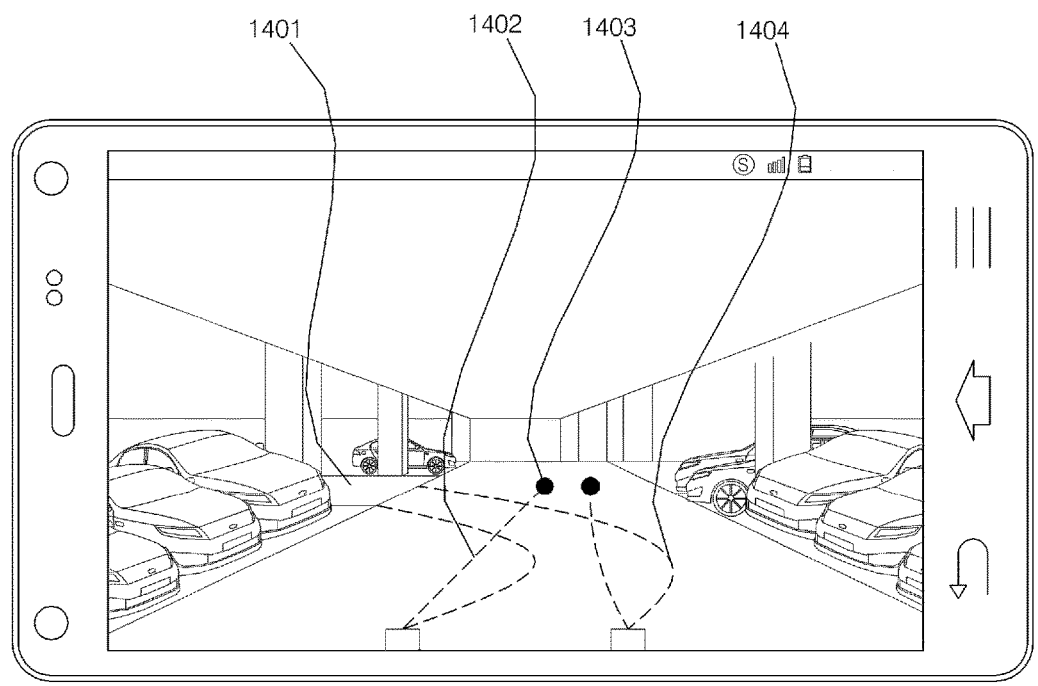
FIGS. 14A to 14D are schematic diagrams for describing an operation for displaying a predicted parking route, according to embodiments of the present invention.

Referring to FIG. 14A, after a parking area 1401 is selected, the controller 180 may display the predicted parking route for parking the vehicle 700 in the selected parking area 1401.

The controller 180 may display a head-in parking route 1404 or a back-in parking route 1402 on the display unit 151. In this case, the controller 180 may overlay the head-in parking route 1404 or the back-in parking route 1402 on an image received from the camera 121.

Meanwhile, the controller 180 may display the head-in parking route 1404 or the back-in parking route 1402 as a predicted trajectory of wheels. In this case, the wheels may be front wheels of the vehicle 700.

If the back-in parking route 1402 is displayed, the controller 180 may display indicators 1403 indicating stop points after moving forward. The user may stop the vehicle 700 at the points indicated by the indicators 1403, and then reverse the vehicle 700 for back-in parking.

Meanwhile, the controller 180 may display front wheel images of the vehicle 700 on the display unit 151. The controller 180 may receive steering angle information through the interface unit 160 or the short-range communication module 114 from the vehicle 700. The controller 180 may change the front wheel images displayed on the display unit 151, to correspond to the steering angle information. For example, if steering angle information indicating that the steering wheel is rotated to the right by a certain angle is received, the controller 180 may rotate the displayed front wheel images to the right. By displaying the front wheel images as described above, the direction of the front wheels may be visibly displayed and a novice driver may easily park the vehicle 700.

Meanwhile, if only head-in parking is possible for the selected parking area 1401, only the head-in parking route 1404 may be displayed. Otherwise, if only back-in parking is possible for the selected parking area 1401, only the back-in parking route 1402 may be displayed.

Meanwhile, the controller 180 may provide a recommended parking route based on parking preference of the user. The parking preference may be preliminarily input by the user. Alternatively, the parking preference may be determined based on a prestored parking pattern.

Figure 14B:
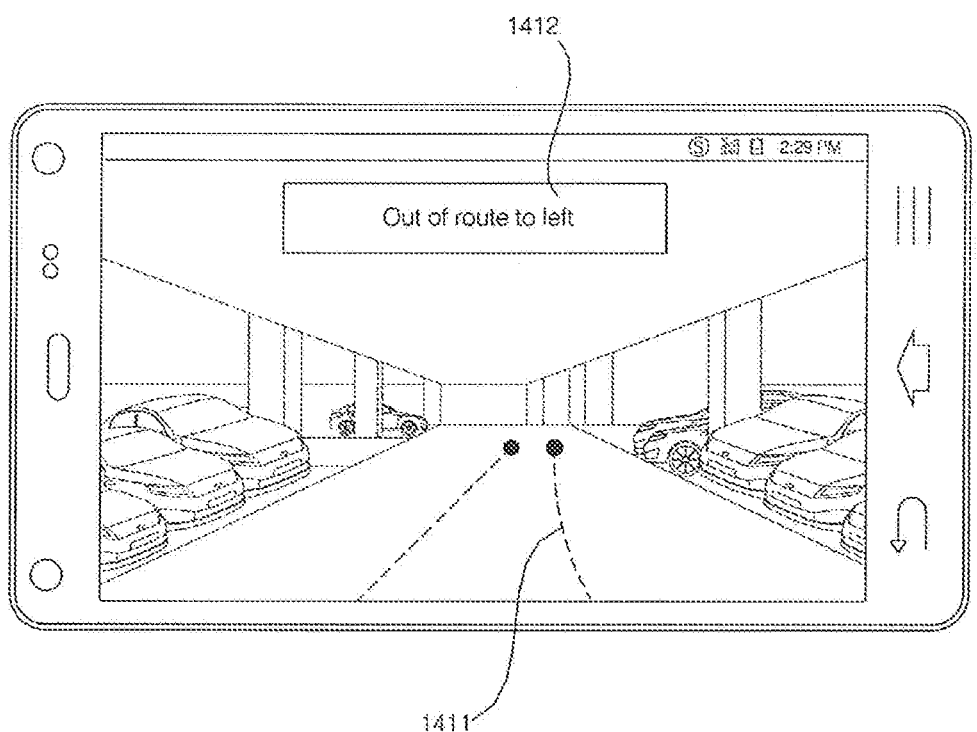

Referring to FIG. 14B, after a parking route 1411 is displayed, if the user drives the vehicle out of the parking route 1411, the controller 180 may output an alarm 1412. The alarm 1412 may be visibly displayed on the display unit 151 or audibly output through the audio output module 152.

The controller 180 may track motion of the vehicle 700 using visual odometry information and determine whether the vehicle 700 moves out of the provided parking route 1411.

Upon determining that the vehicle 700 moves out of the provided parking route 1411 to the left or right, the controller 180 may output the alarm 1412 to the user and provide guide information for guiding the vehicle 700 to the parking route 1411.

Meanwhile, the controller 180 may store an actual trajectory of the vehicle 700 corresponding to the provided parking route 1411, in the memory 170. The controller 180 may determine whether the user is a novice driver, based on the actual trajectory compared to the provided parking route 1411. For example, if the number of times that the vehicle 700 moves out of the provided parking route 1411 is equal to or greater than a reference value, the controller 180 may determine the user as a novice driver. If the user is determined as a novice driver, a parking route appropriate for a parking route may be provided next time.

Meanwhile, the controller 180 may display a previous parking route stored in the memory 170 and the actual trajectory of the vehicle 700, based on user input. In this case, the controller 180 may display the same using a moving image.

Figure 14C:
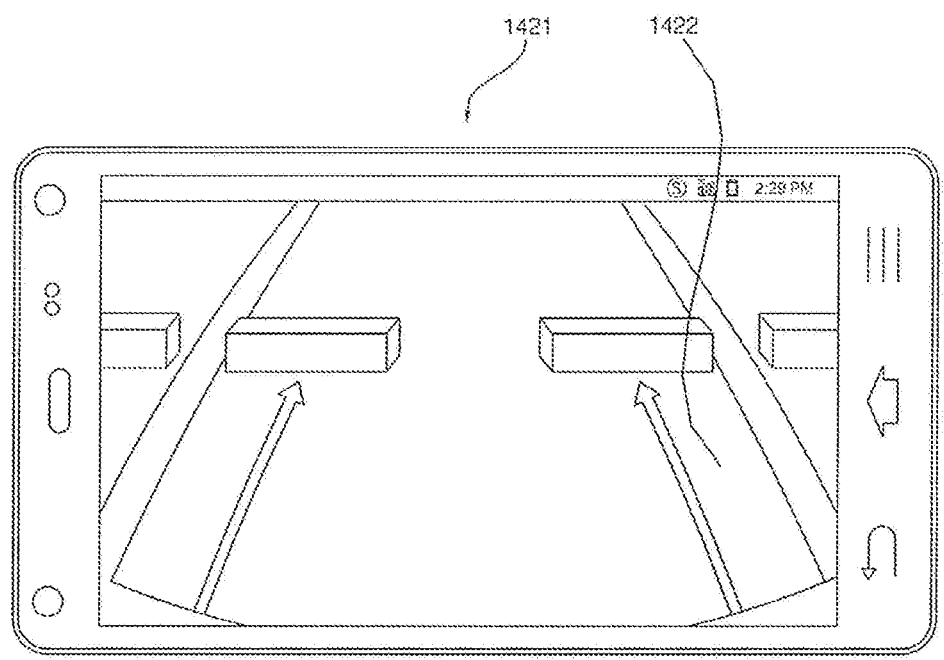

Referring to FIG. 14C, if the vehicle 700 includes a rearview camera, the controller 180 may receive a rear side image 1421 of the vehicle 700, which is obtained by the rearview camera, through the interface unit 160 or the short-range communication module 114.

The controller 180 may receive shift location information. The controller 180 may receive information indicating whether the shift input unit 721*b* of the vehicle 700 is in park, drive, neutral, or reverse.

If the shift input unit 721*b* is in reverse, the controller 180 may display the rear side image 1421 on the display unit 151. In this case, the controller 180 may overlay a parking route 1422 on the rear side image 1421. In this case, the parking route 1422 may be a predicted route of rear wheels.

Figure 14D:
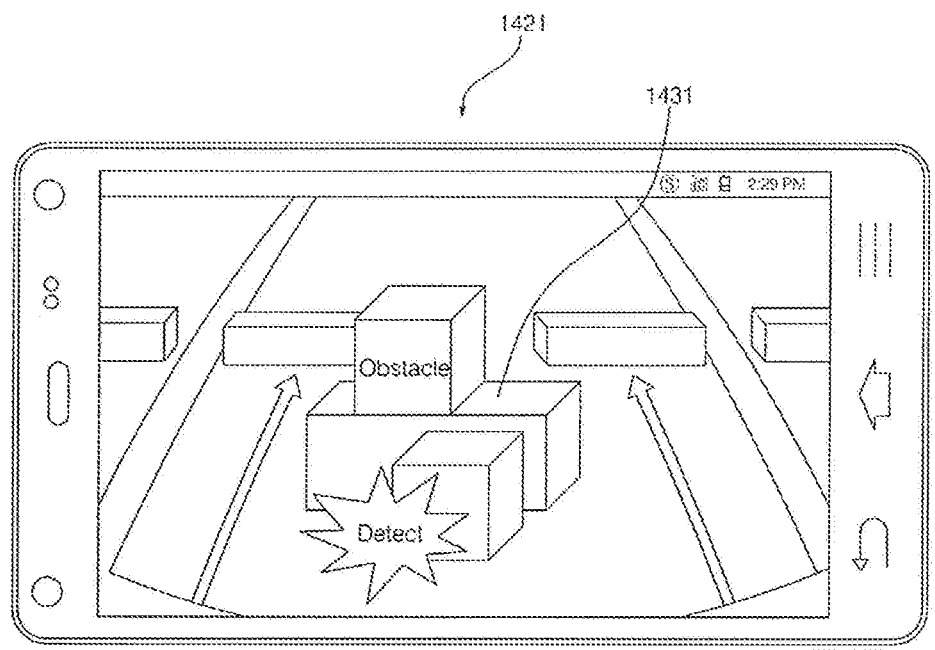

Referring to FIG. 14D, the controller 180 may detect objects based on the received rear side image 1421 of the vehicle 700. If an obstacle 1431 is detected, the controller 180 may output a visible or audible alarm.

If the obstacle 1431 is detected, the controller 180 may ask whether to park the vehicle 700 in another parking area.

Meanwhile, the obstacle 1431 may be an object located in the parking area. Alternatively, the obstacle 1431 may be a pillar located next to the parking area. If a pillar detected on a front or rear side image of the vehicle 700 is located where opening of doors of the vehicle 700 will be hindered, the controller 180 may determine the pillar as the obstacle 1431.

Figure 15:
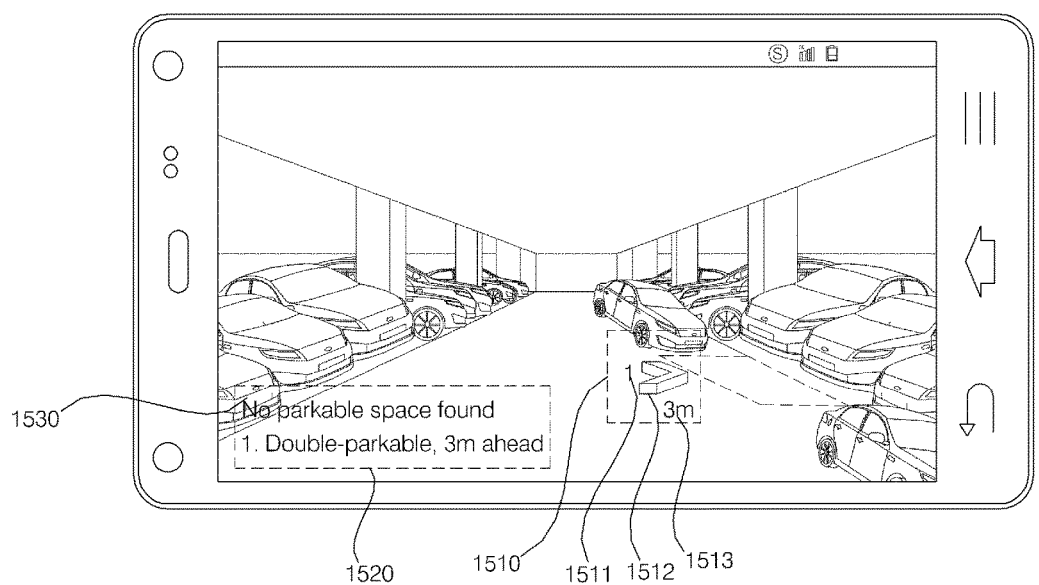
FIG. 15 is a schematic diagram for describing an operation for providing double-parkable space information, according to an embodiment of the present invention.

FIG. 15 is a schematic diagram for describing an operation for providing double-parkable space information, according to an embodiment of the present invention.

Referring to FIG. 15, if no parkable area is detected, the controller 180 may detect a double-parkable space.

The controller 180 may detect the distance between objects on an image obtained by the camera 121, and determine whether a corresponding space is a double-parkable space, by comparing the detected distance and an overall length of the vehicle 700.

If a double-parkable space 1503 is detected, the controller 180 may provide information about the double-parkable space 1503.

Double-parkable space information 1510 may include an ID 1511 of the double-parkable space 1503, an indicator 1512 indicating the double-parkable space 1503, and a distance 1513 from the vehicle 700 to the double-parkable space 1503.

The controller 180 may display the double-parkable space information using text 1520. The text 1520 may include a distance to the double-parkable space 1503, a width of the double-parkable space 1503, and guide information based on a level of experience in driving.

Meanwhile, the controller 180 may display information 1530 indicating that there is no parkable area. In this case, the controller 180 may display the information 1530 using text.

If the double-parkable space 1503 is selected based on user input, the controller 180 may perform parking assist operation for parking the vehicle 700 in the double-parkable space 1503.

Alternatively, if the double-parkable space 1503 is selected based on user input, the controller 180 may transmit a control signal for automatically parking the vehicle 700 in the double-parkable space 1503, to the vehicle 700.

Figure 16A:
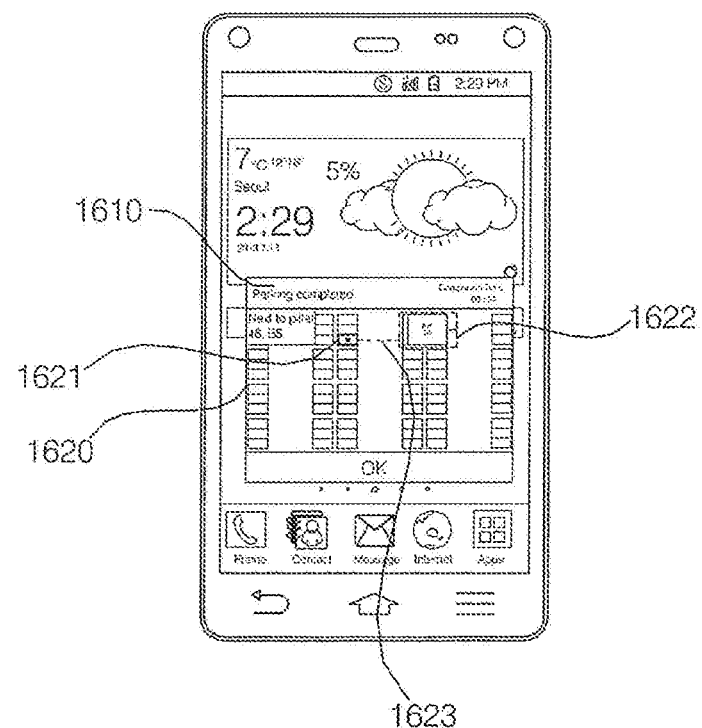
FIGS. 16A and 16B are schematic diagrams for describing an operation for providing parking information after parking is completed, according to embodiments of the present invention.
Figure 16B:
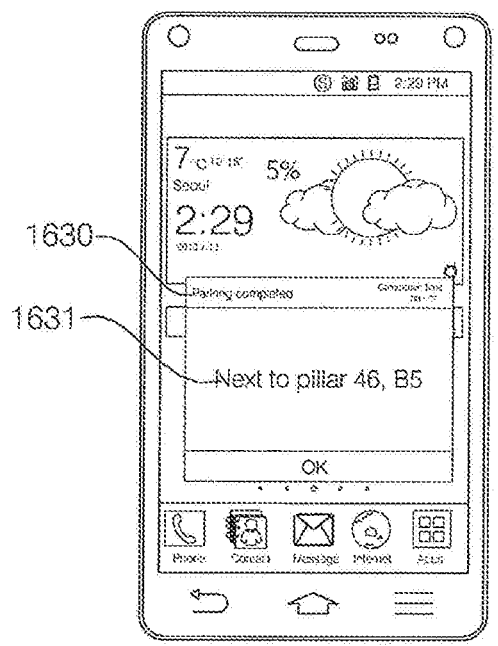

FIGS. 16A and 16B are schematic diagrams for describing an operation for providing parking information after parking is completed, according to embodiments of the present invention.

Referring to FIG. 16A, if parking is completed, the controller 180 may output a parking completed message 1610. After parking is completed, the controller 180 may provide a map 1620. The controller 180 may provide location information 1621 of the parked vehicle 700 on the map 1620. The controller 180 may display a route 1623 from the vehicle 700 to an entrance 1622 on the map 1620.

Meanwhile, the map 1620 may be a 2D or 3D map. The map 1620 may be generated by the mobile terminal 100 or received from an external device.

Meanwhile, the controller 180 may display a time taken for parking.

Referring to FIG. 16B, if parking is completed, the controller 180 may output a parking completed message 1630. The controller 180 may provide location information 1631 of the parked vehicle 700. The controller 180 may detect the location information 1631 of the vehicle 700 using an image obtained by the camera 121. For example, the controller 180 may detect an index of a floor where the vehicle 700 is parked, or an index of a pillar next to the parked vehicle 700 on the image. The controller 180 may provide the detected index of the floor or the pillar as the location information 1631 of the vehicle 700.

Meanwhile, the controller 180 may check and provide the index of the floor or the pillar as the location information 1631 of the vehicle 700 based on a 3D map.

Meanwhile, the controller 180 may transmit information to another vehicle. Specifically, the controller 180 may transmit the parking lot map information, the parkable area information, the unparkable area information, or the location information of the parked vehicle 700 to the other vehicle through communication with the other vehicle.

If the vehicle 700 moves and thus the map is updated, the controller 180 may transmit the updated information to the other vehicle.

The controller 180 may transmit information to another vehicle located in the parking lot. Alternatively, the controller 180 may transmit information via a parking management system to another vehicle located in the parking lot.

The controller 180 may transmit information to another selected vehicle. If a route for parking another vehicle equals that of the vehicle 700, the controller 180 may select the other vehicle. In this case, route information of the other vehicle may be received from another vehicle or the parking management system.

Meanwhile, the operation for transmitting information to another vehicle may be performed or not performed based on user input.

FIGS. 17A to 17E are schematic diagrams for describing an operation for providing vehicle information after parking is completed and when the user is away from the vehicle 700, according to embodiments of the present invention.

Figure 17A:
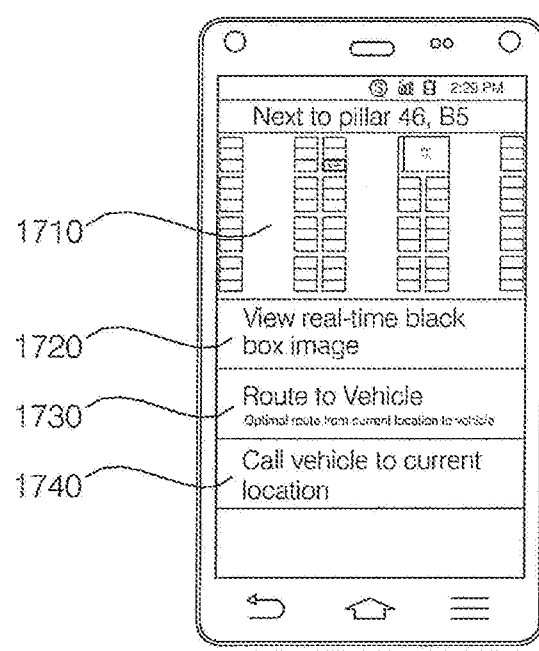
FIGS. 17A to 17E are schematic diagrams for describing an operation for providing vehicle information after parking is completed and when a user is away from a vehicle, according to embodiments of the present invention.
Figure 17B:
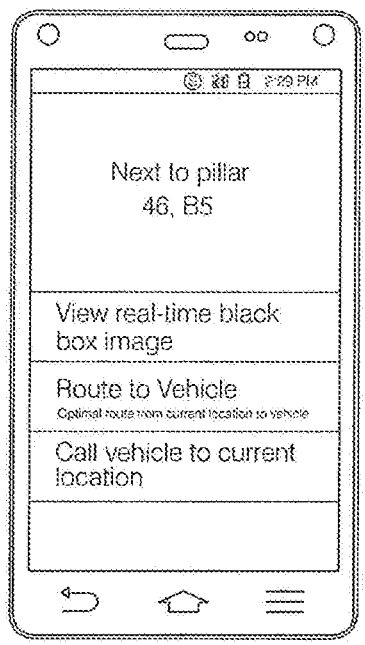

Referring to FIGS. 17A and 17B, the controller 180 may execute a vehicle application. The vehicle application is an application capable of checking information related to the parked vehicle 700.

The vehicle application may include a vehicle location information providing item 1710, a black box image providing item 1720, a route-to-vehicle providing item 1730, and a vehicle calling item 1740.

The controller 180 may provide location information of the vehicle 700. The location information of the vehicle 700 may be provided by default when the vehicle application is executed, or based on user input.

As illustrated in FIG. 17A, the controller 180 may provide a map and display the location information of the parked vehicle 700 on the display unit 151.

As illustrated in FIG. 17B, the controller 180 may display the location information of the parked vehicle 700 using text on the display unit 151.

Figure 17C:
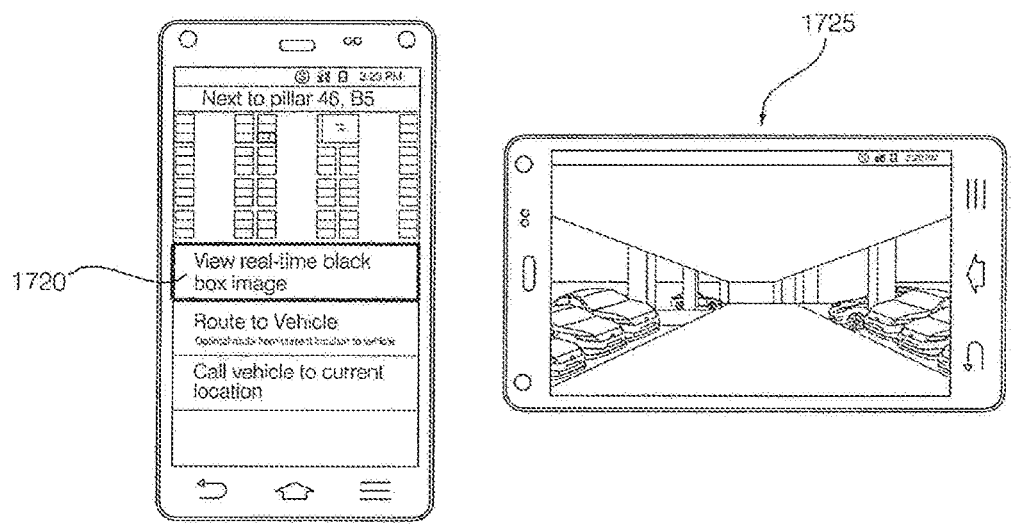

Referring to FIG. 17C, if the black box image providing item 1720 is selected, the controller 180 may display a black box image 1725 obtained by a black box camera included in the vehicle 700, on the display unit 151. The controller 180 may receive the black box image 1725 through the mobile communication module 112, the wireless Internet module 113, or the short-range communication module 114. The controller 180 may display the received black box image 1725 on the display unit 151.

Figure 17D:
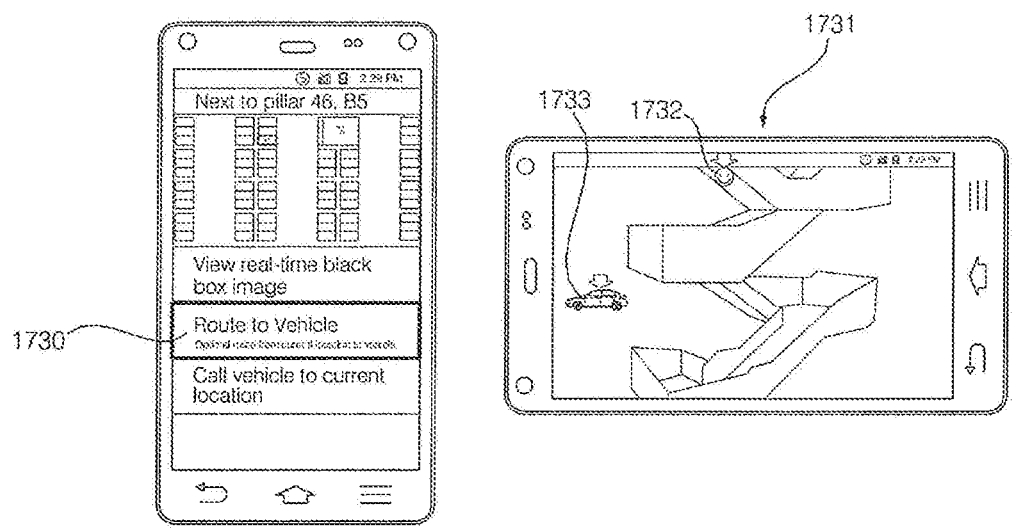

Referring to FIG. 17D, if the route-to-vehicle providing item 1730 is selected, the controller 180 may provide a route from a current location 1732 of the mobile terminal 100 to the vehicle 700.

After parking of the vehicle 700 is completed, if the mobile terminal 100 moves, the controller 180 may generate visual odometry information based on motion information generated by the motion sensor 143 and an image obtained by the camera 121. The controller 180 may generate a 3D map 1731 from the parked vehicle 700 to the current location 1732 of the mobile terminal 100 based on the visual odometry information.

The controller 180 may provide the route from the current location 1732 to a location 1733 where the vehicle 700 is parked, using the generated 3D map 1731. The controller 180 may display the route on the 3D map 1731.

Figure 17E:
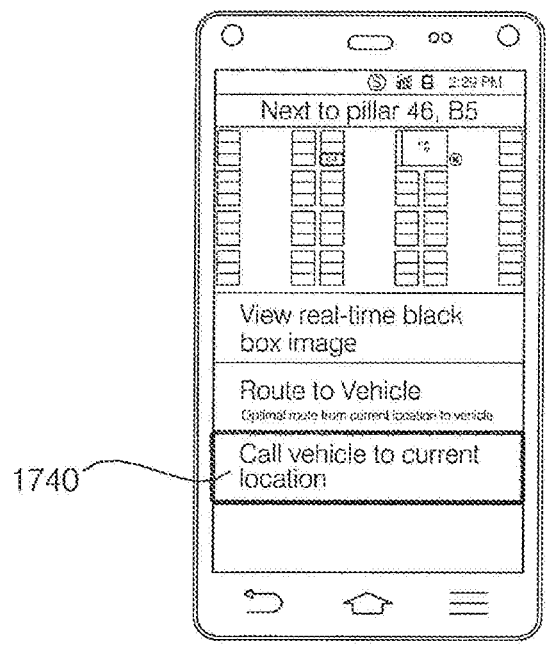

Referring to FIG. 17E, the vehicle calling item 1740 is selected, the controller 180 may transmit a call signal through the mobile communication module 112, the wireless Internet module 113, or the short-range communication module 114 to the vehicle 700. The call signal may include location information of the mobile terminal 100 which is detected by the location information module 115. Alternatively, the call signal may include the location information of the mobile terminal 100 on the generated map.

The vehicle 700 having received the call signal may autonomous drive to the location of the mobile terminal 100.

Figure 18:
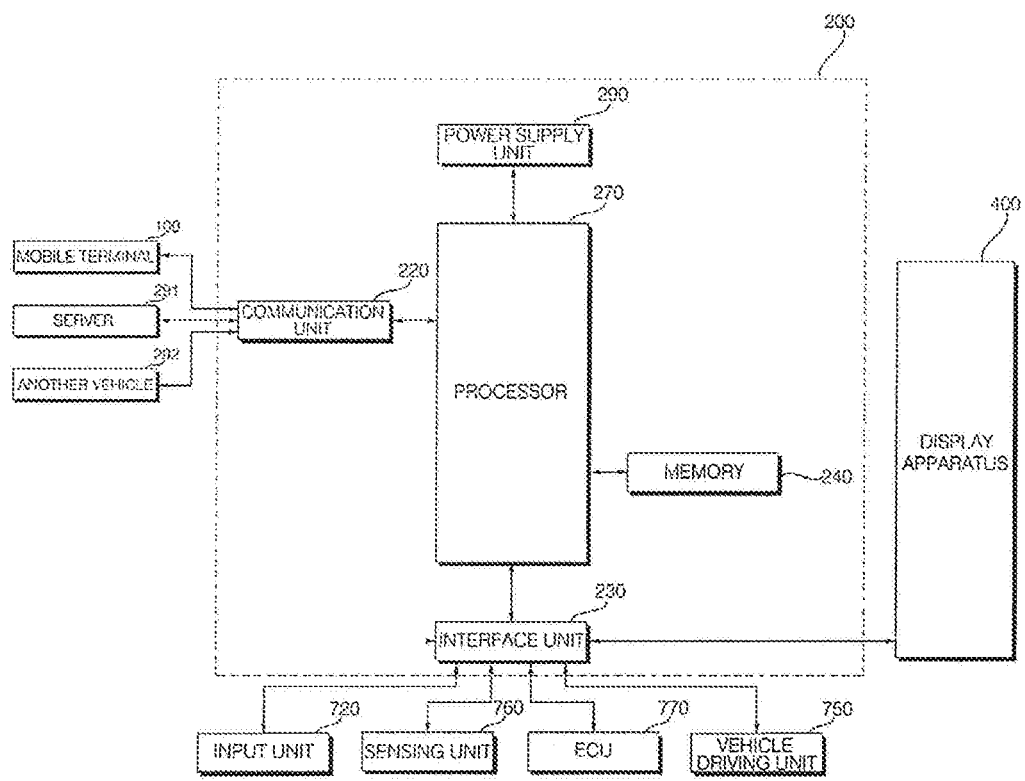
FIG. 18 is a block diagram of an automatic parking apparatus according to an embodiment of the present invention.

FIG. 18 is a block diagram of an automatic parking apparatus 200 according to an embodiment of the present invention.

Referring to FIG. 18, the automatic parking apparatus 200 may include a communication unit 220, an interface unit 230, a memory 240, a processor 270, and a power supply unit 290.

The communication unit 220 may exchange data with the mobile terminal 100, a server 291, or another vehicle 292 in a wireless manner. Particularly, the communication unit 220 may exchange data with the mobile terminal 100 of a driver of the vehicle 700 in a wireless manner. A variety of wireless data communication schemes such as Bluetooth, Wi-Fi Direct, Wi-Fi, Advanced Passenger Information eXchange (APIX), and NFC may be used.

For example, the communication unit 220 may receive a control signal from the mobile terminal 100, and the processor 270 may perform automatic parking based on the received control signal.

The communication unit 220 may receive information about an object near a parking space. For example, the communication unit 220 may receive information indicating whether an object is located near the parking space. For example, the communication unit 220 may receive distance information between a plurality of objects located near the parking space. If the mobile terminal 100 detects distance information between other vehicles parked at left and right sides of the parking space, the communication unit 220 may receive the distance information.

The communication unit 220 may receive passenger information. The communication unit 220 may receive the passenger information from the mobile terminal 100. Here, the passenger information may include information indicating the number of passengers, and information indicating seats on which the passengers are sitting.

The interface unit 230 may receive data from another element of the vehicle 700, or transmit a signal processed or generated by the processor 270, to outside. To this end, the interface unit 230 may perform data communication with the input unit 720, the sensing unit 760, the ECU 770, the vehicle driving unit 750, and the display apparatus 400 of the vehicle 700 in a wired or wireless manner.

The interface unit 230 may receive sensing information of the parking space. The interface unit 230 may receive the sensing information from the sensing unit 760.

The interface unit 230 may receive passenger information. The interface unit 230 may receive the passenger information from the internal camera 722c. Here, the passenger information may include information indicating the number of passengers, and information indicating seats on which the passengers are sitting.

The memory 240 may store various data for overall operations of the automatic parking apparatus 200, e.g., programs for process or control operations of the processor 270.

Meanwhile, the memory 240 may include a variety of storage apparatuses such as a ROM, a RAM, an EPROM, a flash drive, and a hard drive, in terms of hardware.

The processor 270 may control overall operations of elements of the automatic parking apparatus 200.

The processor 270 may generate a parking route based on information or data received from the sensing unit 760 or the mobile terminal 100.

The processor 270 may generate the parking route based on a length in an overall width direction within the parking space which is necessary when the passengers get out.

Here, the length may be a length in the overall width direction which is required to open doors when the passengers get out.

The processor 270 may generate the parking route in such a manner that the vehicle 700 is spaced apart from the nearby object by the length in the overall width direction which is necessary when the passengers get out.

If passenger information of a driver's seat side is received, the processor 270 may generate the parking route based on a first length in the overall width direction which is necessary when a passenger of the driver's seat side gets out.

Here, the passenger information of the driver's seat side may be information indicating whether a passenger is sitting on a driver's seat or a back seat behind the driver's seat.

Doors next to the driver's seat side should be open when the passenger of the driver's seat side gets out after parking is completed. In this case, since the doors next to the driver's seat side are open, the minimum first length in the overall width direction which is necessary when the passenger of the driver's seat side gets out is required. That is, the vehicle 700 needs to be parked in the parking space to be spaced apart from an object located next to the driver's seat, by the first length.

If passenger information of a passenger seat side is received, the processor 270 may generate the parking route based on the first length in the overall width direction which is necessary when the passenger of the driver's seat side gets out, and a second length in the overall width direction which is necessary when a passenger of the passenger seat side gets out.

Here, the passenger information of the passenger seat side may be information indicating whether a passenger is sitting on a passenger seat or a back seat behind the passenger seat.

Doors of the driver's seat side and the passenger seat side should be open when the driver and the passengers get out after parking is completed. In this case, since the doors of the driver's seat side and the passenger seat side are open, the first length in the overall width direction which is necessary when the passenger of the driver's seat side gets out, and the second length in the overall width direction which is necessary when the passenger of the passenger seat side gets out are required. That is, the vehicle 700 needs to be parked in the parking space to be spaced apart from an object located next to the driver's seat, by the first length. In addition, the vehicle 700 needs to be parked in the parking space to be spaced apart from an object located next to the passenger seat, by the second length.

Meanwhile, the internal camera 722c may capture an image of passengers. The processor 270 may calculate a length in the overall width direction, which is necessary when the passengers get out, based on the passenger image captured by the internal camera 722c. The processor 270 may calculate the length based on physiques of the passengers. For example, the processor 270 may calculate the length in proportion to the physiques of the passengers.

The processor 270 may calculate the length in the overall width direction which is necessary when the passengers get out, in further consideration of objects near the parking space.

When another vehicle parked near the parking space is detected, if a driver's seat of the other vehicle is located close to the vehicle 700, the processor 270 may calculate the length in the overall width direction which is necessary when the passengers get out, in further consideration of a length in the overall width direction which is necessary when a driver of the other vehicle gets in. In this case, the processor 270 may determine whether the driver's seat of the other vehicle is located close to the vehicle 700, based on whether the other vehicle is parked head in or back in.

Here, whether the other vehicle is parked head in or back in may be determined by analyzing feature points on an image of the other vehicle. For example, whether the other vehicle is parked head in may be determined by extracting one of a hood, a grille, an emblem, a steering wheel, a windshield, a rearview mirror, headlamps, and a front bumper from the image of the other vehicle. For example, whether the other vehicle is parked back in may be determined by extracting one of rear combination lamps, a rear bumper, a trunk or tailgate, and a center high mount stop lamp (CHMSL) from the image of the other vehicle. In this case, the image analysis may be performed by the processor 270 of the automatic parking apparatus 200. Alternatively, the image analysis may be performed by the mobile terminal 100 and then the processor 270 of the automatic parking apparatus 200 may only receive result data thereof.

Meanwhile, the processor 270 may determine whether to park the vehicle 700 head in or back in.

The processor 270 may determine whether to park the vehicle 700 head in or back in, based on user input. The user input may be provided through the input unit 720 of the vehicle 700, and then the processor 270 may receive the user input through the interface unit 230.

The processor 270 may determine whether to park the vehicle 700 head in or back in, based on whether a trunk or tailgate needs to be opened.

Whether the trunk or tailgate needs to be opened may be determined based on user input.

Whether the trunk or tailgate needs to be opened may be determined based on information indicating whether the trunk or tailgate has been open and then closed before. For example, if the trunk or tailgate is opened and closed and then the vehicle 700 needs to be parked after driving, the processor 270 may determine that the trunk or tailgate needs to be opened.

According to an embodiment, the vehicle 700 may include a sensing unit (not shown) for sensing whether baggage is loaded in the trunk or tailgate, and the processor 270 may determine that the trunk or tailgate needs to be opened, based on a sensing result of the sensing unit. Here, the sensing unit may include a camera, a photo sensor, an infrared sensor, or the like.

A parking apparatus according to the related art is focused to detect a parking space and to stably park a vehicle in the detected parking space. However, the parking apparatus according to the related art does not consider that passengers get out after parking is completed, and thus the passengers may experience inconvenience when getting out of the vehicle after parking is completed.

The automatic parking apparatus 200 according to an embodiment of the present invention parks the vehicle 700 in consideration of a space necessary when passengers get out, and thus the inconvenience according to the related art may be solved.

The processor 270 may provide a control signal for parking the vehicle 700 along the generated parking route, to the vehicle driving unit 750 or the ECU 770.

Meanwhile, the processor 270 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for performing other functions.

The power supply unit 290 may supply power necessary for operation of each element, under control of the processor 270. Particularly, the power supply unit 290 may receive power supplied from, for example, a battery of the vehicle 700.

Figure 19A:
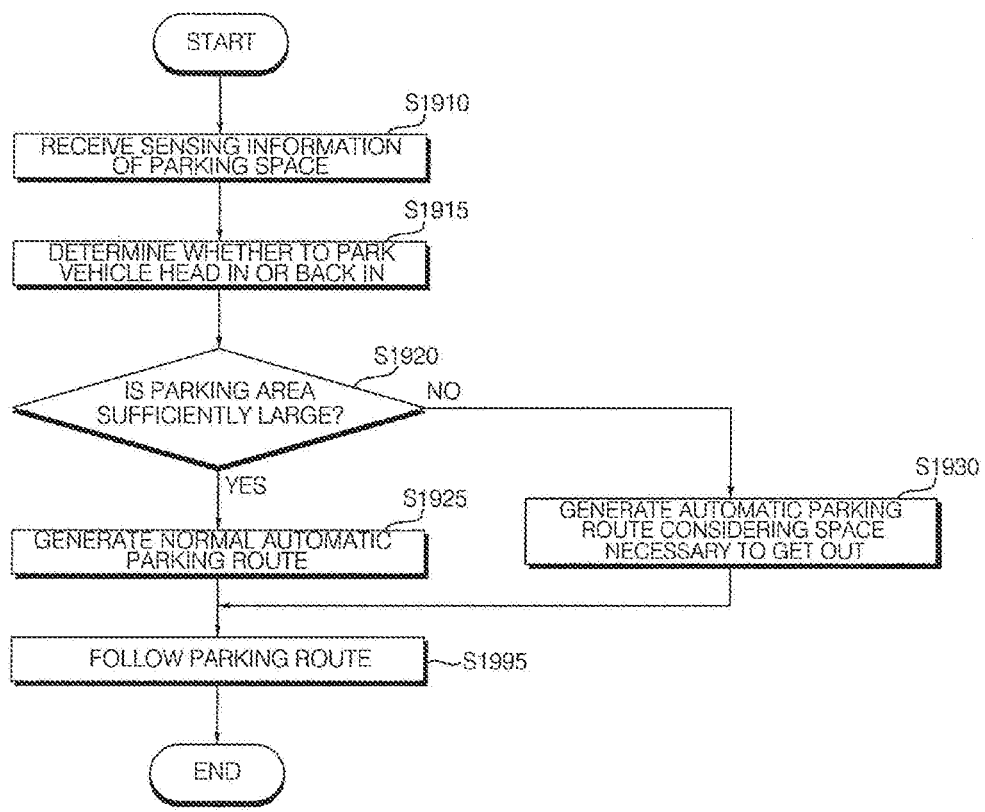
FIGS. 19A and 19B are flowcharts for describing automatic parking operation according to an embodiment of the present invention.
Figure 19B:
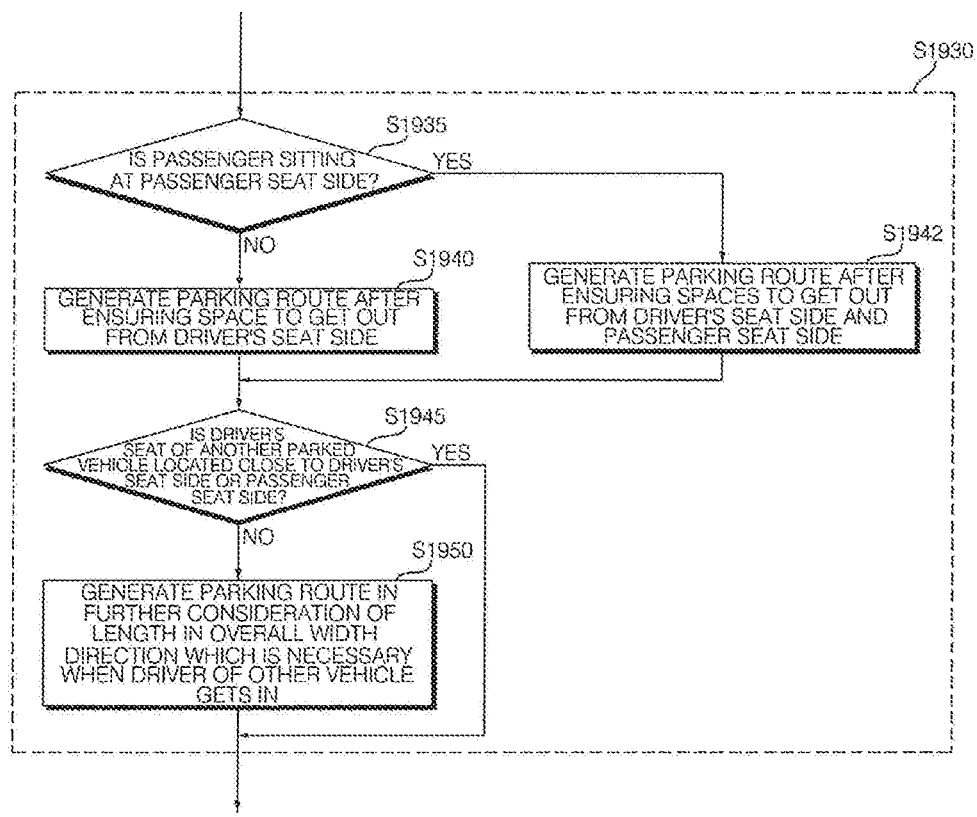

FIGS. 19A and 19B are flowcharts for describing automatic parking operation according to an embodiment of the present invention.

Referring to FIG. 19A, the processor 270 may receive sensing information of a parking space (S1910). The processor 270 may receive the sensing information through the interface unit 230 from the sensing unit 760 or the mobile terminal 100.

The sensing unit 760 may sense the parking space.

The mobile terminal 100 may detect the parking space. The mobile terminal 100 may detect the parking space based on an image captured by the camera 121. The mobile terminal 100 may detect an object in the image captured by the camera 121, and detect the parking space based on the detected object.

For example, the mobile terminal 100 may detect the parking space based on parking lines of a parking area.

For example, the mobile terminal 100 may detect a plurality of objects and detect the parking space based on the distance between the detected objects. Here, the objects may be other parked vehicles, walls, or pillars. Here, the distance between the objects may be detected using a disparity or TOF value.

After that, the processor 270 may determine whether to park the vehicle 700 head in or back in (S1915).

The processor 270 may determine whether to park the vehicle 700 head in or back in, based on user input. The user input may be provided through the input unit 720 of the vehicle 700, and then the processor 270 may receive the user input through the interface unit 230.

The processor 270 may determine whether to park the vehicle 700 head in or back in, based on whether a trunk or tailgate needs to be opened.

Whether the trunk or tailgate needs to be opened may be determined based on user input.

After that, the processor 270 may determine whether the parking space sensed in step S1910 is sufficiently large (S1920).

The processor 270 may determine whether the parking space is sufficiently large, based on detected parking lines. The processor 270 may determine whether the parking space is sufficiently large, based on whether the length of a parking line corresponding to the width of a parking area is equal to or greater than a preset length. That is, the processor 270 may set a reference length based on an overall width of the vehicle 700 and a length in an overall width direction which is necessary when passengers of a driver's seat side and a passenger seat side get out. The processor 270 may determine whether the parking space is sufficiently large, based on whether the length of the parking line corresponding to the width of the parking area is equal to or greater than the set reference length.

The processor 270 may determine whether the parking space is sufficiently large, based on the distance between the detected objects. The processor 270 may determine whether the parking space is sufficiently large, based on whether the distance between the detected objects is equal to or greater than a preset length. That is, the processor 270 may set a reference length based on the overall width of the vehicle 700 and the length in the overall width direction which is necessary when the passengers of the driver's seat side and the passenger seat side get out. The processor 270 may determine whether the parking space is sufficiently large, based on whether the distance between the detected objects is equal to or greater than the set reference length.

Upon determining that the parking space is sufficiently large, the processor 270 may generate a normal automatic parking route (S1925).

Upon determining that the parking space is not sufficiently large, the processor 270 may generate an automatic parking route considering a space necessary when the passengers get out (S1930).

Step S1930 will be described in detail below with reference to FIG. 19B.

After the parking route is generated, the processor 270 may follow the generated parking route (S1995). The processor 270 provides a control signal for parking the vehicle 700 along the generated parking route, to the vehicle driving unit 750 or the ECU 770.

Referring to FIG. 19B, the processor 270 may determine whether a passenger is sitting at a passenger seat side (S1935).

The processor 270 may determine whether a passenger is sitting at the passenger seat side, based on an inside image of the vehicle 700 which is received from the internal camera 722c.

If no passenger is sitting at the passenger seat side, the processor 270 may generate a parking route based on a first length in the overall width direction which is necessary when a passenger of a driver's seat side gets out (S1940).

Here, passenger information of the driver's seat side may be information indicating whether a passenger is sitting on a driver's seat or a back seat behind the driver's seat.

If a passenger is sitting at the passenger seat side, the processor 270 may generate a parking route based on the first length in the overall width direction which is necessary when the passenger of the driver's seat side gets out, and a second length in the overall width direction which is necessary when the passenger of the passenger seat side gets out (S1942).

Here, passenger information of the passenger seat side may be information indicating whether a passenger is sitting on a passenger seat or a back seat behind the passenger seat.

Meanwhile, the internal camera 722c may capture an image of passengers. The processor 270 may calculate a length in the overall width direction, which is necessary when the passengers get out, based on the passenger image captured by the internal camera 722c. The processor 270 may calculate the length based on physiques of the passengers. For example, the processor 270 may calculate the length in proportion to the physiques of the passengers.

If the physique of a first passenger of the driver's seat side is larger than the physique of a second passenger of the passenger seat side, the processor 270 may generate the parking route by setting the first length to be greater than the second length.

After the parking route is generated, the processor 270 may determine whether a driver's seat of another parked vehicle is located close to the driver's seat side or the passenger seat side (S1945).

The processor 270 may determine whether the driver's seat of the other vehicle is located close to the vehicle 700, based on whether the other vehicle is parked head in or back in.

Here, whether the other vehicle is parked head in or back in may be determined by analyzing feature points on an image of the other vehicle. For example, whether the other vehicle is parked head in may be determined by extracting one of a hood, a grille, an emblem, a steering wheel, a windshield, a rearview mirror, headlamps, and a front bumper from the image of the other vehicle. For example, whether the other vehicle is parked back in may be determined by extracting one of rear combination lamps, a rear bumper, a trunk or tailgate, and a CHMSL from the image of the other vehicle. In this case, the image analysis may be performed by the processor 270 of the automatic parking apparatus 200. Alternatively, the image analysis may be performed by the mobile terminal 100 and then the processor 270 of the automatic parking apparatus 200 may only receive result data thereof.

When the other vehicle parked near the parking space is detected, if the driver's seat of the other vehicle is located close to the vehicle 700, the processor 270 may generate the parking route in further consideration of a length in the overall width direction which is necessary when a driver of the other vehicle gets in (S1950).

As described above, since the vehicle 700 is parked in consideration of a space necessary when a driver of another parked vehicle gets in, inconvenience to be experienced by the driver of the other vehicle when getting in the other vehicle due to lack of space caused after the vehicle 700 is parked may be solved.

FIGS. 20A to 20L are schematic diagrams for describing an operation for generating a parking route and following the generated parking route, according to embodiments of the present invention.

FIGS. 20A to 20D exemplarily illustrate that other vehicles are parked at two sides of a parking space 2030, according to an embodiment of the present invention.

Figure 20A:
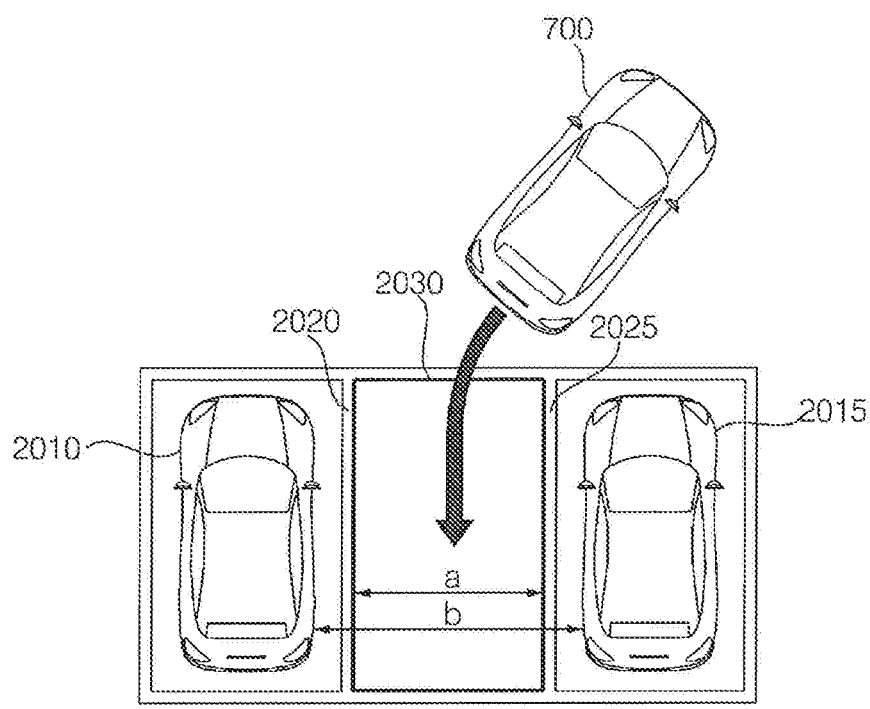
FIGS. 20A to 20L are schematic diagrams for describing an operation for generating a parking route and following the generated parking route, according to embodiments of the present invention.

Referring to FIG. 20A, the automatic parking apparatus 200 may receive sensing information of the parking space 2030 from the sensing unit 760 or the mobile terminal 100.

The sensing unit 760 may sense the parking space 2030.

The mobile terminal 100 may detect the parking space 2030. The mobile terminal 100 may detect the parking space 2030 based on an image captured by the camera 121. The mobile terminal 100 may detect an object in the image captured by the camera 121, and detect the parking space 2030 based on the detected object.

For example, the mobile terminal 100 may detect the parking space 2030 based on parking lines 2020 and 2025 of a parking area.

For example, the mobile terminal 100 may detect a plurality of objects 2010 and 2015 and detect the parking space 2030 based on the distance between the detected objects 2010 and 2015.

After that, the automatic parking apparatus 200 may determine whether to park the vehicle 700 head in or back in. The automatic parking apparatus 200 may determine whether to park the vehicle 700 head in or back in, based on information indicating whether to open a trunk or tailgate, which is received through user input.

After that, the automatic parking apparatus 200 may determine whether the parking space 2030 sensed based on the detected parking lines 2020 and 2025 or the distance between the objects 2010 and 2015 is sufficiently large.

Specifically, the automatic parking apparatus 200 may determine whether the parking space 2030 is sufficiently large, based on whether the length of a parking line corresponding to a width a of a parking area is equal to or greater than a preset length. Alternatively, the automatic parking apparatus 200 may determine whether the parking space 2030 is sufficiently large, based on whether a distance b between the objects 2010 and 2015 is equal to or greater than a preset length.

If the parking space 2030 is not sufficiently large, the automatic parking apparatus 200 may generate a parking route based on a length in an overall width direction which is necessary when passengers get out.

Specifically, the automatic parking apparatus 200 may generated the parking route based on a first length in the overall width direction which is necessary when a passenger of a driver's seat side gets out. Alternatively, the automatic parking apparatus 200 may generate the parking route based on the first length in the overall width direction which is necessary when the passenger of the driver's seat side gets out, and a second length in the overall width direction which is necessary when a passenger of a passenger seat side gets out.

Meanwhile, the automatic parking apparatus 200 may generate the parking route in further consideration of a length in the overall width direction which is necessary when a driver of another vehicle parked near the parking space 2030 gets in.

As illustrated in FIG. 20A, when the vehicle 700 is parked back in, a driver's seat of a first other vehicle 2010 is not located close to the vehicle 700, and thus does not need to be considered. Since a driver's seat of a second other vehicle 2015 is located close to the vehicle 700, the automatic parking apparatus 200 generates the parking route in further consideration of a length in the overall width direction which is necessary when a driver of the second other vehicle 2015 gets in.

The automatic parking apparatus 200 may generate the parking route in such a manner that the vehicle 700 is spaced apart from the first other vehicle 2010 to a left side of a forward direction of the vehicle 700 by a first distance which is necessary when a driver of the vehicle 700 gets out. In addition, the automatic parking apparatus 200 may generate the parking route in such a manner that the vehicle 700 is spaced apart from the second other vehicle 2015 to a right side of the forward direction of the vehicle 700 by a third distance which is necessary when the driver of the second other vehicle 2015 gets in.

After the parking route is generated, the automatic parking apparatus 200 may output a control signal for parking the vehicle 700 along the generated parking route.

Figure 20B:
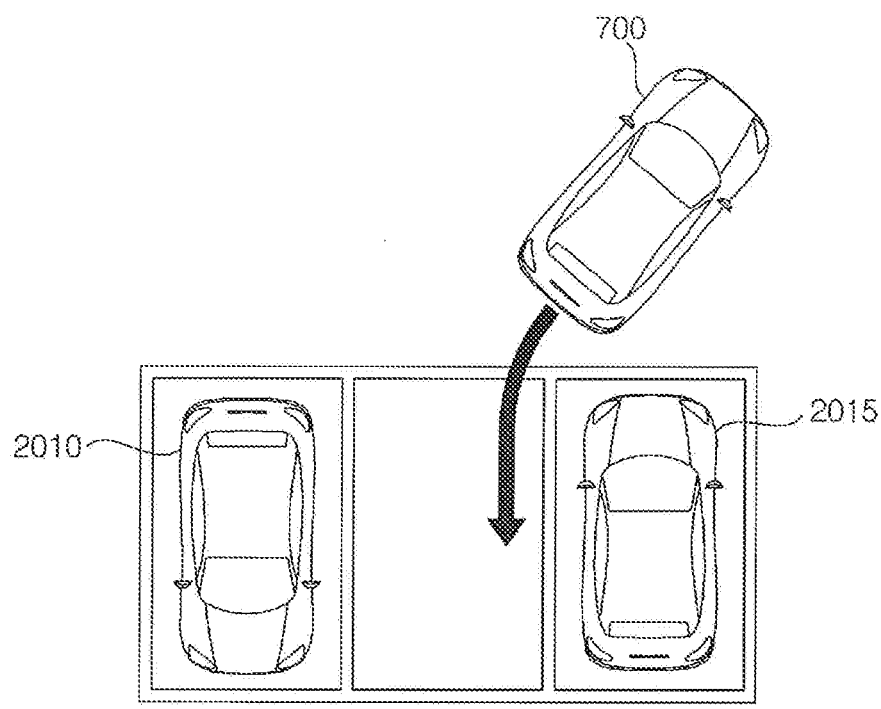

As illustrated in FIG. 20B, when the vehicle 700 is parked back in, the driver's seat of the second other vehicle 2015 is not located close to the vehicle 700, and thus does not need to be considered. The driver's seat of the first other vehicle 2010 is located close to the vehicle 700. However, since a space necessary when the driver of the vehicle 700 gets out overlaps with a space necessary when the driver of the first other vehicle 2010 gets in, a length in the overall width direction which is necessary when the driver of the first other vehicle 2010 gets in does not need to be further considered.

The automatic parking apparatus 200 may generate the parking route in such a manner that the vehicle 700 is spaced apart from the first other vehicle 2010 to the left side of the forward direction of the vehicle 700 by the first distance which is necessary when the driver of the vehicle 700 gets out.

Figure 20C:
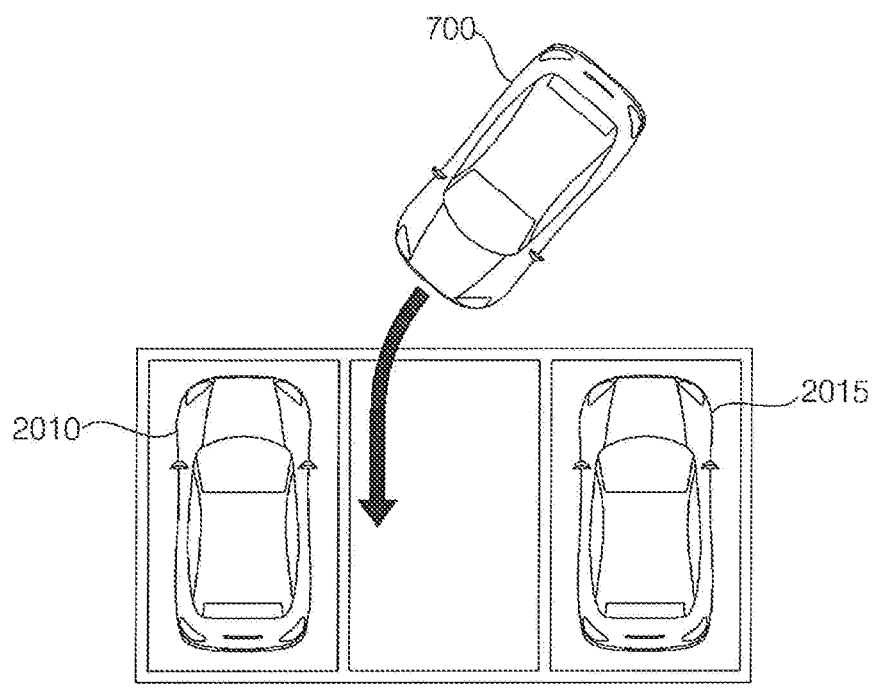

As illustrated in FIG. 20C, when the vehicle 700 is parked head in, the driver's seat of the first other vehicle 2010 is not located close to the vehicle 700, and thus does not need to be considered. The driver's seat of the second other vehicle 2015 is located close to the vehicle 700. However, since the space necessary when the driver of the vehicle 700 gets out overlaps with a space necessary when the driver of the second other vehicle 2015 gets in, the length in the overall width direction which is necessary when the driver of the second other vehicle 2015 gets in does not need to be further considered.

The automatic parking apparatus 200 may generate the parking route in such a manner that the vehicle 700 is spaced apart from the second other vehicle 2015 to the left side of the forward direction of the vehicle 700 by the first distance which is necessary when the driver of the vehicle 700 gets out.

Figure 20D:
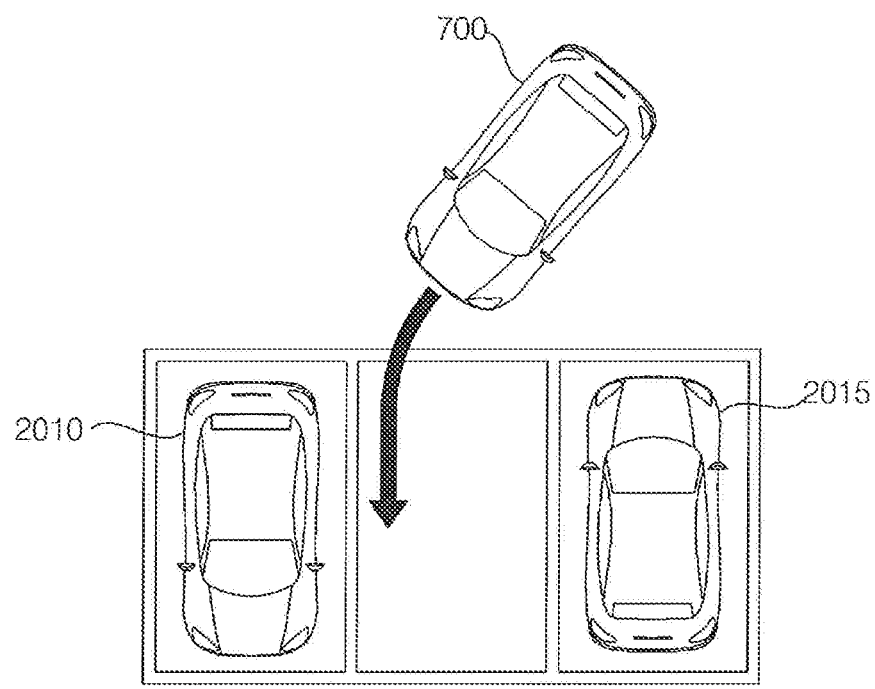

As illustrated in FIG. 20D, when the vehicle 700 is parked head in, the driver's seat of the first other vehicle 2010 is located close to the vehicle 700. The driver's seat of the second other vehicle 2015 is located close to the vehicle 700. However, since the space necessary when the driver of the vehicle 700 gets out overlaps with the space necessary when the driver of the second other vehicle 2015 gets in, the length in the overall width direction which is necessary when the driver of the second other vehicle 2015 gets in does not need to be further considered.

The automatic parking apparatus 200 may generate the parking route in such a manner that the vehicle 700 is spaced apart from the second other vehicle 2015 to the left side of the forward direction of the vehicle 700 by the first distance which is necessary when the driver of the vehicle 700 gets out. The automatic parking apparatus 200 may generate the parking route in such a manner that the vehicle 700 is spaced apart from the first other vehicle 2010 to the right side of the forward direction of the vehicle 700 by the third distance which is necessary when the driver of the first other vehicle 2010 gets in.

FIGS. 20E to 20H exemplarily illustrate that another vehicle is parked at a side of the parking space 2030, according to an embodiment of the present invention.

Figure 20E:
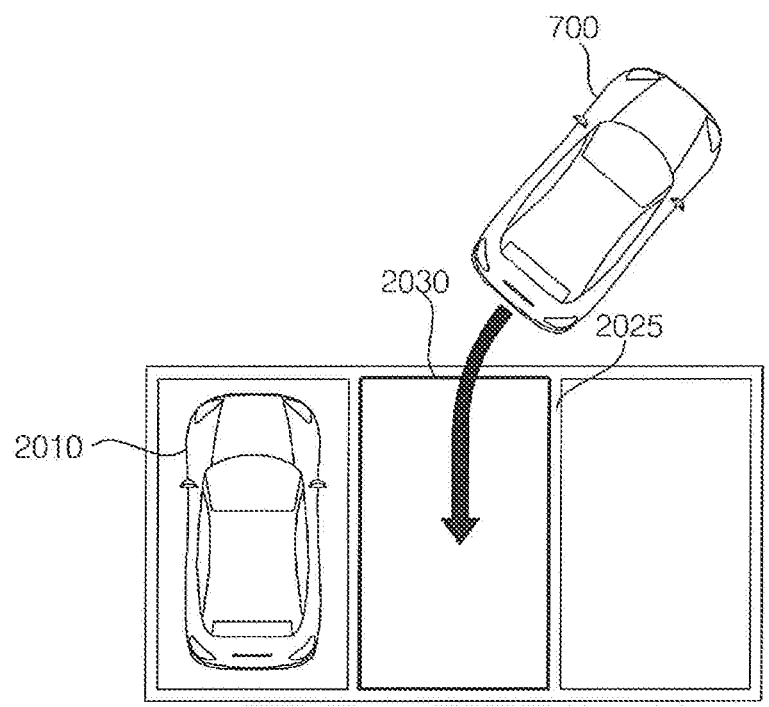

As illustrated in FIG. 20E, when the vehicle 700 is parked back in, the driver's seat of the first other vehicle 2010 is not located close to the vehicle 700, and thus does not need to be considered.

The automatic parking apparatus 200 may generate the parking route in such a manner that the vehicle 700 is spaced apart from the first other vehicle 2010 to the left side of the forward direction of the vehicle 700 by the first distance which is necessary when the driver of the vehicle 700 gets out. In this case, the automatic parking apparatus 200 may generate the parking route in such a manner that the vehicle 700 is parked inside the parking line 2025 at the right side of the forward direction of the vehicle 700.

Figure 20F:
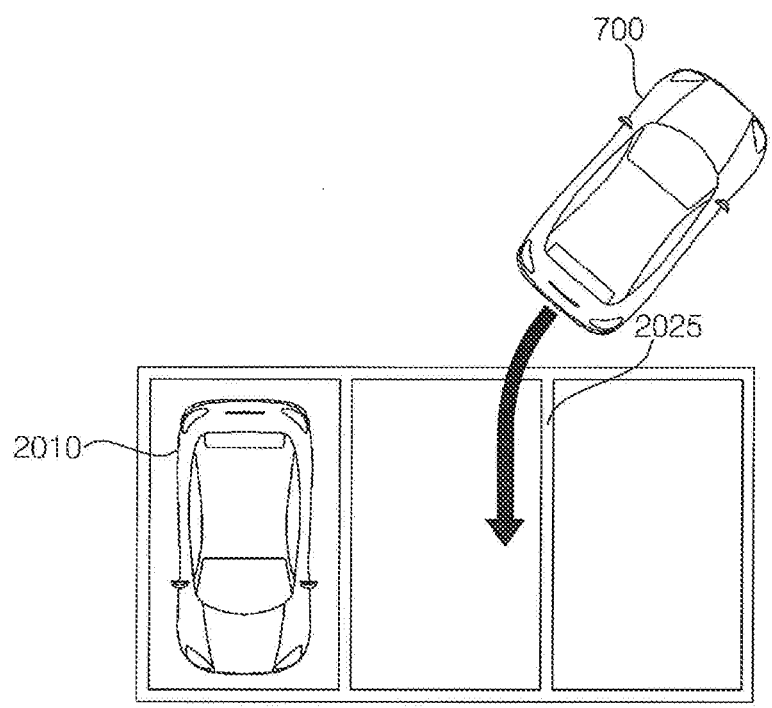

As illustrated in FIG. 20F, when the vehicle 700 is parked back in, the driver's seat of the first other vehicle 2010 is located close to the vehicle 700. However, since the space necessary when the driver of the vehicle 700 gets out overlaps with the space necessary when the driver of the first other vehicle 2010 gets in, the length in the overall width direction which is necessary when the driver of the first other vehicle 2010 gets in does not need to be further considered.

The automatic parking apparatus 200 may generate the parking route in such a manner that the vehicle 700 is spaced apart from the first other vehicle 2010 to the left side of the forward direction of the vehicle 700 by the first distance which is necessary when the driver of the vehicle 700 gets out. In this case, the automatic parking apparatus 200 may generate the parking route in such a manner that the vehicle 700 is parked inside the parking line 2025 at the right side of the forward direction of the vehicle 700.

Figure 20G:
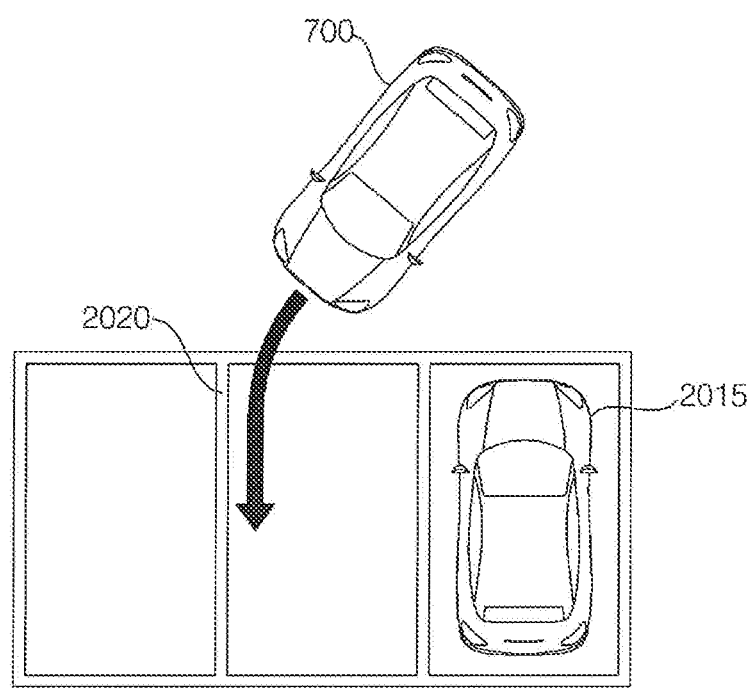

As illustrated in FIG. 20G, when the vehicle 700 is parked head in, the driver's seat of the second other vehicle 2015 is located close to the vehicle 700. However, since the space necessary when the driver of the vehicle 700 gets out overlaps with the space necessary when the driver of the second other vehicle 2015 gets in, the length in the overall width direction which is necessary when the driver of the second other vehicle 2015 gets in does not need to be further considered.

The automatic parking apparatus 200 may generate the parking route in such a manner that the vehicle 700 is spaced apart from the second other vehicle 2015 to the left side of the forward direction of the vehicle 700 by the first distance which is necessary when the driver of the vehicle 700 gets out. In this case, the automatic parking apparatus 200 may generate the parking route in such a manner that the vehicle 700 is parked inside the parking line 2020 at the right side of the forward direction of the vehicle 700.

Figure 20H:
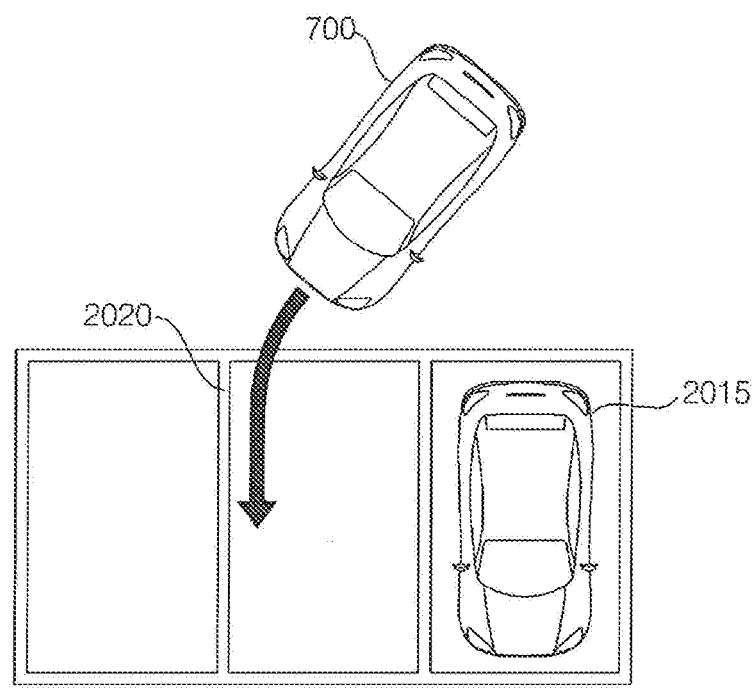

As illustrated in FIG. 20H, when the vehicle 700 is parked head in, the driver's seat of the second other vehicle 2015 is not located close to the vehicle 700, and thus does not need to be considered.

The automatic parking apparatus 200 may generate the parking route in such a manner that the vehicle 700 is spaced apart from the second other vehicle 2015 to the left side of the forward direction of the vehicle 700 by the first distance which is necessary when the driver of the vehicle 700 gets out. In addition, the automatic parking apparatus 200 may generate the parking route in such a manner that the vehicle 700 is parked inside the parking line 2020 at the right side of the forward direction of the vehicle 700.

FIGS. 20I to 20L exemplarily illustrate that no vehicle is parked at sides of the parking space 2030, according to an embodiment of the present invention.

Figure 20I:
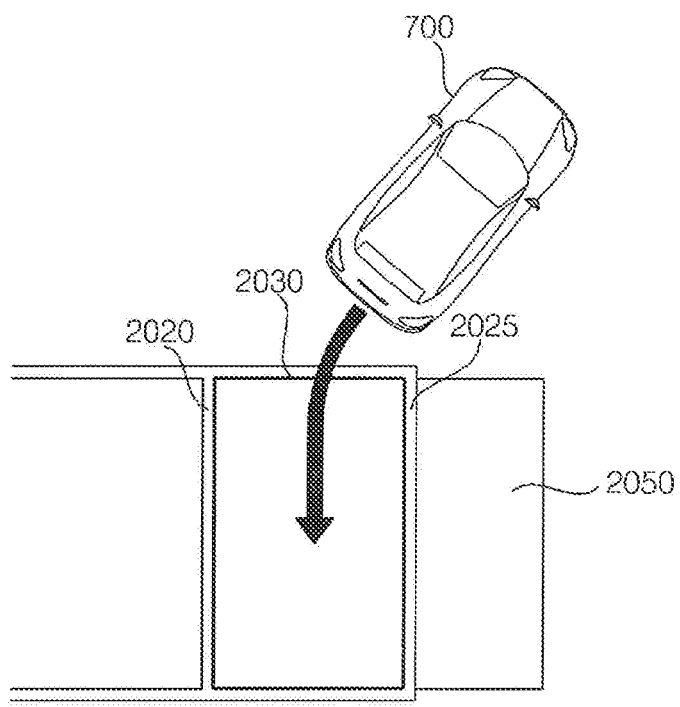

As illustrated in FIG. 20I, when the vehicle 700 is parked back in, a structure 2050 is located at the right side of the forward direction of the vehicle 700. Here, the structure 2050 may be a wall or a pillar.

The automatic parking apparatus 200 may generate the parking route in such a manner that the vehicle 700 is parked inside the parking line 2020 at the left side of the forward direction of the vehicle 700.

Figure 20J:
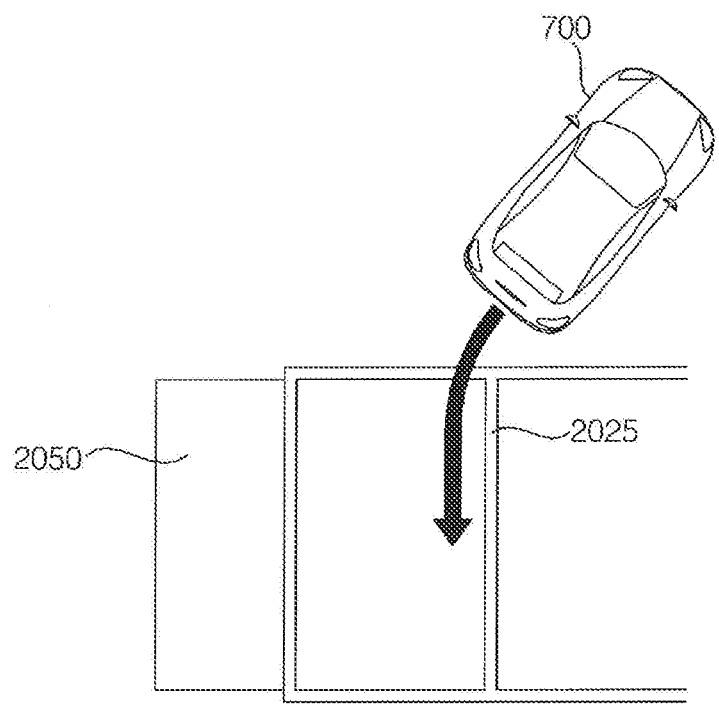

As illustrated in FIG. 20J, when the vehicle 700 is parked back in, the structure 2050 is located at the left side of the forward direction of the vehicle 700. Here, the structure 2050 may be a wall or a pillar.

The automatic parking apparatus 200 may generate the parking route in such a manner that the vehicle 700 is spaced apart from the structure 2050 to the left side of the forward direction of the vehicle 700 by the first distance which is necessary when the driver of the vehicle 700 gets out. In addition, the automatic parking apparatus 200 may generate the parking route in such a manner that the vehicle 700 is parked inside the parking line 2025 at the right side of the forward direction of the vehicle 700.

Figure 20K:
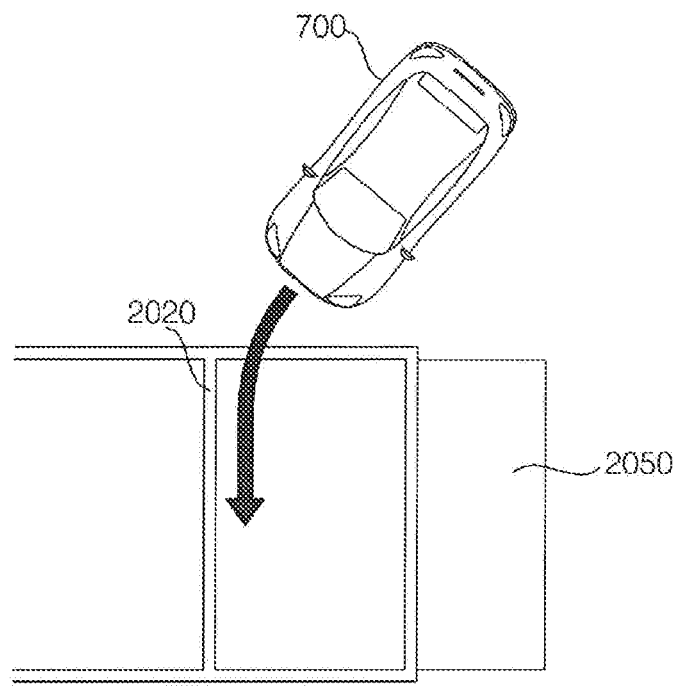

As illustrated in FIG. 20K, when the vehicle 700 is parked head in, the structure 2050 is located at the left side of the forward direction of the vehicle 700. Here, the structure 2050 may be a wall or a pillar.

The automatic parking apparatus 200 may generate the parking route in such a manner that the vehicle 700 is spaced apart from the structure 2050 to the left side of the forward direction of the vehicle 700 by the first distance which is necessary when the driver of the vehicle 700 gets out. In addition, the automatic parking apparatus 200 may generate the parking route in such a manner that the vehicle 700 is parked inside the parking line 2020 at the right side of the forward direction of the vehicle 700.

Figure 20L:
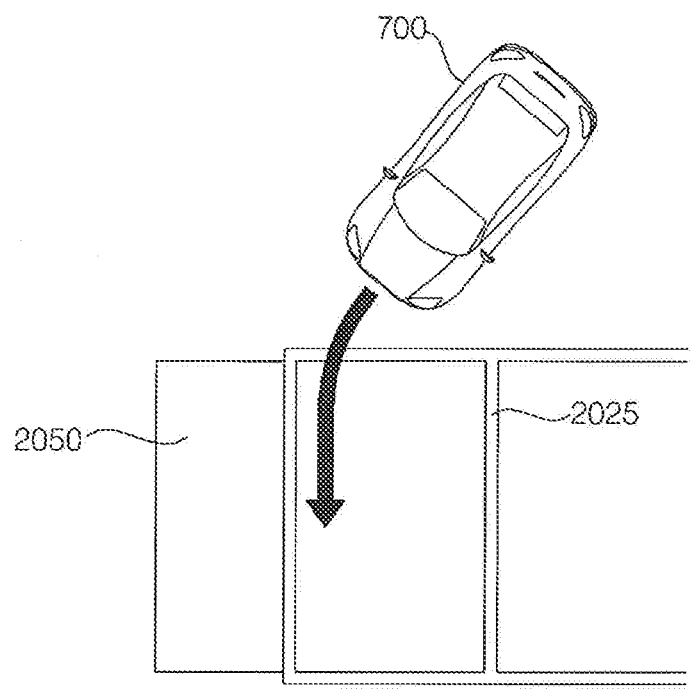

As illustrated in FIG. 20L, when the vehicle 700 is parked head in, the structure 2050 is located at the right side of the forward direction of the vehicle 700. Here, the structure 2050 may be a wall or a pillar.

The automatic parking apparatus 200 may generate the parking route in such a manner that the vehicle 700 is parked inside the parking line 2025 at the left side of the forward direction of the vehicle 700.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a camera;
a display;
a communication unit;
a motion sensor configured to generate motion information by sensing motion of the mobile terminal; and
a controller configured to:
  enter a parking assist mode;
  find, in the parking assist mode, parkable areas based on an overall width of a vehicle and a distance between a plurality of objects in an image received via the camera;

select one of the parkable areas;
cause the communication unit to transmit, to the vehicle, a control signal for parking the vehicle in the selected parking area;
generate a 3-dimensional (3D) map of a parking lot based on the motion information and visual odometry information, wherein the visual odometry information is obtained by tracking feature points on sequential images obtained by the camera;
cause the display to display parkable area information indicating the parkable areas, unparkable area information, and location information of the vehicle on the 3D map,
wherein the unparkable area information indicates an unparkable parking area surrounded by objects and in which no vehicle is parked, and wherein a distance between the objects is equal to or less than the overall width of the vehicle;
provide a route from a location of the mobile terminal to a location where the vehicle is parked using the generated 3D map; and
cause the display to display the route on the 3D map.

2. The mobile terminal according to claim 1, wherein the controller is further configured to:
enter the parking assist mode in response to detection of a graphic parking sign or a text parking sign in the image; and
determine a parking situation based on the detected graphic or text parking sign.

3. The mobile terminal according to claim 1, wherein the camera comprises a first camera configured to receive an inside image of the vehicle, and
wherein the controller is further configured to acquire passenger information based on the inside image.

4. The mobile terminal according to claim 3, wherein the controller is further configured to cause the display to display a selectable parking menu based on the passenger information, allowing a user to select one item from the parking menu.

5. The mobile terminal according to claim 4, wherein:
the controller is further configured to determine whether a passenger side door of the vehicle needs to be opened based on the passenger information; and
the parking menu comprises a menu item for enabling opening of the passenger side door after parking is completed when it is determined that the passenger side door needs to be opened.

6. The mobile terminal according to claim 4, wherein the parking menu comprises a menu item for enabling opening of a trunk after parking is completed.

7. The mobile terminal according to claim 4, wherein the controller is further configured to cause the display to display estimated parking time information on a partial region of the parking menu.

8. The mobile terminal according to claim 1, wherein the controller is further configured to find the parkable areas based on vehicle information related to parking in response to a user input received via the display.

9. The mobile terminal according to claim 1, wherein the plurality of objects comprise a first parked vehicle and a second parked vehicle, and the controller is further configure to:
obtain a distance between the first parked vehicle and the second parked vehicle; and
find the parkable areas based on whether the detected distance between the first parked vehicle and the second parked vehicle is greater than the overall width of the vehicle by at least a threshold value.

10. The mobile terminal according to claim 9, wherein the controller is further configured to cause the display to display the parkable area information corresponding to each of the parkable areas using an indicator.

11. The mobile terminal according to claim 10, wherein the controller is further configured to cause the display to display distance information near the indicator, the distance information indicating a distance from the vehicle to the parkable area.

12. The mobile terminal according to claim 10, wherein the controller is further configured to cause the display to display the parkable area information using text when the indicator is not displayable on the image due to movement of the vehicle.

13. The mobile terminal according to claim 1, wherein:
the controller is further configured to cause the display to display distance information using a vehicle image, the distance information including the distance between the plurality of objects; and
the vehicle image includes an opening degree of each door differently based on the distance information.

14. The mobile terminal according to claim 1, wherein the controller is further configured to cause the display to indicate a recommended parking area among the parkable areas.

15. The mobile terminal according to claim 14, wherein the controller is further configured to cause the display to display the recommended parking area based on user-preferred parking space information in response to the user-preferred parking space information received by user input.

16. The mobile terminal according to claim 14, further comprising a memory configured to store a parking route or a parking pattern, wherein the controller is further configured to provide the recommended parking area based on the parking route or the parking pattern.

17. The mobile terminal according to claim 1, wherein the controller is further configured to cause the display to display a predicted trajectory of wheels corresponding to a route for parking the vehicle in one area selected among the parkable areas.

18. The mobile terminal according to claim 1, wherein the controller is further configured to provide space information for double parking when no parkable area is found.

19. The mobile terminal according to claim 1, wherein the communication unit comprises a wireless communication unit configured to communicate with an external server, another mobile terminal, or another vehicle, and wherein the controller is further configured to cause the wireless communication unit to receive the 3D map from one of the external server, the other mobile terminal, or the other vehicle.

20. The mobile terminal according to claim 1, wherein the 3D map is generated for a space corresponding to the image obtained by the camera.

21. The mobile terminal according to claim 1, wherein the controller is further configured to enter the parking assist mode by receiving user input.

22. The mobile terminal according to claim 1, wherein:
the communication unit comprises an interface unit or a short-range communication module; and
the controller is further configured to cause the interface unit or short-range communication module to transmit the control signal.

23. The mobile terminal according to claim 1, wherein the parkable area information and the unparkable area information are displayed in different colors.

\* \* \* \* \*